(12) United States Patent
Naito et al.

(10) Patent No.: US 10,832,499 B2
(45) Date of Patent: Nov. 10, 2020

(54) SYSTEM INCLUDING BASE STATIONS CONNECTABLE WITH MOBILE BODIES, BASE STATION IN SYSTEM, AND CONTROL METHOD FOR CONTROLLING BASE STATION IN SYSTEM

(71) Applicant: Panasonic Intellectual Property Corporation of America, Torrance, CA (US)

(72) Inventors: Eiichi Naito, Kyoto (JP); Takenobu Aoshima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 438 days.

(21) Appl. No.: 15/912,593

(22) Filed: Mar. 6, 2018

(65) Prior Publication Data
US 2018/0286147 A1 Oct. 4, 2018

(30) Foreign Application Priority Data

Mar. 28, 2017 (JP) .................................. 2017-063476

(51) Int. Cl.
*G05D 1/00* (2006.01)
*G05D 3/00* (2006.01)
(Continued)

(52) U.S. Cl.
CPC ............ *G07C 5/008* (2013.01); *A47L 9/2873* (2013.01); *A47L 11/4011* (2013.01); *A47L 11/4061* (2013.01); *A47L 11/4091* (2013.01); *B60L 53/36* (2019.02); *B60L 53/37* (2019.02); *B60L 53/66* (2019.02); *G05D 1/0225* (2013.01);
(Continued)

(58) Field of Classification Search
CPC ......... G07C 5/008; B60L 53/66; B60L 53/36; B60L 53/37; B60L 2200/40; A47L 9/2873; A47L 11/4011; A47L 11/4061; A47L 11/4091; A47L 2201/02; G05D 1/0225;
(Continued)

(56) References Cited

U.S. PATENT DOCUMENTS

| 2005/0156562 A1 | 7/2005 | Cohen et al. |
| 2012/0049798 A1* | 3/2012 | Cohen .................. G05D 1/0225 320/109 |
| 2018/0075402 A1* | 3/2018 | Stadie .................. G05D 1/0255 |

FOREIGN PATENT DOCUMENTS

JP 2007-149115 6/2007

* cited by examiner

*Primary Examiner* — Mahmoud S Ismail
(74) *Attorney, Agent, or Firm* — Greenblum & Bernstein, P.L.C.

(57) ABSTRACT

A system includes a controller and base stations each including first and second transmitters and a detector. The controller, when a first base station is not connected with any mobile body, causes the first transmitter of the first base station to transmit a first signal and the second transmitter of the first base station to transmit a second signal, thereby guiding a mobile body around the first base station toward the first base station. The controller, when the first base station is connected with a mobile body and a second base station closest to the first base station is not connected with any mobile body, causes the first transmitter of the first base station to transmit the second signal and/or the second transmitter of the first base station to transmit the first signal, thereby guiding the mobile body around the first base station toward the second base station.

19 Claims, 24 Drawing Sheets

(51) Int. Cl.
  *G06F 7/00* (2006.01)
  *G06F 17/00* (2019.01)
  *G07C 5/00* (2006.01)
  *G05D 1/02* (2020.01)
  *A47L 9/28* (2006.01)
  *A47L 11/40* (2006.01)
  *B60L 53/36* (2019.01)
  *B60L 53/37* (2019.01)
  *B60L 53/66* (2019.01)
  *H02J 7/00* (2006.01)

(52) U.S. Cl.
  CPC .......... *G05D 1/0242* (2013.01); *G05D 1/0291* (2013.01); *G05D 1/0297* (2013.01); *A47L 2201/02* (2013.01); *B60L 2200/40* (2013.01); *G05D 2201/0203* (2013.01)

(58) Field of Classification Search
  CPC .. G05D 1/0242; G05D 1/0291; G05D 1/0297; G05D 2201/0203
  USPC .............................................. 701/2; 320/109
  See application file for complete search history.

SYSTEM INCLUDING BASE STATIONS CONNECTABLE WITH MOBILE BODIES, BASE STATION IN SYSTEM, AND CONTROL METHOD FOR CONTROLLING BASE STATION IN SYSTEM

BACKGROUND

1. Technical Field

The present disclosure relates to a system provided with a plurality of base stations with which a plurality of mobile bodies can connect, a base station in a system, and a control method for controlling a base station in a system.

2. Description of the Related Art

Robot devices that execute a predetermined task such as cleaning or inspecting while moving autonomously are conventionally known. A conventional robot device is required to return to a base station in order to charge. Therefore, the base station transmits a guidance signal for guiding the robot device to the base station, and the robot device returns to the base station while detecting the guidance signal transmitted from the base station.

For example, the system of Japanese Patent No. 4480730 is provided with: a base station provided with a plurality of signal emitters including a right signal emitter for transmitting a right signal and a left signal emitter for transmitting a left signal to which an encoding different from that of the right signal has been applied; and a robot device that docks with the base station. The robot device detects whether or not at least either one of the right signal and the left signal transmitted from the base station is present, decides a rotation direction of the robot device on the basis of the detection result, detects an overlapping region in which the right signal and the left signal overlap, tracks a route defined by the detected overlapping region, and thereby moves toward the base station.

SUMMARY

In one general aspect, the techniques disclosed here feature a system provided with: a plurality of base stations each being connectable with one of a plurality of mobile bodies; and a controller. Each of the plurality of base stations includes: a first transmitter that transmits, in a forward-left direction of the own base station, a first guidance signal for causing the course of each of the plurality of mobile bodies to change to the left with respect to the advancing direction, or a second guidance signal for causing the course of each of the plurality of mobile bodies to change to the right with respect to the advancing direction; a second transmitter that transmits the first guidance signal or the second guidance signal in a forward-right direction of the own base station; and a detector that detects whether or not the own base station is connected with one of the plurality of mobile bodies. The controller, (A) when a first base station of the plurality of base stations is not connected with any of the plurality of mobile bodies, guides at least one of the plurality of mobile bodies located around the first base station toward the first base station by (a1) causing the first transmitter of the first base station to transmit the first guidance signal, and (a2) causing the second transmitter of the first base station to transmit the second guidance signal. The controller, (B) when the first base station is connected with one of the plurality of mobile bodies, and a second base station, which is a closest base station to the first base station, of the plurality of base stations is not connected with any of the plurality of mobile bodies, guides at least one of the plurality of mobile bodies located around the first base station toward the second base station by (b1) causing the first transmitter of the first base station to transmit the second guidance signal, and/or (b2) causing the second transmitter of the first base station to transmit the first guidance signal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
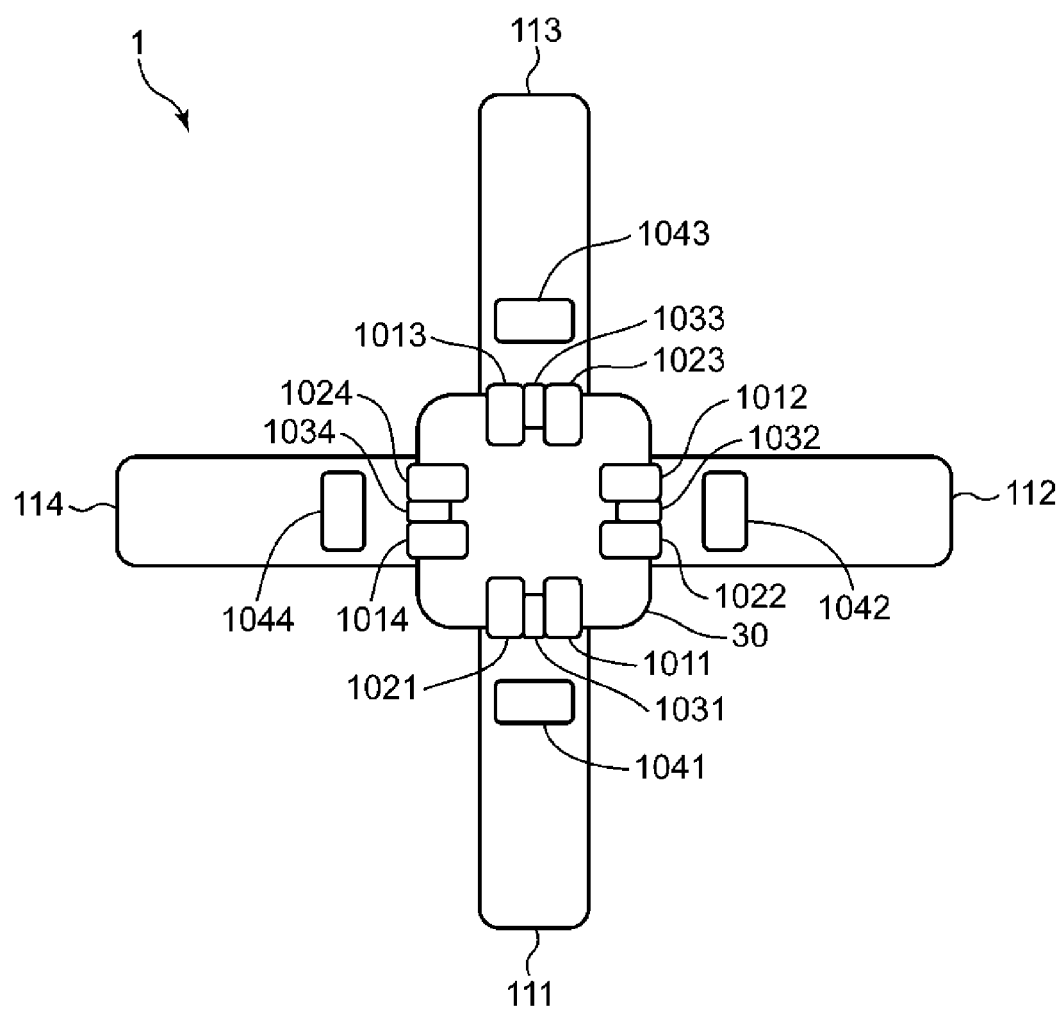
FIG. 1 is a drawing depicting an example of an overall configuration of a robot base station composite body in embodiment 1 of the present disclosure.

DETAILED DESCRIPTION (Underlying Knowledge Forming Basis of the Present Disclosure)

As mentioned above, conventionally, a robot device that executes a predetermined task such as cleaning or inspecting while moving autonomously is required to return to a base station in order to charge. Therefore, the base station transmits a guidance signal for guiding the robot device to the base station, and the robot device returns to the base station while detecting the guidance signal transmitted from the base station.

A conventional base station stops transmitting the guidance signal when the robot device returns and docks. Therefore, in a case where a system is provided with a plurality of robot devices and a plurality of base stations to which each of the plurality of robot devices returns, a base station to which a robot device has returned stops transmitting the guidance signal and does not contribute to the return of the other robot devices. Consequently, it is likely to take time for the other robot devices to search for a base station, and to take time for all of the plurality of robot devices to return.

A mobile body base station composite body according to an aspect of the present disclosure is a mobile body base station composite body to which a plurality of mobile bodies are to be connected, provided with: a plurality of base stations to which each of the plurality of mobile bodies is to be connected; and a guidance control unit that guides the plurality of mobile bodies to the plurality of base stations, each of the plurality of base stations being provided with: a first guidance signal transmission unit that transmits, to one side of the base station, a first guidance signal that guides a mobile body in a direction from the one side of the base station to the other side, or a second guidance signal that guides a mobile body in a direction from the other side of the base station to the one side; a second guidance signal transmission unit that transmits the first guidance signal or the second guidance signal to the other side of the base station; and a connection detection unit that detects whether or not a mobile body is connected to the base station, and the guidance control unit, in a case where the connection detection unit of a first base station from among the plurality of base stations has detected that the mobile body is not connected, causing the first guidance signal transmission unit of the first base station to transmit the first guidance signal, and also causing the second guidance signal transmission unit of the first base station to transmit the second guidance signal, in a case where the connection detection unit of the first base station has detected that the mobile body is connected, and the distance between the first base station and a second base station that is closest to the first base station at the one side of the first base station and has no mobile body connected thereto is greater than the distance between the first base station and a third base station that is closest to the first base station at the other side of the first base station and has no mobile body connected thereto, causing both the first guidance signal transmission unit and the second guidance signal transmission unit of the first base station to transmit the first guidance signal, in a case where the connection detection unit of the first base station has detected that the mobile body is connected, and the distance between the first base station and the second base station is less than the distance between the first base station and the third base station, causing both the first guidance signal transmission unit and the second guidance signal transmission unit of the first base station to transmit the second guidance signal, and, in a case where the connection detection unit of the first base station has detected that the mobile body is connected, and the distance between the first base station and the second base station is equal to the distance between the first base station and the third base station, causing the first guidance signal transmission unit of the first base station to transmit the second guidance signal, and also causing the second guidance signal transmission unit of the first base station to transmit the first guidance signal.

According to this configuration, each of the plurality of mobile bodies is to be connected to the plurality of base stations. The plurality of mobile bodies are guided to the plurality of base stations by the guidance control unit. The first guidance signal transmission unit transmits, to one side of the base station, the first guidance signal that guides a mobile body in a direction from the one side of the base station to the other side, or the second guidance signal that guides a mobile body in a direction from the other side of the base station to the one side. The second guidance signal transmission unit transmits the first guidance signal or the second guidance signal to the other side of the base station. The connection detection unit detects whether or not the mobile body is connected to the base station. Then, in a case where the connection detection unit of the first base station from among the plurality of base stations has detected that no mobile body is connected, the first guidance signal is transmitted by the first guidance signal transmission unit of the first base station, and the second guidance signal is transmitted by the second guidance signal transmission unit of the first base station. In a case where the connection detection unit of the first base station has detected that the mobile body is connected, and the distance between the first base station and the second base station that is closest to the first base station at the one side of the first base station and has no mobile body connected thereto is greater than the distance between the first base station and the third base station that is closest to the first base station at the other side of the first base station and has no mobile body connected thereto, the first guidance signal is transmitted by both the first guidance signal transmission unit and the second guidance signal transmission unit of the first base station. In a case where the connection detection unit of the first base station has detected that the mobile body is connected, and the distance between the first base station and the second base station is less than the distance between the first base station and the third base station, the second guidance signal is transmitted by both the first guidance signal transmission unit and the second guidance signal transmission unit of the first base station. In a case where the connection detection unit of the first base station has detected that the mobile body is connected, and the distance between the first base station and the second base station is equal to the distance between the first base station and the third base station, the second guidance signal is transmitted by the first guidance signal transmission unit of the first base station, and also the first guidance signal is transmitted by the second guidance signal transmission unit of the first base station.

Consequently, using the first guidance signal and the second guidance signal transmitted from a base station to which a mobile body is already connected, another mobile body that is not connected to a base station can be guided to another base station having no mobile body connected thereto, the plurality of mobile bodies can be reliably returned to each of the plurality of base stations, and also the time taken for all of the plurality of mobile bodies to return to each of the plurality of base stations can be shortened.

Furthermore, in the mobile body base station composite body, the distance may be Euclidean distance. According to this configuration, the distance between the second base station and the first base station and the distance between the third base station and the first base station are represented by Euclidean distance, and therefore a comparison of the distance between the second base station and the first base station and the distance between the third base station and the first base station can be carried out precisely.

Furthermore, in the mobile body base station composite body, the distance may be represented by the number of base stations having a mobile body connected thereto, present between the second base station or the third base station and the first base station.

According to this configuration, the distance between the second base station and the first base station and the distance between the third base station and the first base station are represented by the number of base stations having a mobile body connected thereto, present between the second base station or the third base station and the first base station, and therefore a comparison of the distance between the second base station and the first base station and the distance between the third base station and the first base station can be carried out easily.

Furthermore, in the mobile body base station composite body, the first guidance signal transmission unit and the second guidance signal transmission unit may be arranged in such a way that an overlapping region, in which a region in which the first guidance signal is transmitted and a region in which the second guidance signal is transmitted overlap, is formed at the front of the base station, and the mobile body may be guided to the front of the base station while detecting the overlapping region.

According to this configuration, the first guidance signal transmission unit and the second guidance signal transmission unit are arranged in such a way that an overlapping region, in which a region in which the first guidance signal is transmitted and a region in which the second guidance signal is transmitted overlap, is formed at the front of the base station. A mobile body is guided to the front of the base station while detecting the overlapping region.

Consequently, the mobile body can be guided to the front of the base station due to the overlapping region in which a region in which the first guidance signal is transmitted and a region in which the second guidance signal is transmitted overlap.

Furthermore, in the mobile body base station composite body, each of the base stations may be further provided with a front guidance signal transmission unit that is arranged between the first guidance signal transmission unit and the second guidance signal transmission unit, and transmits a front guidance signal for guiding the mobile body to the front of the base station.

According to this configuration, a front guidance signal for guiding the mobile body to the front of the base station is transmitted by the front guidance signal transmission unit that is arranged between the first guidance signal transmission unit and the second guidance signal transmission unit.

Consequently, the mobile body is guided to the front of the base station by the front guidance signal transmitted from between the first guidance signal transmission unit and the second guidance signal transmission unit.

Furthermore, in the mobile body base station composite body, the mobile body base station composite body may be further provided with a main body unit that includes the guidance control unit, and the plurality of base stations may be arranged in a radial form with respect to the main body unit.

According to this configuration, since the plurality of base stations are arranged in a radial form with respect to the main body unit, the mobile body base station composite body can be reduced in size.

Furthermore, in the mobile body base station composite body, the mobile body base station composite body may be further provided with a distance storage unit that stores the distances among the base stations, and the guidance control unit may calculate the distance between the second base station and the first base station and the distance between the third base station and the first base station on the basis of the distances stored in the distance storage unit.

According to this configuration, the distance storage unit stores the distances among the base stations. The distance between the second base station and the first base station and the distance between the third base station and the first base station are calculated on the basis of the distances stored in the distance storage unit, and therefore the distance between the second base station and the first base station and the distance between the third base station and the first base station can be calculated easily.

A mobile body base station according to another aspect of the present disclosure is a mobile body base station to which one mobile body from among a plurality of mobile bodies is to be connected, provided with: a first guidance signal transmission unit that transmits, to one side of the mobile body base station, a first guidance signal that guides the one mobile body in a direction from the one side of the mobile body base station to the other side, or a second guidance signal that guides the one mobile body in a direction from the other side of the mobile body base station to the one side; a second guidance signal transmission unit that transmits the first guidance signal or the second guidance signal to the other side of the mobile body base station; a connection detection unit that detects whether or not the one mobile body is connected to the mobile body base station; and a guidance control unit that guides the one mobile body to the mobile body base station, and also guides other mobile bodies to other mobile body base stations, the guidance control unit, in a case where the connection detection unit has detected that the one mobile body is not connected, causing the first guidance signal transmission unit to transmit the first guidance signal, and also causing the second guidance signal transmission unit to transmit the second guidance signal, in a case where the connection detection unit has detected that the one mobile body is connected, and the distance between the mobile body base station and a first other mobile body base station that is closest to the mobile body base station at the one side of the mobile body base station and to which a first other mobile body is not connected is greater than the distance between the mobile body base station and a second other mobile body base station that is closest to the mobile body base station at the other side of the mobile body base station and to which a second other mobile body is not connected, causing both the first guidance signal transmission unit and the second guidance signal transmission unit to transmit the first guidance signal, in a case where the connection detection unit has detected that the one mobile body is connected, and the distance between the mobile body base station and the first other mobile body base station is less than the distance between the mobile body base station and the second other mobile body base station, causing both the first guidance signal transmission unit and the second guidance signal transmission unit to transmit the second guidance signal, and, in a case where the connection detection unit has detected that the one mobile body is connected, and the distance between the mobile body base station and the first other mobile body base station is equal to the distance between the mobile body base station and the second other mobile body base station, causing the first guidance signal transmission unit to transmit the second guidance signal, and also causing the second guidance signal transmission unit to transmit the first guidance signal.

According to this configuration, one mobile body from among the plurality of mobile bodies is to be connected to the mobile body base station. The first guidance signal transmission unit transmits, to the one side of the mobile body base station, the first guidance signal that guides the one mobile body in a direction from the one side of the mobile body base station to the other side, or the second guidance signal that guides the one mobile body in a direction from the other side of the mobile body base station to the one side. The second guidance signal transmission unit transmits the first guidance signal or the second guidance signal to the other side of the mobile body base station. The connection detection unit detects whether or not the one mobile body is connected to the mobile body base station. The guidance control unit guides the one mobile body to the mobile body base station, and also guides other mobile bodies to other mobile body base stations. Then, in a case where the connection detection unit has detected that the one mobile body is not connected, the first guidance signal is transmitted by the first guidance signal transmission unit, and also the second guidance signal is transmitted by the second guidance signal transmission unit. In a case where the connection detection unit has detected that the one mobile body is connected, and the distance between the mobile body base station and the first other mobile body base station that is closest to the mobile body base station at the one side of the mobile body base station and to which the first other mobile body is not connected is greater than the distance between the mobile body base station and the second other mobile body base station that is closest to the mobile body base station at the other side of the mobile body base station and to which the second other mobile body is not connected, the first guidance signal is transmitted by both the first guidance signal transmission unit and the second guidance signal transmission unit. In a case where the connection detection unit has detected that the one mobile body is connected, and the distance between the mobile body base station and the first other mobile body base station is less than the distance between the mobile body base station and the second other mobile body base station, the second guidance signal is transmitted by both the first guidance signal transmission unit and the second guidance signal transmission unit. In a case where the connection detection unit has detected that the one mobile body is connected, and the distance between the mobile body base station and the first other mobile body base station is equal to the distance between the mobile body base station and the second other mobile body base station, the second guidance signal is transmitted by the first guidance signal transmission, and also the first guidance signal is transmitted by the second guidance signal transmission unit.

Consequently, using the first guidance signal and the second guidance signal transmitted from a mobile body base station to which a mobile body is already connected, another mobile body that is not connected to a mobile body base station can be guided to another mobile body base station having no mobile body connected thereto, the plurality of mobile bodies can be reliably returned to each of the plurality of mobile body base stations, and also the time taken for all of the plurality of mobile bodies to return to each of the plurality of mobile body base stations can be shortened.

Furthermore, the mobile body base station may be further provided with: a connection information transmission unit that transmits, to the other mobile body base stations, connection information indicating whether or not the one mobile body is connected to the mobile body base station; a distance storage unit that stores the distances between the other mobile body base stations and the mobile body base station; and a connection information reception unit that receives the connection information transmitted by the other mobile body base stations, and the guidance control unit may calculate the distance between the first other mobile body base station and the mobile body base station and the distance between the second other mobile body base station and the mobile body base station on the basis of the distances stored in the distance storage unit and the connection information received by the connection information reception unit.

According to this configuration, connection information indicating whether or not the one mobile body is connected to the mobile body base station is transmitted to the other mobile body base stations. The distance storage unit stores the distances between the other mobile body base stations and the mobile body base station. Connection information transmitted by the other mobile body base stations is received. The distance between the first other mobile body base station and the mobile body base station and the distance between the second other mobile body base station and the mobile body base station are calculated on the basis of the distances stored in the distance storage unit and the connection information received by the connection information reception unit.

Consequently, the distance between the first other mobile body base station and the mobile body base station and the distance between the second other mobile body base station and the mobile body base station can be calculated easily.

Furthermore, the mobile body base station may be further provided with: a connection information transmission unit that transmits connection information indicating whether or not the one mobile body is connected to the mobile body base station, to a management device connected to the mobile body base station via a network; and a distance reception unit that receives, from the management device, distance information indicating the distance between the first other mobile body base station and the mobile body base station and the distance between the second other mobile body base station and the mobile body base station.

According to this configuration, the connection information indicating whether or not the one mobile body is connected to the mobile body base station is transmitted to the management device connected to the mobile body base station via the network. The distance information indicating the distance between the first other mobile body base station and the mobile body base station and the distance between the second other mobile body base station and the mobile body base station is received from the management device.

Consequently, the connection information and the distance information are received from the management device connected to the mobile body base station via the network, and therefore the mobile body base station may not store the connection information and the distance information, and memory storage capacity can be reduced.

A mobile body guidance method according to another aspect of the present disclosure is a mobile body guidance method in a mobile body base station composite body provided with a plurality of base stations to which each of a plurality of mobile bodies is to be connected, and a guidance control unit that guides the plurality of mobile bodies to the plurality of base stations, each of the plurality of base stations being provided with: a first guidance signal transmission unit that transmits, to one side of the base station, a first guidance signal that guides a mobile body in a direction from the one side of the base station to the other side, or a second guidance signal that guides a mobile body in a direction from the other side of the base station to the one side; a second guidance signal transmission unit that transmits the first guidance signal or the second guidance signal to the other side of the base station; and a connection detection unit that detects whether or not a mobile body is connected to the base station, the guidance control unit, in a case where the connection detection unit of a first base station from among the plurality of base stations has detected that the mobile body is not connected, causing the first guidance signal transmission unit of the first base station to transmit the first guidance signal, and also causing the second guidance signal transmission unit of the first base station to transmit the second guidance signal, the guidance control unit, in a case where the connection detection unit of the first base station has detected that the mobile body is connected, and the distance between the first base station and a second base station that is closest to the first base station at the one side of the first base station and has no mobile body connected thereto is greater than the distance between the first base station and a third base station that is closest to the first base station at the other side of the first base station and has no mobile body connected thereto, causing both the first guidance signal transmission unit and the second guidance signal transmission unit of the first base station to transmit the first guidance signal, the guidance control unit, in a case where the connection detection unit of the first base station has detected that the mobile body is connected, and the distance between the first base station and the second base station is less than the distance between the first base station and the third base station, causing both the first guidance signal transmission unit and the second guidance signal transmission unit of the first base station to transmit the second guidance signal, and the guidance control unit, in a case where the connection detection unit of the first base station has detected that the mobile body is connected, and the distance between the first base station and the second base station is equal to the distance between the first base station and the third base station, causing the first guidance signal transmission unit of the first base station to transmit the second guidance signal, and also causing the second guidance signal transmission unit of the first base station to transmit the first guidance signal.

According to this configuration, each of the plurality of mobile bodies is to be connected to the plurality of base stations. The plurality of mobile bodies are guided to the plurality of base stations by the guidance control unit. The first guidance signal transmission unit transmits, to one side of the base station, the first guidance signal that guides a mobile body in a direction from the one side of the base station to the other side, or the second guidance signal that guides a mobile body in a direction from the other side of the base station to the one side. The second guidance signal transmission unit transmits the first guidance signal or the second guidance signal to the other side of the base station. The connection detection unit detects whether or not the mobile body is connected to the base station. In a case where the connection detection unit of the first base station from among the plurality of base stations has detected that no mobile body is connected, the first guidance signal is transmitted by the first guidance signal transmission unit of the first base station, and the second guidance signal is transmitted by the second guidance signal transmission unit of the first base station. In a case where the connection detection unit of the first base station has detected that the mobile body is connected, and the distance between the first base station and the second base station that is closest to the first base station at the one side of the first base station and has no mobile body connected thereto is greater than the distance between the first base station and the third base station that is closest to the first base station at the other side of the first base station and has no mobile body connected thereto, the first guidance signal is transmitted by both the first guidance signal transmission unit and the second guidance signal transmission unit of the first base station. In a case where the connection detection unit of the first base station has detected that the mobile body is connected, and the distance between the first base station and the second base station is less than the distance between the first base station and the third base station, the second guidance signal is transmitted by both the first guidance signal transmission unit and the second guidance signal transmission unit of the first base station. In a case where the connection detection unit of the first base station has detected that the mobile body is connected, and the distance between the first base station and the second base station is equal to the distance between the first base station and the third base station, the second guidance signal is transmitted by the first guidance signal transmission unit of the first base station, and also the first guidance signal is transmitted by the second guidance signal transmission unit of the first base station.

Consequently, using the first guidance signal and the second guidance signal transmitted from a base station to which a mobile body is already connected, another mobile body that is not connected to a base station can be guided to another base station having no mobile body connected thereto, the plurality of mobile bodies can be reliably returned to each of the plurality of base stations, and also the time taken for all of the plurality of mobile bodies to return to each of the plurality of base stations can be shortened.

Hereinafter, embodiments of the present disclosure will be described with reference to the appended drawings. It should be noted that the embodiments hereinafter are exemplary embodiments of the present disclosure, and do not restrict the technical scope of the present disclosure.

Embodiment 1

Figure 2:
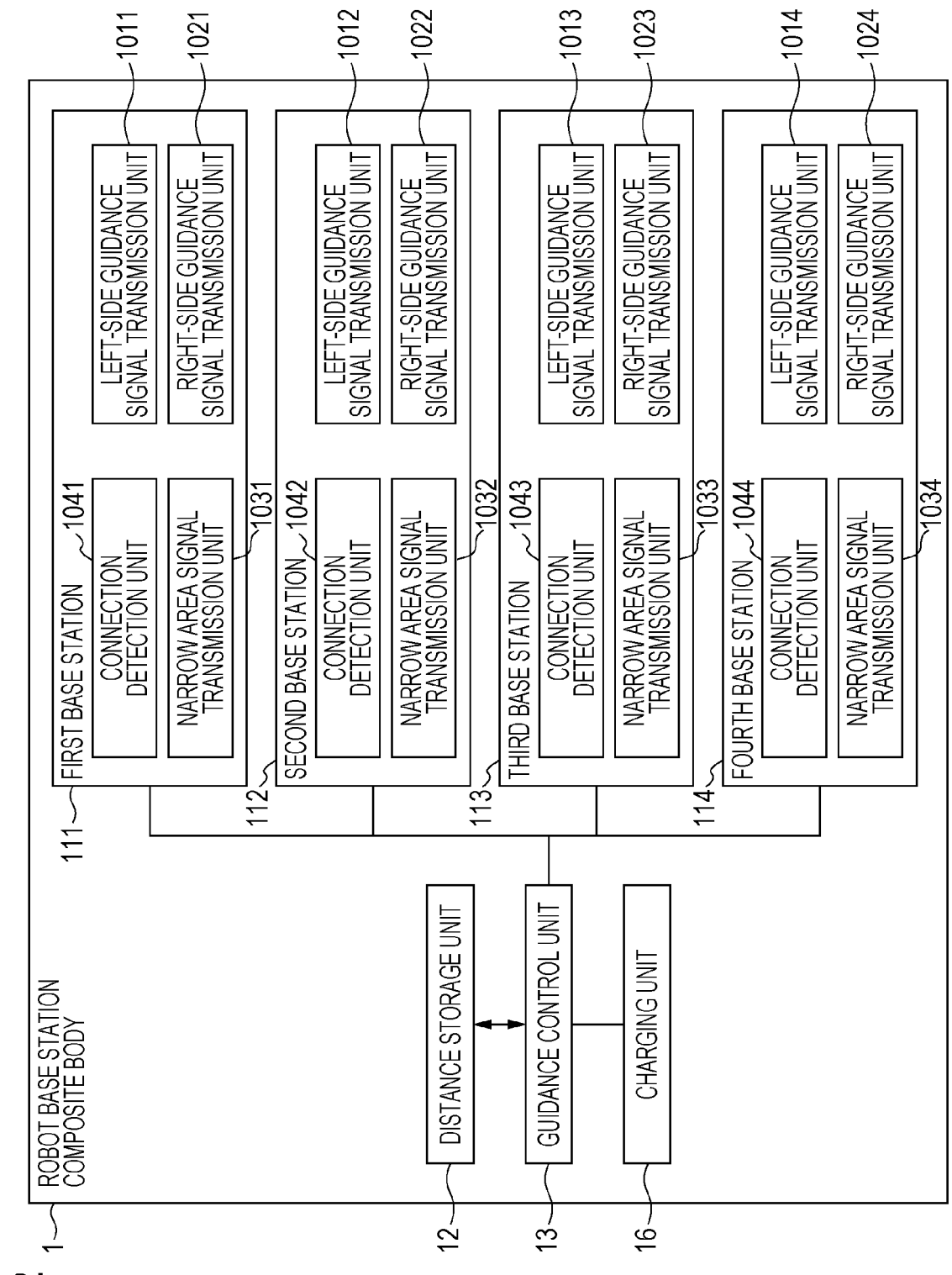
FIG. 2 is a block diagram depicting an example of a functional configuration of the robot base station composite body in embodiment 1 of the present disclosure.

FIG. 1 is a drawing depicting an example of an overall configuration of a robot base station composite body in embodiment 1 of the present disclosure, and FIG. 2 is a block diagram depicting an example of a functional configuration of the robot base station composite body in embodiment 1 of the present disclosure. It should be noted that FIG. 1 is a drawing in which a robot base station composite body 1 is seen from above.

The robot base station composite body 1 depicted in FIGS. 1 and 2 is provided with a first base station 111, a second base station 112, a third base station 113, a fourth base station 114, a distance storage unit 12, a guidance control unit 13, and a charging unit 16. The robot base station composite body 1 is an example of a mobile body base station composite body, and a plurality of robots are to be connected thereto.

The robots are to be connected to each of the first base station 111, the second base station 112, the third base station 113, and the fourth base station 114. It should be noted that the robot base station composite body 1 is further provided with a main body unit 30 that includes the guidance control unit 13, and the first base station 111, the second base station 112, the third base station 113, and the fourth base station 114 are arranged in a radial form with respect to the main body unit 30. It should be noted that the first base station 111, the second base station 112, the third base station 113, and the fourth base station 114 are not restricted to the arrangement depicted in FIG. 1, and may be arranged in a linear form, for example, or may have another arrangement.

The guidance control unit 13 guides the plurality of robots to the first base station 111, the second base station 112, the third base station 113, and the fourth base station 114. The distance storage unit 12 stores the distances among the base stations. For example, the distance storage unit 12 may store the distance between the first base station 111 and other base stations (the second base station 112, the third base station 113, and the fourth base station 114) that are present at the left side (counterclockwise) and the right side (clockwise) of the first base station 111, and may store the distance between the second base station 112 and other base stations, the distance between the third base station 113 and other base stations, and the distance between the fourth base station 114 and other base stations. For example, the second base station 112, the third base station 113, and the fourth base station 114 are arranged in said order at the left side of the first base station 111, and therefore, at the left side of the first base station 111, "1" may be taken as the distance between the first base station 111 and the second base station 112, "2" may be taken as the distance between the first base station 111 and the third base station 113, and "3" may be taken as the distance between the first base station 111 and the fourth base station 114. Furthermore, for example, the fourth base station 114, the third base station 113, and the second base station 112 are arranged in said order at the right side of the first base station 111, and therefore, at the right side of the first base station 111, "1" may be taken as the distance between the first base station 111 and the fourth base station 114, "2" may be taken as the distance between the first base station 111 and the third base station 113, and "3" may be taken as the distance between the first base station 111 and the second base station 112. In this way, the distances among the base stations may be represented by the number of base stations that are present between one base station and another base station.

In the present embodiment 1, the distance storage unit 12 stores information relating to distance in advance; however, it should be noted that the present disclosure is not particularly restricted thereto, and the robot base station composite body 1 may acquire information relating to distance from an external device such as a server.

The first base station 111 is provided with a left-side guidance signal transmission unit 1011, a right-side guidance signal transmission unit 1021, a narrow area signal transmission unit 1031, and a connection detection unit 1041.

The left-side guidance signal transmission unit 1011 transmits, to the left side (one side) of the first base station 111, a first guidance signal that guides a robot in a direction from the left side (the one side) of the first base station 111 to the right side (the other side), or a second guidance signal that guides a robot in a direction from the right side (the other side) of the first base station 111 to the left side (the one side). The left-side guidance signal transmission unit 1011 is an example of a first guidance signal transmission unit. Furthermore, the first guidance signal and the second guidance signal are infrared signals, for example.

The right-side guidance signal transmission unit 1021 transmits the first guidance signal or the second guidance signal to the right side (the other side) of the first base station 111. The right-side guidance signal transmission unit 1021 is an example of a second guidance signal transmission unit.

The narrow area signal transmission unit 1031 is arranged between the left-side guidance signal transmission unit 1011 and the right-side guidance signal transmission unit 1021, and transmits a narrow area signal (front guidance signal) for guiding a robot 2 to the front of the first base station 111. The narrow area signal transmission unit 1031 transmits the narrow area signal to the front of the first base station 111. The narrow area signal has a narrower angle than the first guidance signal and the second guidance signal, and has an emission angle of 30 to 60 degrees, for example. It should be noted that narrow area signal transmission unit 1031 may transmit the narrow area signal only in a case where the left-side guidance signal transmission unit 1011 transmits the first guidance signal and also the right-side guidance signal transmission unit 1021 transmits the second guidance signal.

The connection detection unit 1041 detects whether or not a robot is connected to the first base station 111.

The second base station 112 is provided with a left-side guidance signal transmission unit 1012, a right-side guidance signal transmission unit 1022, a narrow area signal transmission unit 1032, and a connection detection unit 1042. The third base station 113 is provided with a left-side guidance signal transmission unit 1013, a right-side guidance signal transmission unit 1023, a narrow area signal transmission unit 1033, and a connection detection unit 1043. The fourth base station 114 is provided with a left-side guidance signal transmission unit 1014, a right-side guidance signal transmission unit 1024, a narrow area signal transmission unit 1034, and a connection detection unit 1044.

It should be noted that the configuration of the left-side guidance signal transmission unit 1012, the left-side guidance signal transmission unit 1013, and the left-side guidance signal transmission unit 1014 is the same as that of the left-side guidance signal transmission unit 1011, and therefore a description thereof is omitted. Furthermore, the configuration of the right-side guidance signal transmission unit 1022, the right-side guidance signal transmission unit 1023, and the right-side guidance signal transmission unit 1024 is the same as that of the right-side guidance signal transmission unit 1021, and therefore a description thereof is omitted. Furthermore, the configuration of the narrow area signal transmission unit 1032, the narrow area signal transmission unit 1033, and the narrow area signal transmission unit 1034 is the same as that of the narrow area signal transmission unit 1031, and therefore a description thereof is omitted. Furthermore, the configuration of the connection detection unit 1042, the connection detection unit 1043, and the connection detection unit 1044 is the same as that of the connection detection unit 1041, and therefore a description thereof is omitted.

In a case where the connection detection unit 1041 of the first base station 111 from among the plurality of base stations has detected that no robot is connected, the guidance control unit 13 causes the left-side guidance signal transmission unit 1011 of the first base station 111 to transmit the first guidance signal, and also causes the right-side guidance signal transmission unit 1021 of the first base station 111 to transmit the second guidance signal.

Furthermore, in a case where the connection detection unit 1041 of the first base station 111 has detected that a robot is connected, and the distance between the first base station 111 and the base station that is closest to the first base station 111 at the left side (one side) of the first base station 111 and has no robot connected thereto is greater than the distance between the first base station 111 and the base station that is closest to the first base station 111 at the right side (the other side) of the first base station 111 and has no robot connected thereto, the guidance control unit 13 causes both the left-side guidance signal transmission unit 1011 and the right-side guidance signal transmission unit 1021 of the first base station 111 to transmit the first guidance signal.

It should be noted that the guidance control unit 13 calculates the distance between the first base station 111 and the base station that is closest to the first base station 111 at the left side (the one side) of the first base station 111 and has no robot connected thereto, and also calculates the distance between the first base station 111 and the base station that is closest to the first base station 111 at the right side (the other side) of the first base station 111 and has no robot connected thereto, on the basis of the distances stored in the distance storage unit 12.

Furthermore, in a case where the connection detection unit 1041 of the first base station 111 has detected that a robot is connected, and the distance between the first base station 111 and the base station that is closest to the first base station 111 at the left side (the one side) of the first base station 111 and has no robot connected thereto is less than the distance between the first base station 111 and the base station that is closest to the first base station 111 at the right side (the other side) of the first base station 111 and has no robot connected thereto, the guidance control unit 13 causes both the left-side guidance signal transmission unit 1011 and the right-side guidance signal transmission unit 1021 of the first base station 111 to transmit the second guidance signal.

Furthermore, in a case where the connection detection unit 1041 of the first base station 111 has detected that a robot is connected, and the distance between the first base station 111 and the base station that is closest to the first base station 111 at the left side (the one side) of the first base station 111 and has no robot connected thereto is equal to the distance between the first base station 111 and the base station that is closest to the first base station 111 at the right side (the other side) of the first base station 111 and has no robot connected thereto, the guidance control unit 13 causes the left-side guidance signal transmission unit 1011 of the first base station 111 to transmit the second guidance signal, and also causes the right-side guidance signal transmission unit 1021 to transmit the first guidance signal.

It should be noted that the operation of the guidance control unit 13 with respect to the second base station 112, the third base station 113, and the fourth base station 114 is the same as the operation of the guidance control unit 13 with respect to the first base station 111, and therefore a description thereof is omitted.

The charging unit 16 carries out charging with respect to a storage battery provided in robots 2 connected to the first base station 111, the second base station 112, the third base station 113, and the fourth base station 114. Charging contacts (not depicted) are arranged in each of the first base station 111, the second base station 112, the third base station 113, and the fourth base station 114, and charging contacts are arranged on the undersides of the robots 2. When a robot 2 is connected to the first base station 111, the second base station 112, the third base station 113, or the fourth base station 114, the charging contact of the robot 2 and the charging contact of the first base station 111, the second base station 112, the third base station 113, or the fourth base station 114 make contact, and charging to the storage battery of the robot 2 is started.

Following on, a robot in embodiment 1 will be described.

Figure 3:
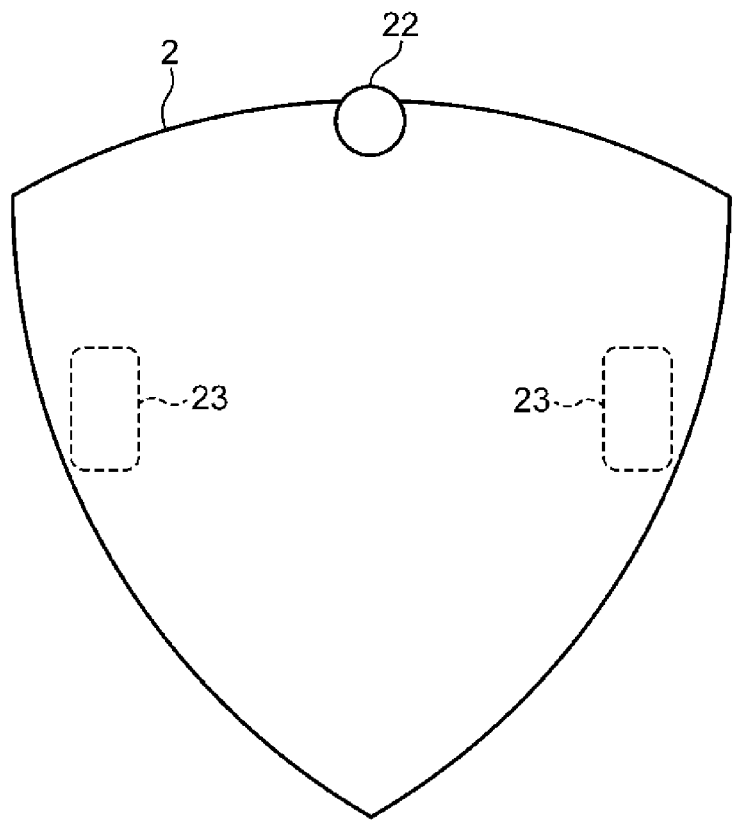
FIG. 3 is a drawing depicting an example of an overall configuration of a robot in embodiment 1 of the present disclosure.
Figure 4:
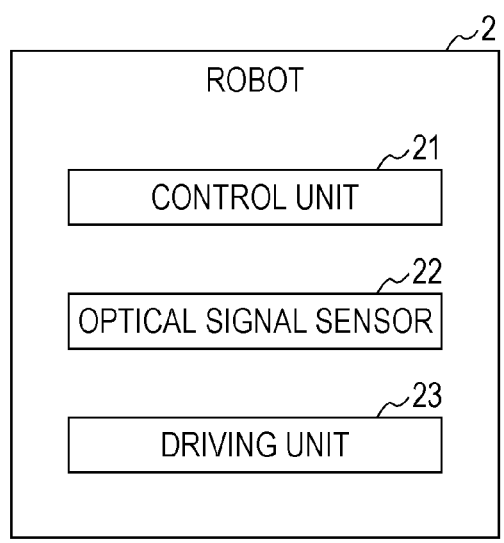
FIG. 4 is a block diagram depicting an example of a functional configuration of the robot in embodiment 1 of the present disclosure.

FIG. 3 is a drawing depicting an example of an overall configuration of a robot in embodiment 1 of the present disclosure, and FIG. 4 is a block diagram depicting an example of a functional configuration of the robot in embodiment 1 of the present disclosure. It should be noted that the robot 2 is an example of a mobile body. In the present embodiment 1, a cleaning robot that carries out suction cleaning while moving autonomously is described as an example of a mobile body.

The robot 2 executes a predetermined task while moving autonomously on a two-dimensional level surface. The predetermined task executed by the robot 2 is cleaning of a floor surface. The robot 2 is provided with a control unit 21, an optical signal sensor 22, and driving units 23. It should be noted that the robot 2 in the present embodiment 1 is provided with a configuration for carrying out suction cleaning, a distance sensor, a contact sensor, and the like, but these are omitted in FIG. 3. Furthermore, the robot 2 may be an inspection robot that inspects the floor surface while moving autonomously, or may be another robot that executes a predetermined task while moving autonomously.

The optical signal sensor 22 is installed in a forward portion of the robot 2, and receives the first guidance signal, the second guidance signal, and the narrow area signal transmitted from the robot base station composite body 1.

The driving units 23 cause the robot 2 to move. The driving units 23 include driving wheels for causing the robot 2 to move and a motor that drives the driving wheels. The driving wheels are installed in a bottom section of the robot 2.

The control unit 21 is a CPU (central processing unit), for example, and controls the movement of the robot 2. The control unit 21 causes the robot 2 to return to the robot base station composite body 1 in a case where the predetermined task such as cleaning has been completed, or in a case where the remaining amount of the built-in storage battery (not depicted) has become equal to or less than a threshold value. In a case where the second guidance signal has been received by the optical signal sensor 22, the control unit 21 causes the robot 2 to move to the right (the left when seen from the base station) with respect to the advancing direction. Furthermore, in a case where the first guidance signal has been received by the optical signal sensor 22, the control unit 21 causes the robot 2 to move to the left (the right when seen from the base station) with respect to the advancing direction. A robot 2 is thereby guided toward the center of each base station.

Furthermore, in a case where the narrow area signal has been received by the optical signal sensor 22, the control unit 21 controls the movement of the robot 2 in such a way that the optical signal sensor 22 constantly receives the narrow area signal, and causes the robot 2 to approach a base station. Thus, the robot 2 moves precisely toward the central portion of a base station, and docks at the base station. When the robot 2 docks at the base station, the charging unit 16 starts charging the storage battery provided in the robot 2.

Following on, the first guidance signal, the second guidance signal, and the narrow area signal transmitted by the robot base station composite body 1 will be described.

Figure 5:
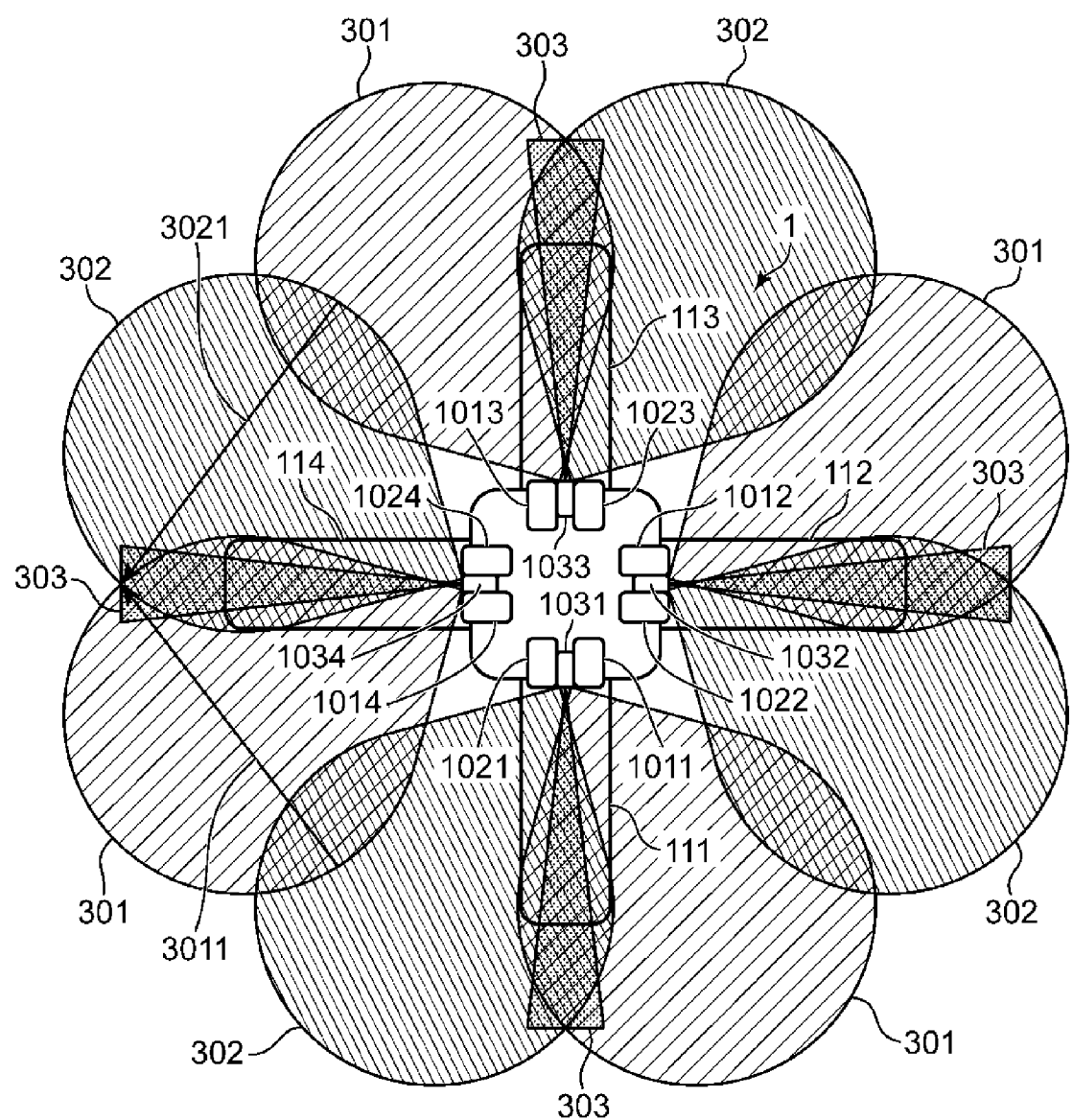
FIG. 5 is a schematic diagram for describing a first guidance signal, a second guidance signal, and a narrow area signal transmitted from the robot base station composite body in a case where no robots are connected to the robot base station composite body in embodiment 1 of the present disclosure.

FIG. 5 is a schematic diagram for describing the first guidance signal, the second guidance signal, and the narrow area signal transmitted from the robot base station composite body in a case where no robots are connected to the robot base station composite body in embodiment 1 of the present disclosure.

As depicted in FIG. 5, in a case where no robots 2 are connected to the robot base station composite body 1, the left-side guidance signal transmission units 1011, 1012, 1013, and 1014 of each base station 111, 112, 113, and 114 transmit, to the left side of each base station 111, 112, 113, and 114, a first guidance signal 301 that guides a robot 2 in a direction (the direction of an arrow 3011) from the left side of each base station 111, 112, 113, and 114 to the right side. In other words, the left-side guidance signal transmission units 1011, 1012, 1013, and 1014 transmit, to the left side of each base station 111, 112, 113, and 114, the first guidance signal 301 which guides a robot 2 in a direction from the left side of each base station 111, 112, 113, and 114 toward the central axis of each base station 111, 112, 113, and 114.

Furthermore, in the case where no robots 2 are connected to the robot base station composite body 1, the right-side guidance signal transmission units 1021, 1022, 1023, and 1024 of each base station 111, 112, 113, and 114 transmit, to the right side of each base station 111, 112, 113, and 114, a second guidance signal 302 that guides a robot 2 in a direction (the direction of an arrow 3021) from the right side of each base station 111, 112, 113, and 114 to the left side. In other words, the right-side guidance signal transmission units 1021, 1022, 1023, and 1024 of each base station 111, 112, 113, and 114 transmit, to the right side of each base station 111, 112, 113, and 114, the second guidance signal 302 which guides a robot 2 in a direction (the direction of the arrow 3021) from the right side of each base station 111, 112, 113, and 114 toward the central axis of each base station 111, 112, 113, and 114.

In addition, the narrow area signal transmission units 1031, 1032, 1033, and 1034 of each base station 111, 112, 113, and 114 transmit, to the front of each base station 111, 112, 113, and 114, a narrow area signal 303 that guides a robot 2 to the front of each base station 111, 112, 113, and 114. It should be noted that the narrow area signal 303 is omitted in the drawings described hereinafter.

It should be noted that the ranges reached by the first guidance signal 301, the second guidance signal 302, and the narrow area signal 303 in FIG. 5 are each schematically depicted, and the actual sizes are different. Furthermore, the arrows 3011 and 3021 indicate directions in which a robot 2 is guided.

Furthermore, in the present embodiment 1, the robot base station composite body 1 is provided with four base stations 111, 112, 113, and 114; however, the present disclosure is not particularly restricted thereto, and may be provided with two base stations, three base stations, or five or more base stations.

Figure 6:
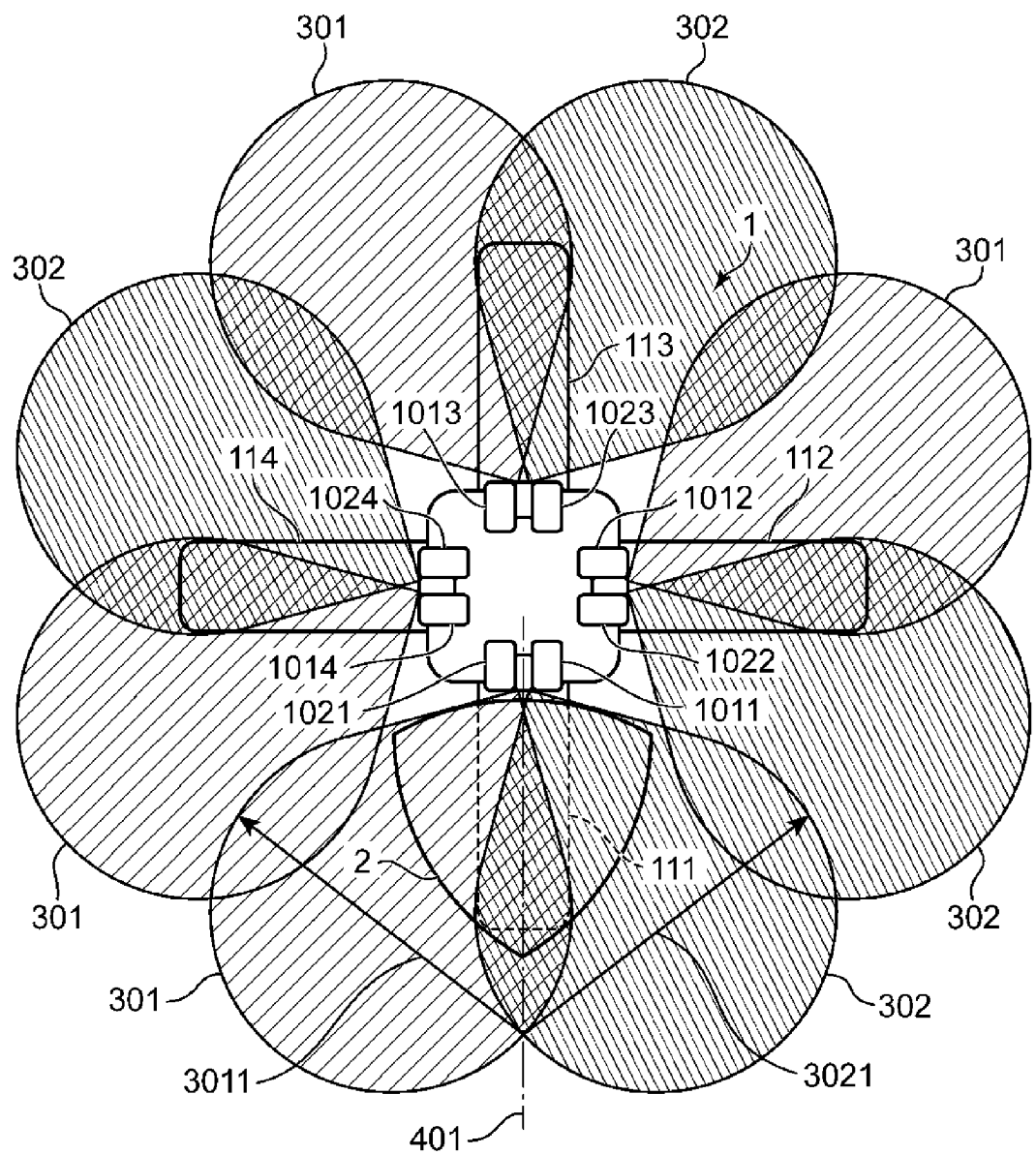
FIG. 6 is a schematic diagram for describing the first guidance signal and the second guidance signal transmitted from the robot base station composite body in a case where one robot is connected to the robot base station composite body in embodiment 1 of the present disclosure.

FIG. 6 is a schematic diagram for describing the first guidance signal and the second guidance signal transmitted from the robot base station composite body in a case where one robot is connected to the robot base station composite body in embodiment 1 of the present disclosure.

In FIG. 6, a robot 2 is connected to only the first base station 111. It should be noted that the base station to which the robot 2 is connected is not particularly determined, and the robot 2 may be connected to any base station from among the plurality of base stations.

As depicted in FIG. 6, in the case where a robot 2 is connected to only the first base station 111 of the robot base station composite body 1, the left-side guidance signal transmission unit 1011 of the first base station 111 transmits, to the left side of the first base station 111, the second guidance signal 302 which guides a robot 2 in a direction (the direction of the arrow 3021) from the right side of the first base station 111 to the left side. In other words, the left-side guidance signal transmission unit 1011 transmits, to the left side of the first base station 111, the second guidance signal 302 which guides a robot 2 in a direction from the central axis of the first base station 111 to the left side of the first base station 111.

Furthermore, in the case where a robot 2 is connected to only the first base station 111 of the robot base station composite body 1, the right-side guidance signal transmission unit 1021 of the first base station 111 transmits, to the right side of the first base station 111, the first guidance signal 301 which guides a robot 2 in a direction (the direction of the arrow 3011) from the left side of the first base station 111 to the right side. In other words, the right-side guidance signal transmission unit 1021 transmits, to the right side of the first base station 111, the first guidance signal 301 which guides a robot 2 in a direction from the central axis of the first base station 111 to the right side of the first base station 111.

Meanwhile, the left-side guidance signal transmission units 1012, 1013, and 1014 of the base stations 112, 113, and 114 having no robots 2 connected thereto of the robot base station composite body 1 transmit, to the left side of each base station 112, 113, and 114, the first guidance signal 301 which guides a robot 2 in a direction from the left side of each base station 112, 113, and 114 to the right side, and the right-side guidance signal transmission units 1022, 1023, and 1024 of the base stations 112, 113, and 114 transmit, to the right side of each base station 112, 113, and 114, the second guidance signal 302 which guides a robot 2 in a direction from the right side of each base station 112, 113, and 114 to the left side.

In other words, in a case where the connection detection unit 1041 of the first base station 111 has detected that a robot 2 is connected, the guidance control unit 13 calculates the distance between the first base station 111 and the base station that is closest to the first base station 111 at the left side of the first base station 111 and has no robot 2 connected thereto, and also calculates the distance between the first base station 111 and the base station that is closest to the first base station 111 at the right side of the first base station 111 and has no robot 2 connected thereto.

The base station that is closest to the first base station 111 at the left side of the first base station 111 and has no robot 2 connected thereto is the second base station 112, and therefore the guidance control unit 13 calculates the distance between the second base station 112 and the first base station 111. It should be noted that the distance is represented by the number of base stations having a robot 2 connected thereto, present between the second base station 112 and the first base station 111. In FIG. 6, the distance between the second base station 112 and the first base station 111 is 0.

Furthermore, the base station that is closest to the first base station 111 at the right side of the first base station 111 and has no robot 2 connected thereto is the fourth base station 114, and therefore the guidance control unit 13 calculates the distance between the fourth base station 114 and the first base station 111. In FIG. 6, the distance between the fourth base station 114 and the first base station 111 is 0.

The distance between the second base station 112 and the first base station 111 is equal to the distance between the fourth base station 114 and the first base station 111, and therefore the guidance control unit 13 causes the left-side guidance signal transmission unit 1011 of the first base station 111 to transmit the second guidance signal 302, and also causes the right-side guidance signal transmission unit 1021 to transmit the first guidance signal 301.

In this way, in the case where a robot 2 is connected to only the first base station 111 of the robot base station composite body 1, the guidance signal transmitted from the left-side guidance signal transmission unit 1011 of the first base station 111 is switched from the first guidance signal 301 to the second guidance signal 302, and the guidance signal transmitted from the right-side guidance signal transmission unit 1021 of the first base station 111 is switched from the second guidance signal 302 to the first guidance signal 301. The dot-dash line 401 in FIG. 6 indicates a boundary line that bisects the distance between a base station to which a robot 2 has not returned, present to the left of a base station to which a robot 2 has returned, and a base station to which a robot 2 has not returned, present to the right of the base station to which the robot 2 has returned. In the present embodiment 1, the guidance directions to the left and to the right of the boundary line are reallocated, and the guidance directions are inverted.

Thus, another robot 2 that has detected the second guidance signal 302 transmitted from the left-side guidance signal transmission unit 1011 of the first base station 111 to which a robot 2 is connected moves in the direction of the arrow 3021 in which the second base station 112 is present, and is guided toward the second base station 112. Furthermore, another robot 2 that has detected the first guidance signal 301 transmitted from the right-side guidance signal transmission unit 1021 of the first base station 111 to which the robot 2 is connected moves in the direction of the arrow 3011 in which the fourth base station 114 is present, and is guided toward the fourth base station 114.

Consequently, using guidance signals transmitted from a base station to which a robot 2 is already connected, another robot 2 that is not connected to a base station can be guided to a base station having no robot 2 connected thereto, a plurality of robots 2 can be reliably returned to base stations, and also the time taken for all of the plurality of robots 2 to return to the base stations can be shortened.

In the present embodiment 1, distances are represented by the number of base stations having a robot 2 connected thereto, present between the first base station 111 and the base station that is closest to the first base station 111 at the left side (the one side) of the first base station 111 and has no robot 2 connected thereto, and are also represented by the number of base stations having a robot 2 connected thereto, present between the first base station 111 and the base station that is closest to the first base station 111 at the right side (the other side) of the first base station 111 and has no robot 2 connected thereto. However, it should be noted that the present disclosure is not particularly restricted thereto, and distances may be represented by Euclidean distance.

Figure 7:
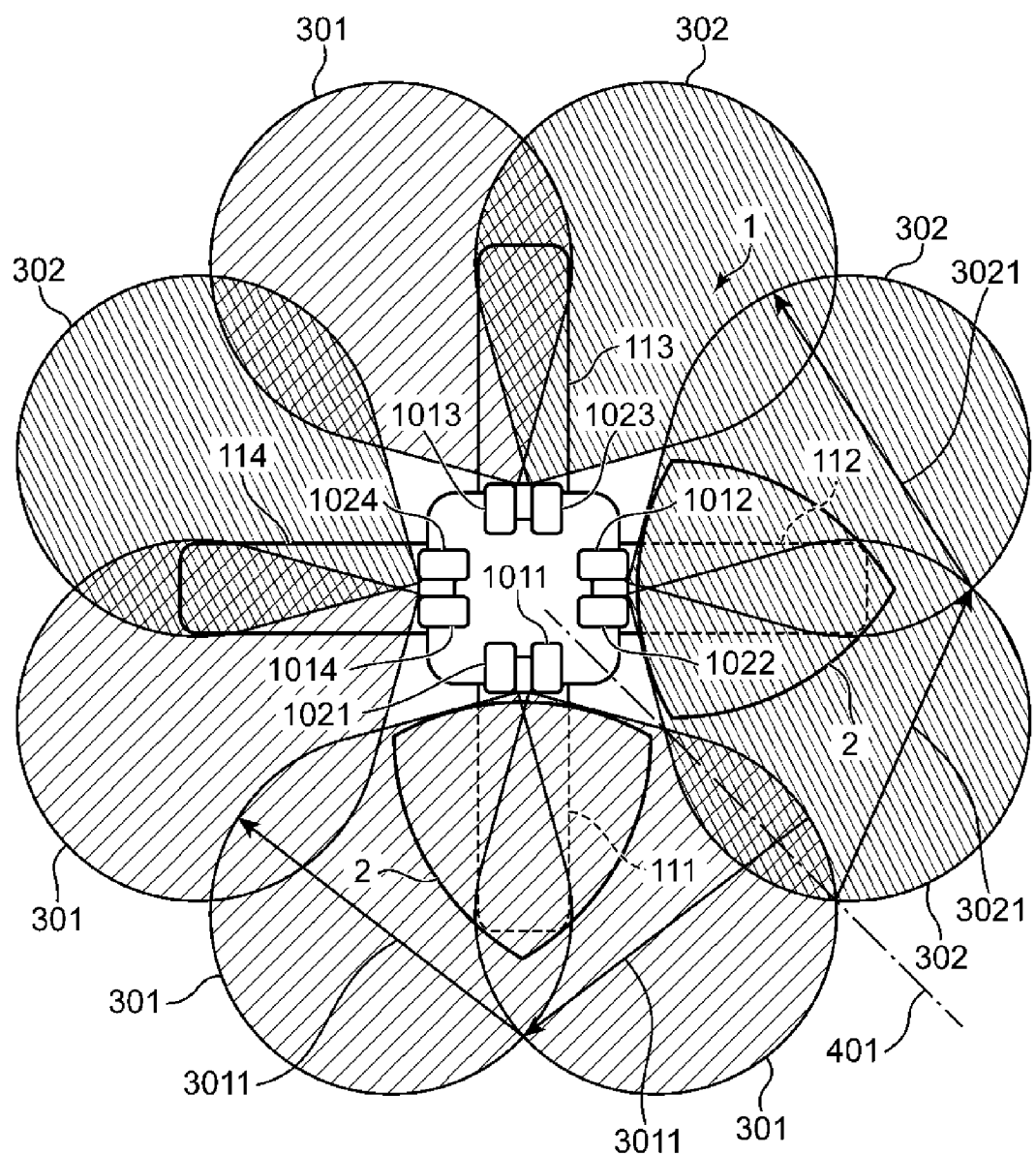
FIG. 7 is a schematic diagram for describing the first guidance signal and the second guidance signal transmitted from the robot base station composite body in a case where two robots are connected in an adjacent manner to the robot base station composite body in embodiment 1 of the present disclosure.

FIG. 7 is a schematic diagram for describing the first guidance signal and the second guidance signal transmitted from the robot base station composite body in a case where two robots are connected in an adjacent manner to the robot base station composite body in embodiment 1 of the present disclosure.

In FIG. 7, robots 2 are connected to the adjacent first base station 111 and second base station 112, and no robots 2 are connected to the third base station 113 and fourth base station 114.

As depicted in FIG. 7, in the case where robots 2 are connected to each of the first base station 111 and the second base station 112 of the robot base station composite body 1, the left-side guidance signal transmission unit 1011 of the first base station 111 transmits, to the left side of the first base station 111, the first guidance signal 301 which guides a robot 2 in a direction (the direction of the arrow 3011) from the left side of the first base station 111 to the right side. In other words, the left-side guidance signal transmission unit 1011 transmits, to the left side of the first base station 111, the first guidance signal 301 which guides a robot 2 in a direction from the left side of the first base station 111 toward the central axis of the first base station 111.

Furthermore, in the case where robots 2 are connected to each of the first base station 111 and the second base station 112 of the robot base station composite body 1, the right-side guidance signal transmission unit 1021 of the first base station 111 transmits, to the right side of the first base station 111, the first guidance signal 301 which guides a robot 2 in a direction (the direction of the arrow 3011) from the left side of the first base station 111 to the right side. In other words, the right-side guidance signal transmission unit 1021 transmits, to the right side of the first base station 111, the first guidance signal 301 which guides a robot 2 in a direction from the central axis of the first base station 111 to the right side of the first base station 111.

Furthermore, in the case where robots 2 are connected to each of the first base station 111 and the second base station 112 of the robot base station composite body 1, the left-side guidance signal transmission unit 1012 of the second base station 112 transmits, to the left side of the second base station 112, the second guidance signal 302 which guides a robot 2 in a direction (the direction of the arrow 3021) from the right side of the second base station 112 to the left side.

Furthermore, in the case where robots 2 are connected to each of the first base station 111 and the second base station 112 of the robot base station composite body 1, the right-side guidance signal transmission unit 1022 of the second base station 112 transmits, to the right side of the second base station 112, the second guidance signal 302 which guides a robot 2 in a direction (the direction of the arrow 3021) from the right side of the second base station 112 to the left side.

Meanwhile, the left-side guidance signal transmission units 1013 and 1014 of the base stations 113 and 114 having no robots 2 connected thereto of the robot base station composite body 1 transmit, to the left side of each base station 113 and 114, the first guidance signal 301 which guides a robot 2 in a direction from the left side of each base station 113 and 114 to the right side, and the right-side guidance signal transmission units 1023 and 1024 of the base stations 113 and 114 transmit, to the right side of each base station 113 and 114, the second guidance signal 302 which guides a robot 2 in a direction from the right side of each base station 113 and 114 to the left side.

In other words, in a case where the connection detection unit 1041 of the first base station 111 has detected that a robot 2 is connected, the guidance control unit 13 calculates the distance between the first base station 111 and the base station that is closest to the first base station 111 at the left side of the first base station 111 and has no robot 2 connected thereto, and also calculates the distance between the first base station 111 and the base station that is closest to the first base station 111 at the right side of the first base station 111 and has no robot 2 connected thereto.

The base station that is closest to the first base station 111 at the left side of the first base station 111 and has no robot 2 connected thereto is the third base station 113, and therefore the guidance control unit 13 calculates the distance between the third base station 113 and the first base station 111. It should be noted that the distance is represented by the number of base stations having a robot 2 connected thereto, present between the third base station 113 and the first base station 111. In FIG. 7, the second base station 112 is between the third base station 113 and the first base station 111, and therefore the distance between the third base station 113 and the first base station 111 is 1.

Furthermore, the base station that is closest to the first base station 111 at the right side of the first base station 111 and has no robot 2 connected thereto is the fourth base station 114, and therefore the guidance control unit 13 calculates the distance between the fourth base station 114 and the first base station 111. In FIG. 7, the distance between the fourth base station 114 and the first base station 111 is 0.

The distance between the third base station 113 and the first base station 111 is greater than the distance between the fourth base station 114 and the first base station 111, and therefore the guidance control unit 13 causes both the left-side guidance signal transmission unit 1011 and the right-side guidance signal transmission unit 1021 of the first base station 111 to transmit the first guidance signal 301.

In addition, in a case where the connection detection unit 1042 of the second base station 112 has detected that a robot 2 is connected, the guidance control unit 13 calculates the distance between the second base station 112 and the base station that is closest to the second base station 112 at the left side of the second base station 112 and has no robot 2 connected thereto, and also calculates the distance between the second base station 112 and the base station that is closest to the second base station 112 at the right side of the second base station 112 and has no robot 2 connected thereto.

The base station that is closest to the second base station 112 at the left side of the second base station 112 and has no robot 2 connected thereto is the third base station 113, and therefore the guidance control unit 13 calculates the distance between the third base station 113 and the second base station 112. It should be noted that the distance is represented by the number of base stations having a robot 2 connected thereto, present between the third base station 113 and the second base station 112. In FIG. 7, the distance between the third base station 113 and the second base station 112 is 0.

Furthermore, the base station that is closest to the second base station 112 at the right side of the second base station 112 and has no robot 2 connected thereto is the fourth base station 114, and therefore the guidance control unit 13 calculates the distance between the fourth base station 114 and the second base station 112. In FIG. 7, the first base station 111 is between the fourth base station 114 and the second base station 112, and therefore the distance between the fourth base station 114 and the second base station 112 is 1.

The distance between the third base station 113 and the second base station 112 is less than the distance between the fourth base station 114 and the second base station 112, and therefore the guidance control unit 13 causes both the left-side guidance signal transmission unit 1012 and the right-side guidance signal transmission unit 1022 of the second base station 112 to transmit the second guidance signal 302.

In this way, in the case where robots 2 are connected to each of the first base station 111 and the second base station 112 of the robot base station composite body 1, the guidance signal transmitted from the right-side guidance signal transmission unit 1021 of the first base station 111 is switched from the second guidance signal 302 to the first guidance signal 301, and the guidance signal transmitted from the left-side guidance signal transmission unit 1012 of the second base station 112 is switched from the first guidance signal 301 to the second guidance signal 302. The dot-dash line 401 in FIG. 7 indicates a boundary line that bisects the distance between a base station to which a robot 2 has not returned, present to the left of two base stations to which robots 2 have returned, and a base station to which a robot 2 has not returned, present to the right of the two base stations to which the robots 2 have returned. In the present embodiment 1, the guidance directions to the left and to the right of the boundary line are reallocated, and the guidance directions are inverted.

Thus, another robot 2 that has detected the first guidance signal 301 transmitted from the left-side guidance signal transmission unit 1011 and the first guidance signal 301 transmitted from the right-side guidance signal transmission unit 1021 of the first base station 111 to which a robot 2 is connected moves in the direction of the arrows 3011 in which the fourth base station 114 is present, and is guided toward the fourth base station 114. Furthermore, another robot 2 that has detected the second guidance signal 302 transmitted from the left-side guidance signal transmission unit 1012 and the second guidance signal 302 transmitted from the right-side guidance signal transmission unit 1022 of the second base station 112 to which a robot 2 is connected moves in the direction of the arrows 3021 in which the third base station 113 is present, and is guided toward the third base station 113.

Consequently, using guidance signals transmitted from a base station to which a robot 2 is already connected, another robot 2 that is not connected to a base station can be guided to a base station having no robot 2 connected thereto, a plurality of robots 2 can be reliably returned to base stations, and also the time taken for all of the plurality of robots 2 to return to the base stations can be shortened.

Figure 8:
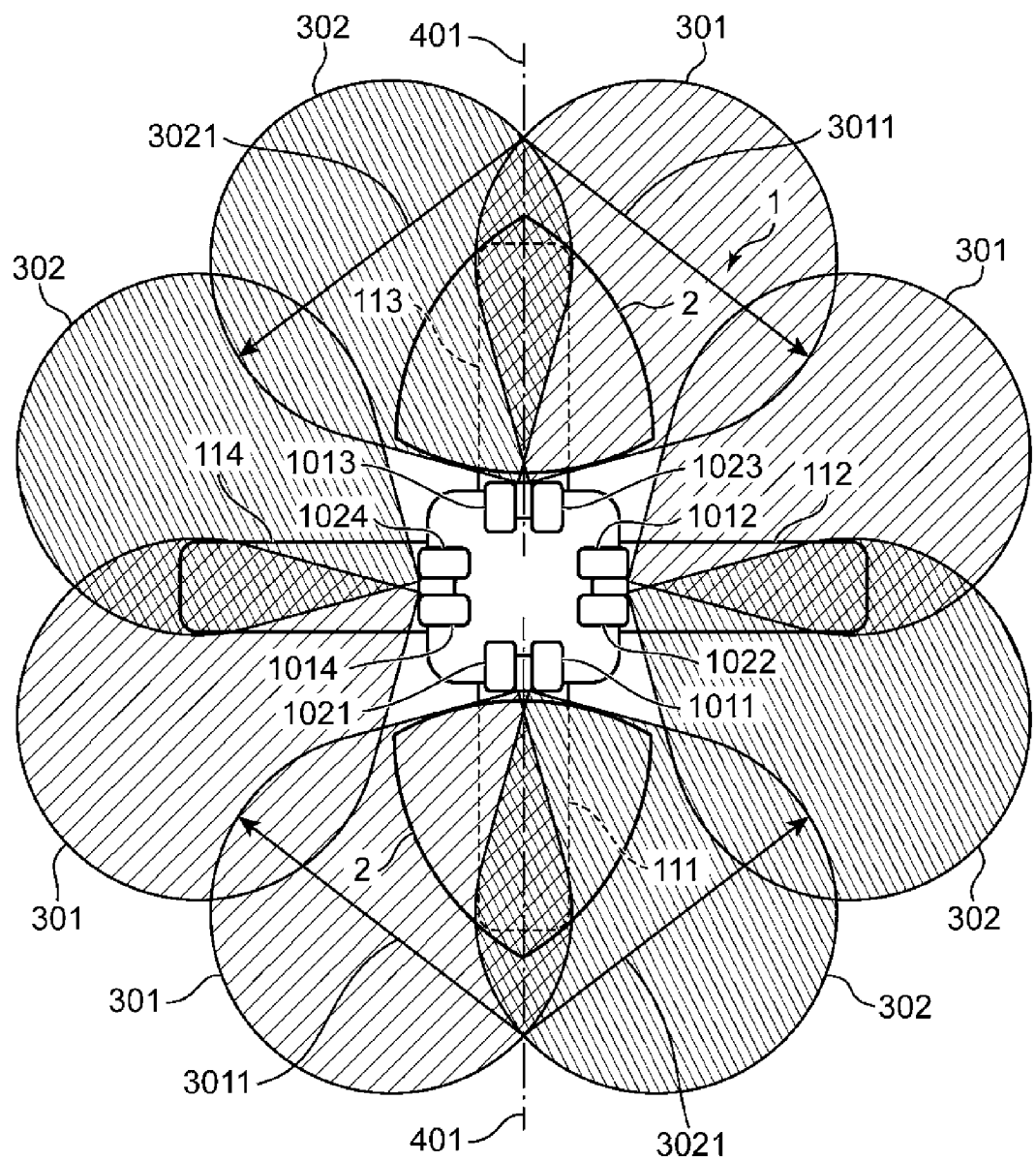
FIG. 8 is a schematic diagram for describing the first guidance signal and the second guidance signal transmitted from the robot base station composite body in a case where two robots are connected in an opposing manner to the robot base station composite body in embodiment 1 of the present disclosure.

FIG. 8 is a schematic diagram for describing the first guidance signal and the second guidance signal transmitted from the robot base station composite body in a case where two robots are connected in an opposing manner to the robot base station composite body in embodiment 1 of the present disclosure.

In FIG. 8, robots 2 are connected to the opposing first base station 111 and third base station 113, and no robots 2 are connected to the second base station 112 and fourth base station 114.

As depicted in FIG. 8, in the case where robots 2 are connected to each of the first base station 111 and the third base station 113 of the robot base station composite body 1, the left-side guidance signal transmission unit 1011 of the first base station 111 transmits, to the left side of the first base station 111, the second guidance signal 302 which guides a robot 2 in a direction (the direction of the arrow 3021) from the right side of the first base station 111 to the left side. In other words, the left-side guidance signal transmission unit 1011 transmits, to the left side of the first base station 111, the second guidance signal 302 which guides a robot 2 in a direction from the central axis of the first base station 111 to the left side of the first base station 111.

Furthermore, in the case where robots 2 are connected to each of the first base station 111 and the third base station 113 of the robot base station composite body 1, the right-side guidance signal transmission unit 1021 of the first base station 111 transmits, to the right side of the first base station 111, the first guidance signal 301 which guides a robot 2 in a direction (the direction of the arrow 3011) from the left side of the first base station 111 to the right side. In other words, the right-side guidance signal transmission unit 1021 transmits, to the right side of the first base station 111, the first guidance signal 301 which guides a robot 2 in a direction from the central axis of the first base station 111 to the right side of the first base station 111.

Furthermore, in the case where robots 2 are connected to each of the first base station 111 and the third base station 113 of the robot base station composite body 1, the left-side guidance signal transmission unit 1013 of the third base station 113 transmits, to the left side of the third base station 113, the second guidance signal 302 which guides a robot 2 in a direction (the direction of the arrow 3021) from the right side of the third base station 113 to the left side. In other words, the left-side guidance signal transmission unit 1013 transmits, to the left side of the third base station 113, the second guidance signal 302 which guides a robot 2 in a direction from the central axis of the third base station 113 to the left side of the third base station 113.

Furthermore, in the case where robots 2 are connected to each of the first base station 111 and the third base station 113 of the robot base station composite body 1, the right-side guidance signal transmission unit 1023 of the third base station 113 transmits, to the right side of the third base station 113, the first guidance signal 301 which guides a robot 2 in a direction (the direction of the arrow 3011) from the left side of the third base station 113 to the right side. In other words, the right-side guidance signal transmission unit 1023 transmits, to the right side of the third base station 113, the first guidance signal 301 which guides a robot 2 in a direction from the central axis of the third base station 113 to the right side of the third base station 113.

Meanwhile, the left-side guidance signal transmission units 1012 and 1014 of the base stations 112 and 114 having no robots 2 connected thereto of the robot base station composite body 1 transmit, to the left side of each base station 112 and 114, the first guidance signal 301 which guides a robot 2 in a direction from the left side of each base station 112 and 114 to the right side, and the right-side guidance signal transmission units 1022 and 1024 of the base stations 112 and 114 transmit, to the right side of each base station 112 and 114, the second guidance signal 302 which guides a robot 2 in a direction from the right side of each base station 112 and 114 to the left side.

In other words, in a case where the connection detection unit 1041 of the first base station 111 has detected that a robot 2 is connected, the guidance control unit 13 calculates the distance between the first base station 111 and the base station that is closest to the first base station 111 at the left side of the first base station 111 and has no robot 2 connected thereto, and also calculates the distance between the first base station 111 and the base station that is closest to the first base station 111 at the right side of the first base station 111 and has no robot 2 connected thereto.

The base station that is closest to the first base station 111 at the left side of the first base station 111 and has no robot 2 connected thereto is the second base station 112, and therefore the guidance control unit 13 calculates the distance between the second base station 112 and the first base station 111. It should be noted that the distance is represented by the number of base stations having a robot 2 connected thereto, present between the second base station 112 and the first base station 111. In FIG. 8, the distance between the second base station 112 and the first base station 111 is 0.

Furthermore, the base station that is closest to the first base station 111 at the right side of the first base station 111 and has no robot 2 connected thereto is the fourth base station 114, and therefore the guidance control unit 13 calculates the distance between the fourth base station 114 and the first base station 111. In FIG. 8, the distance between the fourth base station 114 and the first base station 111 is 0.

The distance between the second base station 112 and the first base station 111 is equal to the distance between the fourth base station 114 and the first base station 111, and therefore the guidance control unit 13 causes the left-side guidance signal transmission unit 1011 of the first base station 111 to transmit the second guidance signal 302, and also causes the right-side guidance signal transmission unit 1021 to transmit the first guidance signal 301.

In addition, in a case where the connection detection unit 1043 of the third base station 113 has detected that a robot 2 is connected, the guidance control unit 13 calculates the distance between the third base station 113 and the base station that is closest to the third base station 113 at the left side of the third base station 113 and has no robot 2 connected thereto, and also calculates the distance between the third base station 113 and the base station that is closest to the third base station 113 at the right side of the third base station 113 and has no robot 2 connected thereto.

The base station that is closest to the third base station 113 at the left side of the third base station 113 and has no robot 2 connected thereto is the fourth base station 114, and therefore the guidance control unit 13 calculates the distance between the fourth base station 114 and the third base station 113. In FIG. 8, the distance between the fourth base station 114 and the third base station 113 is 0.

Furthermore, the base station that is closest to the third base station 113 at the right side of the third base station 113 and has no robot 2 connected thereto is the second base station 112, and therefore the guidance control unit 13 calculates the distance between the second base station 112 and the third base station 113. In FIG. 8, the distance between the second base station 112 and the third base station 113 is 0.

The distance between the fourth base station 114 and the third base station 113 is equal to the distance between the second base station 112 and the third base station 113, and therefore the guidance control unit 13 causes the left-side guidance signal transmission unit 1013 of the third base station 113 to transmit the second guidance signal 302, and also causes the right-side guidance signal transmission unit 1023 to transmit the first guidance signal 301.

In this way, in the case where robots 2 are connected to each of the first base station 111 and the third base station 113 of the robot base station composite body 1, the guidance signal transmitted from the left-side guidance signal transmission unit 1011 of the first base station 111 is switched from the first guidance signal 301 to the second guidance signal 302, the guidance signal transmitted from the right-side guidance signal transmission unit 1021 of the first base station 111 is switched from the second guidance signal 302 to the first guidance signal 301, the guidance signal transmitted from the left-side guidance signal transmission unit 1013 of the third base station 113 is switched from the first guidance signal 301 to the second guidance signal 302, and the guidance signal transmitted from the right-side guidance signal transmission unit 1023 of the third base station 113 is switched from the second guidance signal 302 to the first guidance signal 301. The dot-dash line 401 in FIG. 8 indicates a boundary line that bisects the distance between a base station to which a robot 2 has not returned, present to the left of a base station to which a robot 2 has returned, and a base station to which a robot 2 has not returned, present to the right of the base station to which the robot 2 has returned. In the present embodiment 1, the guidance directions to the left and to the right of the boundary line are reallocated, and the guidance directions are inverted.

Thus, another robot 2 that has detected the second guidance signal 302 transmitted from the left-side guidance signal transmission unit 1011 of the first base station 111 to which a robot 2 is connected moves in the direction of the arrow 3021 in which the second base station 112 is present, and is guided toward the second base station 112. Furthermore, another robot 2 that has detected the first guidance signal 301 transmitted from the right-side guidance signal transmission unit 1021 of the first base station 111 to which the robot 2 is connected moves in the direction of the arrow 3011 in which the fourth base station 114 is present, and is guided toward the fourth base station 114.

In addition, another robot 2 that has detected the second guidance signal 302 transmitted from the left-side guidance signal transmission unit 1013 of the third base station 113 to which a robot 2 is connected moves in the direction of the arrow 3021 in which the fourth base station 114 is present, and is guided toward the fourth base station 114. Furthermore, another robot 2 that has detected the first guidance signal 301 transmitted from the right-side guidance signal transmission unit 1023 of the third base station 113 to which the robot 2 is connected moves in the direction of the arrow 3011 in which the second base station 112 is present, and is guided toward the second base station 112.

Consequently, using guidance signals transmitted from a base station to which a robot 2 is already connected, another robot 2 that is not connected to a base station can be guided to a base station having no robot 2 connected thereto, a plurality of robots 2 can be reliably returned to base stations, and also the time taken for all of the plurality of robots 2 to return to the base stations can be shortened.

Figure 9:
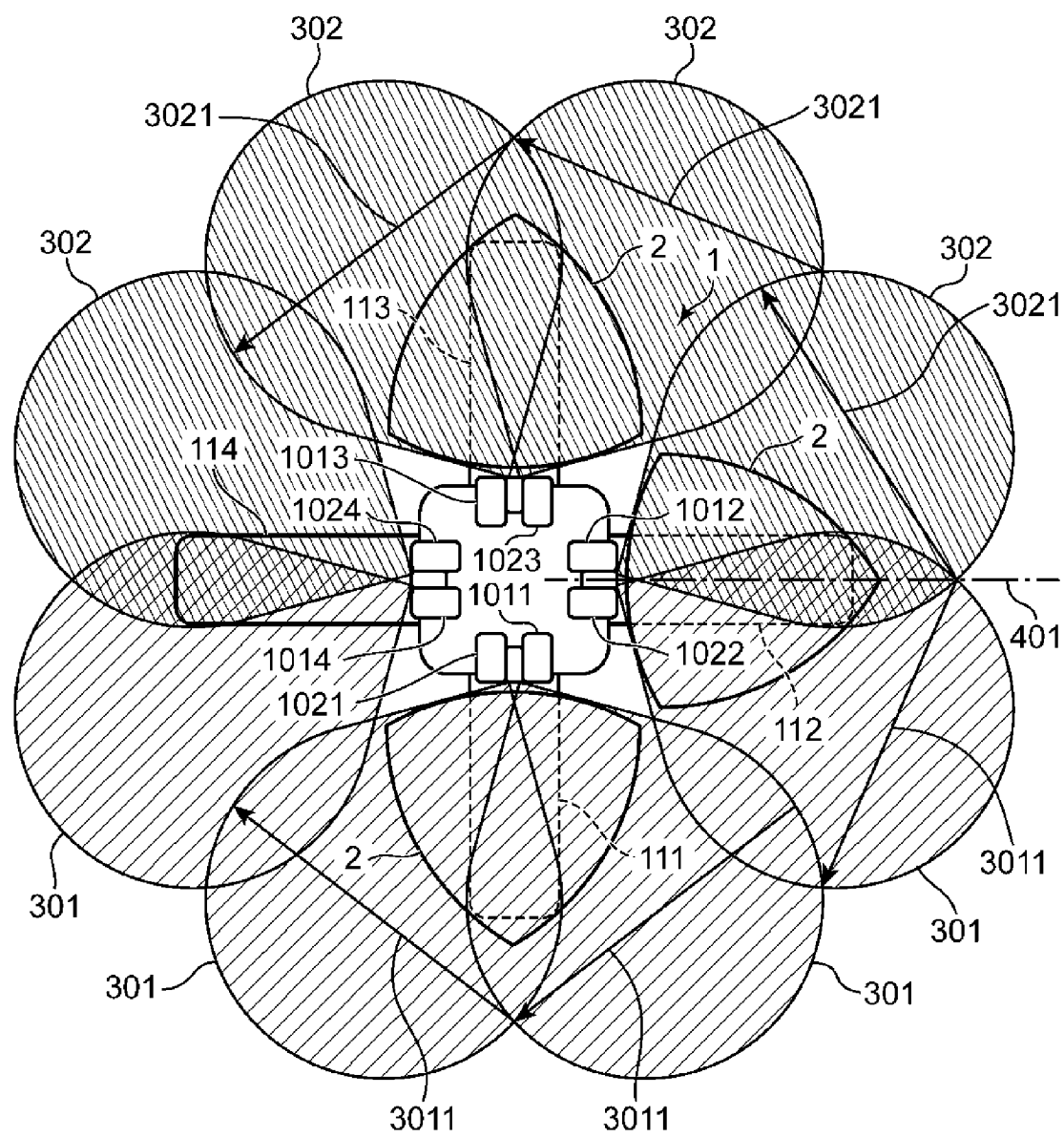
FIG. 9 is a schematic diagram for describing the first guidance signal and the second guidance signal transmitted from the robot base station composite body in a case where three robots are connected to the robot base station composite body in embodiment 1 of the present disclosure.

FIG. 9 is a schematic diagram for describing the first guidance signal and the second guidance signal transmitted from the robot base station composite body in a case where three robots are connected to the robot base station composite body in embodiment 1 of the present disclosure.

In FIG. 9, robots 2 are connected to the adjacent first base station 111, second base station 112, and third base station 113, and no robot 2 is connected to the fourth base station 114.

As depicted in FIG. 9, in a case where robots 2 are connected to each of the first base station 111, the second base station 112, and the third base station 113 of the robot base station composite body 1, the left-side guidance signal transmission unit 1011 of the first base station 111 transmits, to the left side of the first base station 111, the first guidance signal 301 which guides a robot 2 in a direction (the direction of the arrow 3011) from the left side of the first base station 111 to the right side. In other words, the left-side guidance signal transmission unit 1011 transmits, to the left side of the first base station 111, the first guidance signal 301 which guides a robot 2 in a direction from the left side of the first base station 111 toward the central axis of the first base station 111.

Furthermore, in the case where robots 2 are connected to each of the first base station 111, the second base station 112, and the third base station 113 of the robot base station composite body 1, the right-side guidance signal transmission unit 1021 of the first base station 111 transmits, to the right side of the first base station 111, the first guidance signal 301 which guides a robot 2 in a direction (the direction of the arrow 3011) from the left side of the first base station 111 to the right side. In other words, the right-side guidance signal transmission unit 1021 transmits, to the right side of the first base station 111, the first guidance signal 301 which guides a robot 2 in a direction from the central axis of the first base station 111 to the right side of the first base station 111.

Furthermore, in the case where robots 2 are connected to each of the first base station 111, the second base station 112, and the third base station 113 of the robot base station composite body 1, the left-side guidance signal transmission unit 1012 of the second base station 112 transmits, to the left side of the second base station 112, the second guidance signal 302 which guides a robot 2 in a direction (the direction of the arrow 3021) from the right side of the second base station 112 to the left side. In other words, the left-side guidance signal transmission unit 1012 transmits, to the left side of the second base station 112, the second guidance signal 302 which guides a robot 2 in a direction from the central axis of the second base station 112 to the left side of the second base station 112.

Furthermore, in the case where robots 2 are connected to each of the first base station 111, the second base station 112, and the third base station 113 of the robot base station composite body 1, the right-side guidance signal transmission unit 1022 of the second base station 112 transmits, to the right side of the second base station 112, the first guidance signal 301 which guides a robot 2 in a direction (the direction of the arrow 3011) from the left side of the second base station 112 to the right side. In other words, the right-side guidance signal transmission unit 1022 transmits, to the right side of the second base station 112, the first guidance signal 301 which guides a robot 2 in a direction from the central axis of the second base station 112 to the right side of the second base station 112.

Furthermore, in the case where robots 2 are connected to each of the first base station 111, the second base station 112, and the third base station 113 of the robot base station composite body 1, the left-side guidance signal transmission unit 1013 of the third base station 113 transmits, to the left side of the third base station 113, the second guidance signal 302 which guides a robot 2 in a direction (the direction of the arrow 3021) from the right side of the third base station 113 to the left side. In other words, the left-side guidance signal transmission unit 1013 transmits, to the left side of the third base station 113, the second guidance signal 302 which guides a robot 2 in a direction from the central axis of the third base station 113 to the left side of the third base station 113.

Furthermore, in the case where robots 2 are connected to each of the first base station 111, the second base station 112, and the third base station 113 of the robot base station composite body 1, the right-side guidance signal transmission unit 1023 of the third base station 113 transmits, to the right side of the third base station 113, the second guidance signal 302 which guides a robot 2 in a direction (the direction of the arrow 3021) from the right side of the third base station 113 to the left side. In other words, the right-side guidance signal transmission unit 1023 transmits, to the right side of the third base station 113, the second guidance signal 302 which guides a robot 2 in a direction from the right side of the third base station 113 toward the central axis of the third base station 113.

Meanwhile, the left-side guidance signal transmission unit 1014 of the fourth base station 114 having no robot 2 connected thereto of the robot base station composite body 1 transmits, to the left side of the fourth base station 114, the first guidance signal 301 which guides a robot 2 in a direction from the left side of the fourth base station 114 to the right side, and the right-side guidance signal transmission unit 1024 of the fourth base station 114 transmits, to the right side of the fourth base station 114, the second guidance signal 302 which guides a robot 2 in a direction from the right side of the fourth base station 114 to the left side.

In other words, in a case where the connection detection unit 1041 of the first base station 111 has detected that a robot 2 is connected, the guidance control unit 13 calculates the distance between the first base station 111 and the base station that is closest to the first base station 111 at the left side of the first base station 111 and has no robot 2 connected thereto, and also calculates the distance between the first base station 111 and the base station that is closest to the first base station 111 at the right side of the first base station 111 and has no robot 2 connected thereto.

The base station that is closest to the first base station 111 at the left side of the first base station 111 and has no robot 2 connected thereto is the fourth base station 114, and therefore the guidance control unit 13 calculates the distance between the fourth base station 114 and the first base station 111. It should be noted that the distance is represented by the number of base stations having a robot 2 connected thereto, present at the left side of the first base station 111 and present between the fourth base station 114 and the first base station 111. In FIG. 9, the second base station 112 and the third base station 113 are between the first base station 111 and the fourth base station 114 at the left side of the first base station 111, and therefore the distance between the first base station 111 and the fourth base station 114 at the left side of the first base station 111 is 2.

Furthermore, the base station that is closest to the first base station 111 at the right side of the first base station 111 and has no robot 2 connected thereto is the fourth base station 114, and therefore the guidance control unit 13 calculates the distance between the fourth base station 114 and the first base station 111. It should be noted that the distance is represented by the number of base stations having a robot 2 connected thereto, present at the right side of the first base station 111 and present between the fourth base station 114 and the first base station 111. In FIG. 9, the distance between the first base station 111 and the fourth base station 114 to the right side of the first base station 111 is 0.

The distance between the first base station 111 and the fourth base station 114 at the left side of the first base station 111 is greater than the distance between the first base station 111 and the fourth base station 114 at the right side of the first base station 111, and therefore the guidance control unit 13 causes both the left-side guidance signal transmission unit 1011 and the right-side guidance signal transmission unit 1021 of the first base station 111 to transmit the first guidance signal 301.

In addition, in a case where the connection detection unit 1042 of the second base station 112 has detected that a robot 2 is connected, the guidance control unit 13 calculates the distance between the second base station 112 and the base station that is closest to the second base station 112 at the left side of the second base station 112 and has no robot 2 connected thereto, and also calculates the distance between the second base station 112 and the base station that is closest to the second base station 112 at the right side of the second base station 112 and has no robot 2 connected thereto.

The base station that is closest to the second base station 112 at the left side of the second base station 112 and has no robot 2 connected thereto is the fourth base station 114, and therefore the guidance control unit 13 calculates the distance between the fourth base station 114 and the second base station 112. It should be noted that the distance is represented by the number of base stations having a robot 2 connected thereto, present at the left side of the second base station 112 and present between the fourth base station 114 and the second base station 112. In FIG. 9, the third base station 113 is between the second base station 112 and the fourth base station 114 at the left side of the second base station 112, and therefore the distance between the second base station 112 and the fourth base station 114 at the left side of the second base station 112 is 1.

Furthermore, the base station that is closest to the second base station 112 at the right side of the second base station 112 and has no robot 2 connected thereto is the fourth base station 114, and therefore the guidance control unit 13 calculates the distance between the fourth base station 114 and the second base station 112. It should be noted that the distance is represented by the number of base stations having a robot 2 connected thereto, present at the right side of the second base station 112 and present between the fourth base station 114 and the second base station 112. In FIG. 9, the first base station 111 is between the second base station 112 and the fourth base station 114 at the right side of the second base station 112, and therefore the distance between the second base station 112 and the fourth base station 114 at the right side of the second base station 112 is 1.

The distance between the second base station 112 and the fourth base station 114 at the left side of the second base station 112 is equal to the distance between the second base station 112 and the fourth base station 114 at the right side of the second base station 112, and therefore the guidance control unit 13 causes the left-side guidance signal transmission unit 1012 of the second base station 112 to transmit the second guidance signal 302, and also causes the right-side guidance signal transmission unit 1022 to transmit the first guidance signal 301.

Yet furthermore, in a case where the connection detection unit 1043 of the third base station 113 has detected that a robot 2 is connected, the guidance control unit 13 calculates the distance between the third base station 113 and the base station that is closest to the third base station 113 at the left side of the third base station 113 and has no robot 2 connected thereto, and also calculates the distance between the third base station 113 and the base station that is closest to the third base station 113 at the right side of the third base station 113 and has no robot 2 connected thereto.

The base station that is closest to the third base station 113 at the left side of the third base station 113 and has no robot 2 connected thereto is the fourth base station 114, and therefore the guidance control unit 13 calculates the distance between the fourth base station 114 and the third base station 113. It should be noted that the distance is represented by the number of base stations having a robot 2 connected thereto, present at the left side of the third base station 113 and present between the fourth base station 114 and the third base station 113. In FIG. 9, the distance between the third base station 113 and the fourth base station 114 to the left side of the third base station 113 is 0.

Furthermore, the base station that is closest to the third base station 113 at the right side of the third base station 113 and has no robot 2 connected thereto is the fourth base station 114, and therefore the guidance control unit 13 calculates the distance between the fourth base station 114 and the third base station 113. It should be noted that the distance is represented by the number of base stations having a robot 2 connected thereto, present at the right side of the third base station 113 and present between the fourth base station 114 and the third base station 113. In FIG. 9, the first base station 111 and the second base station 112 are between the third base station 113 and the fourth base station 114 at the right side of the third base station 113, and therefore the distance between the third base station 113 and the fourth base station 114 at the right side of the third base station 113 is 2.

The distance between the third base station 113 and the fourth base station 114 at the left side of the third base station 113 is less than the distance between the third base station 113 and the fourth base station 114 at the right side of the third base station 113, and therefore the guidance control unit 13 causes both the left-side guidance signal transmission unit 1013 and the right-side guidance signal transmission unit 1023 of the third base station 113 to transmit the second guidance signal 302.

In this way, in the case where robots 2 are connected to each of the first base station 111, the second base station 112, and the third base station 113 of the robot base station composite body 1, the guidance signal transmitted from the right-side guidance signal transmission unit 1021 of the first base station 111 is switched from the second guidance signal 302 to the first guidance signal 301, the guidance signal transmitted from the left-side guidance signal transmission unit 1012 of the second base station 112 is switched from the first guidance signal 301 to the second guidance signal 302, the guidance signal transmitted from the right-side guidance signal transmission unit 1022 of the second base station 112 is switched from the second guidance signal 302 to the first guidance signal 301, and the guidance signal transmitted from the left-side guidance signal transmission unit 1012 of the third base station 113 is switched from the first guidance signal 301 to the second guidance signal 302. The dot-dash line 401 in FIG. 9 indicates a boundary line that bisects the distance between a base station to which a robot 2 has not returned, present to the left of three base stations to which robots 2 have returned, and a base station to which a robot 2 has not returned, present to the right of the three base stations to which the robots 2 have returned. In the present embodiment 1, the guidance directions to the left and to the right of the boundary line are reallocated, and the guidance directions are inverted.

Thus, another robot 2 that has detected the first guidance signal 301 transmitted from the left-side guidance signal transmission unit 1011 and the first guidance signal 301 transmitted from the right-side guidance signal transmission unit 1021 of the first base station 111 to which a robot 2 is connected moves in the direction of the arrows 3011 in which the fourth base station 114 is present, and is guided toward the fourth base station 114. Furthermore, another robot 2 that has detected the first guidance signal 301 transmitted from the right-side guidance signal transmission unit 1022 of the second base station 112 to which a robot 2 is connected moves in the direction of the arrow 3011 in which the first base station 111 is present, and is guided toward the first base station 111. Furthermore, another robot 2 that has detected the second guidance signal 302 transmitted from the left-side guidance signal transmission unit 1012 of the second base station 112 to which the robot 2 is connected moves in the direction of the arrow 3021 in which the third base station 113 is present, and is guided toward the third base station 113. Furthermore, another robot 2 that has detected the second guidance signal 302 transmitted from the left-side guidance signal transmission unit 1013 and the second guidance signal 302 transmitted from the right-side guidance signal transmission unit 1023 of the third base station 113 to which a robot 2 is connected moves in the direction of the arrows 3021 in which the fourth base station 114 is present, and is guided toward the fourth base station 114.

Consequently, using guidance signals transmitted from a base station to which a robot 2 is already connected, another robot 2 that is not connected to a base station can be guided to a base station having no robot 2 connected thereto, a plurality of robots 2 can be reliably returned to base stations, and also the time taken for all of the plurality of robots 2 to return to the base stations can be shortened.

Figure 10:
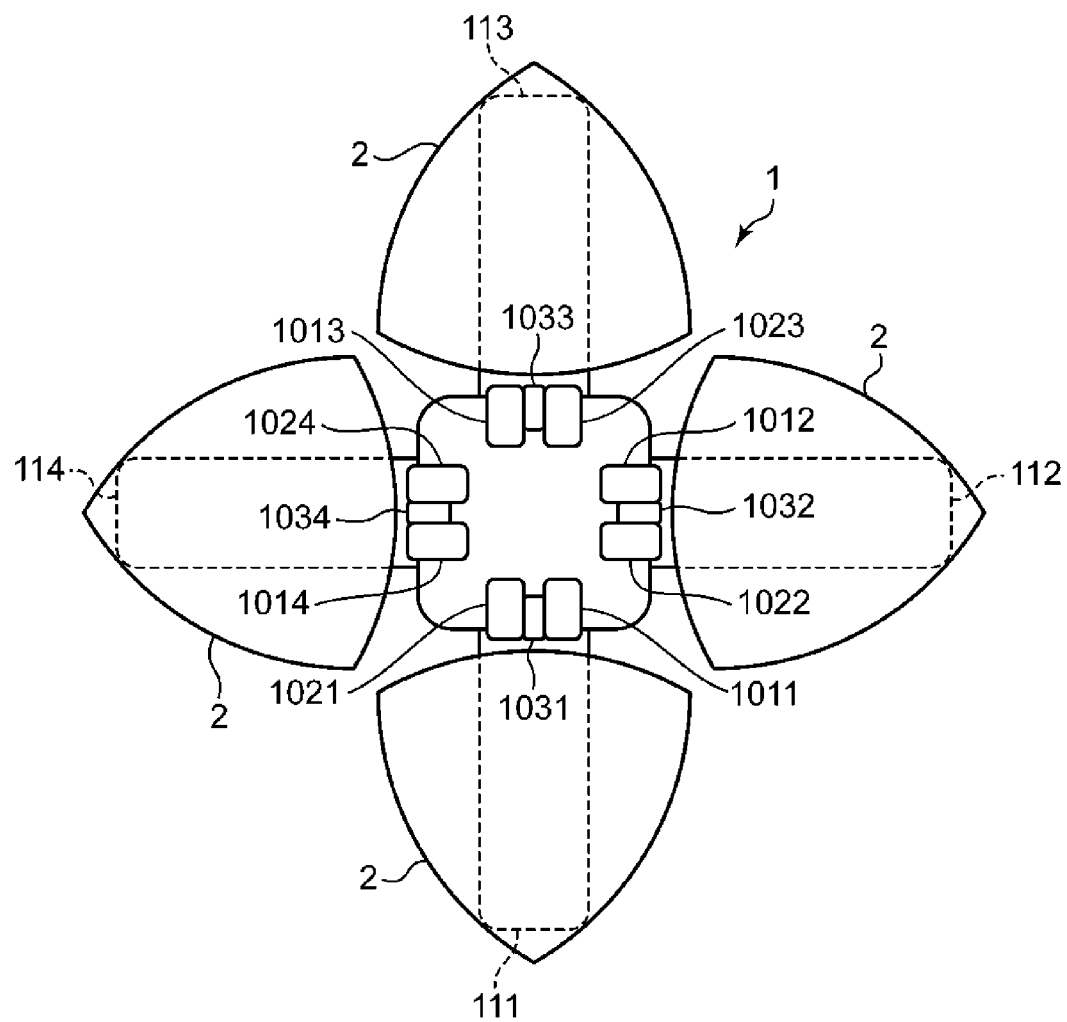
FIG. 10 is a schematic diagram for describing the first guidance signal and the second guidance signal transmitted from the robot base station composite body in a case where four robots are connected to the robot base station composite body in embodiment 1 of the present disclosure.

FIG. 10 is a schematic diagram for describing the first guidance signal and the second guidance signal transmitted from the robot base station composite body in a case where four robots are connected to the robot base station composite body in embodiment 1 of the present disclosure.

In FIG. 10, robots 2 are connected to the adjacent first base station 111, second base station 112, third base station 113, and fourth base station 114.

As depicted in FIG. 10, in a case where robots 2 are connected to all of the first base station 111, the second base station 112, the third base station 113, and the fourth base station 114 of the robot base station composite body 1, the left-side guidance signal transmission units 1011, 1012, 1013, and 1014 of each base station 111, 112, 113, and 114 do not transmit either the first guidance signal 301 or the second guidance signal 302, and the right-side guidance signal transmission units 1021, 1022, 1023, and 1024 of each base station 111, 112, 113, and 114 do not transmit either the first guidance signal 301 or the second guidance signal 302. Furthermore, in the case where robots 2 are connected to all of the first base station 111, the second base station 112, the third base station 113, and the fourth base station 114, the narrow area signal transmission units 1031, 1032, 1033, and 1034 of each base station 111, 112, 113, and 114 do not transmit the narrow area signal.

In this way, in the case where robots 2 are connected to all of the base stations of the robot base station composite body 1, the guidance control unit 13 stops transmission of all of the guidance signals.

In the present embodiment 1, the first base station 111, the second base station 112, the third base station 113, and the fourth base station 114 are provided with the narrow area signal transmission units 1031, 1032, 1033, and 1034, and robots 2 are guided to the front of the first base station 111, the second base station 112, the third base station 113, and the fourth base station 114 while detecting the narrow area signals transmitted from the narrow area signal transmission units 1031, 1032, 1033, and 1034. However, it should be noted that the present disclosure is not particularly restricted thereto, and the robots 2 may be guided to the front of the first base station 111, the second base station 112, the third base station 113, and the fourth base station 114 while detecting overlapping regions between the first guidance signals transmitted from the left-side guidance signal transmission units 1011, 1012, 1013, and 1014 and the second guidance signals transmitted from the right-side guidance signal transmission units 1021, 1022, 1023, and 1024.

Figure 11:
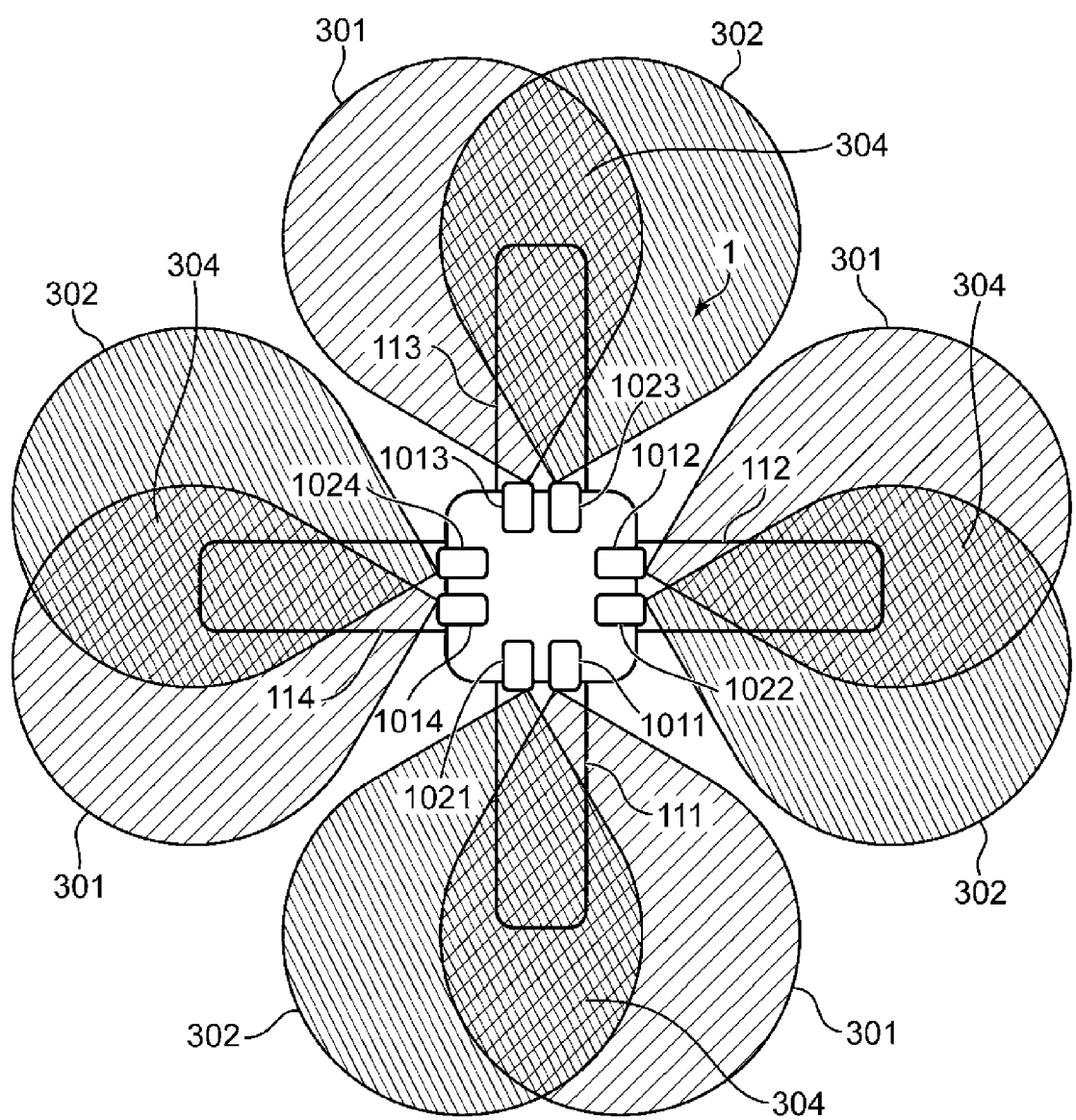
FIG. 11 is a schematic diagram for describing the first guidance signal and the second guidance signal transmitted from the robot base station composite body in a case where no robots are connected to the robot base station composite body in a first modified example of embodiment 1 of the present disclosure.

FIG. 11 is a schematic diagram for describing the first guidance signal and the second guidance signal transmitted from the robot base station composite body in a case where no robots are connected to the robot base station composite body in a first modified example of embodiment 1 of the present disclosure.

The first base station 111, the second base station 112, the third base station 113, and the fourth base station 114 of the first modified example of embodiment 1 are not provided with the narrow area signal transmission units 1031, 1032, 1033, and 1034.

The left-side guidance signal transmission units 1011, 1012, 1013, and 1014 and the right-side guidance signal transmission units 1021, 1022, 1023, and 1024 of the first base station 111, the second base station 112, the third base station 113, and the fourth base station 114 are arranged in such a way that an overlapping region 304, in which a region in which the first guidance signal is transmitted and a region in which the second guidance signal is transmitted overlap, is formed at the front of each of the first base station 111, the second base station 112, the third base station 113, and the fourth base station 114. Robots 2 are guided to each of the first base station 111, the second base station 112, the third base station 113, and the fourth base station 114 while detecting the overlapping regions 304.

It should be noted that, in the first modified example of embodiment 1, it is preferable that guidance signals transmitted from adjacent base stations do not overlap. For example, it is preferable that the second guidance signal 302 transmitted from the right-side guidance signal transmission unit 1021 of the first base station 111 and the first guidance signal 301 transmitted from the left-side guidance signal transmission unit 1014 of the fourth base station 114 do not overlap.

Figure 12:
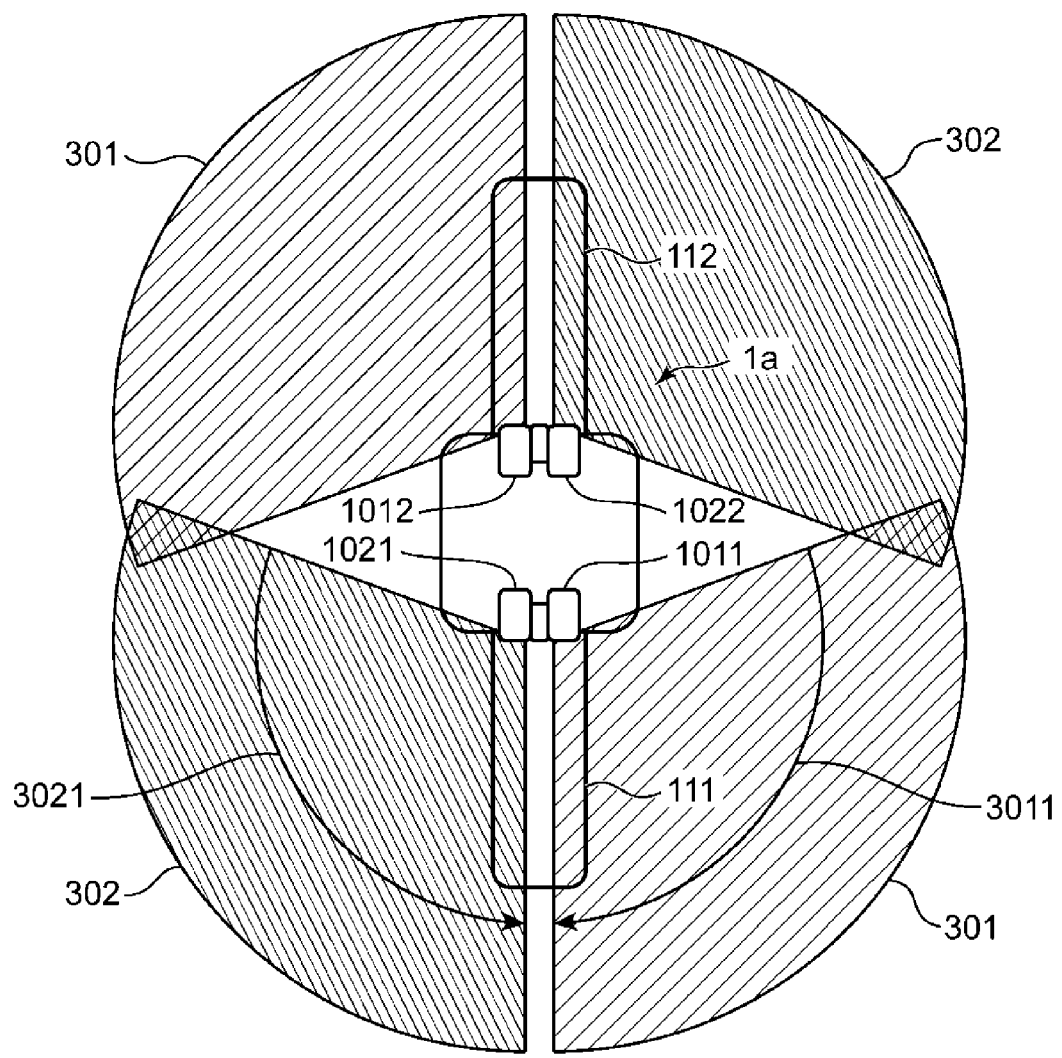
FIG. 12 is a schematic diagram for describing the first guidance signal and the second guidance signal transmitted from the robot base station composite body in a case where no robots are connected to the robot base station composite body in a second modified example of embodiment 1 of the present disclosure.

FIG. 12 is a schematic diagram for describing the first guidance signal and the second guidance signal transmitted from the robot base station composite body in a case where no robots are connected to the robot base station composite body in a second modified example of embodiment 1 of the present disclosure.

The robot base station composite body 1 in the aforementioned embodiment 1 is provided with four base stations; however, a robot base station composite body 1a in the second modified example of embodiment 1 is provided with two base stations. The robot base station composite body 1a depicted in FIG. 12 is provided with a first base station 111 and a second base station 112. It should be noted that the configurations of the first base station 111 and the second base station 112 in the second modified example of embodiment 1 are the same as the configurations of the first base station 111 and the second base station 112 of embodiment 1.

As depicted in FIG. 12, in a case where no robots 2 are connected to the robot base station composite body 1a, left-side guidance signal transmission units 1011 and 1012 of each base station 111 and 112 transmit, to the left side of each base station 111 and 112, the first guidance signal 301 which guides a robot 2 in a direction (the direction of an arrow 3011) from the left side of each base station 111 and 112 to the right side.

Furthermore, in the case where no robots 2 are connected to the robot base station composite body 1a, right-side guidance signal transmission units 1021 and 1022 of each base station 111 and 112 transmit, to the right side of each base station 111 and 112, the second guidance signal 302 which guides a robot 2 in a direction (the direction of an arrow 3021) from the right side of each base station 111 and 112 to the left side.

Figure 13:
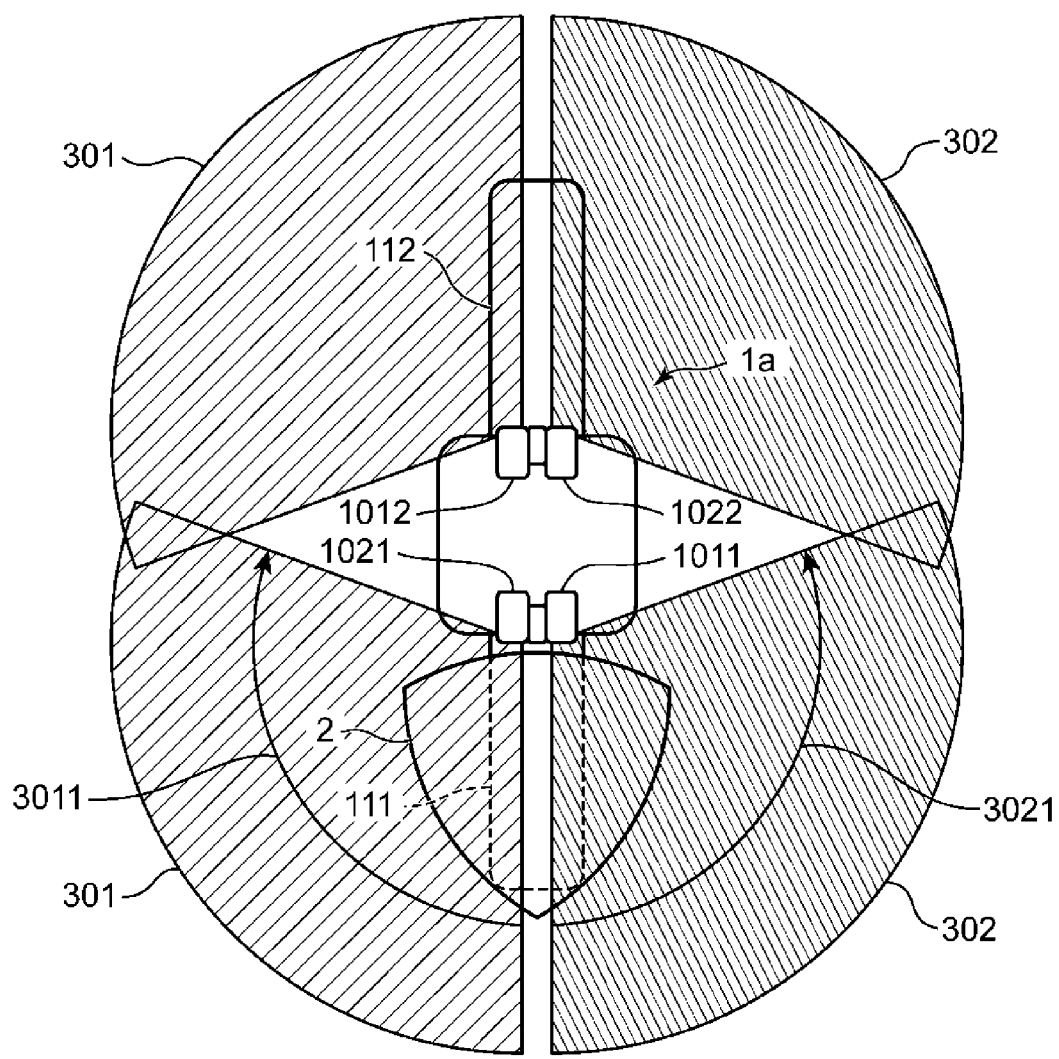
FIG. 13 is a schematic diagram for describing the first guidance signal and the second guidance signal transmitted from the robot base station composite body in a case where one robot is connected to the robot base station composite body in the second modified example of embodiment 1 of the present disclosure.

FIG. 13 is a schematic diagram for describing the first guidance signal and the second guidance signal transmitted from the robot base station composite body in a case where one robot is connected to the robot base station composite body in the second modified example of embodiment 1 of the present disclosure.

In FIG. 13, a robot 2 is connected to only the first base station 111. It should be noted that the base station to which the robot 2 is connected is not particularly determined, and the robot 2 may be connected to any base station from among the plurality of base stations.

As depicted in FIG. 13, in the case where a robot 2 is connected to only the first base station 111 of the robot base station composite body 1*a*, the left-side guidance signal transmission unit 1011 of the first base station 111 transmits, to the left side of the first base station 111, the second guidance signal 302 which guides a robot 2 in a direction (the direction of the arrow 3021) from the right side of the first base station 111 to the left side.

Furthermore, in the case where a robot 2 is connected to only the first base station 111 of the robot base station composite body 1*a*, the right-side guidance signal transmission unit 1021 of the first base station 111 transmits, to the right side of the first base station 111, the first guidance signal 301 which guides a robot 2 in a direction (the direction of the arrow 3011) from the left side of the first base station 111 to the right side.

Meanwhile, the left-side guidance signal transmission unit 1012 of the second base station 112 having no robot 2 connected thereto of the robot base station composite body 1*a* transmits, to the left side of the second base station 112, the first guidance signal 301 which guides a robot 2 in a direction from the left side of the second base station 112 to the right side, and the right-side guidance signal transmission unit 1022 of the second base station 112 transmits, to the right side of the second base station 112, the second guidance signal 302 which guides a robot 2 in a direction from the right side of the second base station 112 to the left side.

In other words, in a case where the connection detection unit 1041 of the first base station 111 has detected that a robot 2 is connected, the guidance control unit 13 calculates the distance between the first base station 111 and the base station that is closest to the first base station 111 at the left side of the first base station 111 and has no robot 2 connected thereto, and also calculates the distance between the first base station 111 and the base station that is closest to the first base station 111 at the right side of the first base station 111 and has no robot 2 connected thereto.

The base station that is closest to the first base station 111 at the left side of the first base station 111 and has no robot 2 connected thereto is the second base station 112, and therefore the guidance control unit 13 calculates the distance between the second base station 112 and the first base station 111. It should be noted that the distance is represented by the number of base stations having a robot 2 connected thereto, present between the second base station 112 and the first base station 111. In FIG. 13, the distance between the second base station 112 and the first base station 111 is 0.

Furthermore, the base station that is closest to the first base station 111 at the right side of the first base station 111 and has no robot 2 connected thereto is the second base station 112, and therefore the guidance control unit 13 calculates the distance between the second base station 112 and the first base station 111. In FIG. 13, the distance between the second base station 112 and the first base station 111 is 0.

The distance between the first base station 111 and the second base station 112 at the left side of the first base station 111 is equal to the distance between the first base station 111 and the second base station 112 at the right side of the first base station 111, and therefore the guidance control unit 13 causes the left-side guidance signal transmission unit 1011 of the first base station 111 to transmit the second guidance signal 302, and also causes the right-side guidance signal transmission unit 1021 to transmit the first guidance signal 301.

In this way, in the case where a robot 2 is connected to only the first base station 111 of the robot base station composite body 1*a*, the guidance signal transmitted from the left-side guidance signal transmission unit 1011 of the first base station 111 is switched from the first guidance signal 301 to the second guidance signal 302, and the guidance signal transmitted from the right-side guidance signal transmission unit 1021 of the first base station 111 is switched from the second guidance signal 302 to the first guidance signal 301.

Thus, another robot 2 that has detected the second guidance signal 302 transmitted from the left-side guidance signal transmission unit 1011 of the first base station 111 to which a robot 2 is connected moves in the direction of the arrow 3021 in which the second base station 112 is present, and is guided toward the second base station 112. Furthermore, another robot 2 that has detected the first guidance signal 301 transmitted from the right-side guidance signal transmission unit 1021 of the first base station 111 to which a robot 2 is connected moves in the direction of the arrow 3011 in which the second base station 112 is present, and is guided toward the second base station 112.

Consequently, using guidance signals transmitted from a base station to which a robot 2 is already connected, another robot 2 that is not connected to a base station can be guided to a base station having no robot 2 connected thereto, a plurality of robots 2 can be reliably returned to base stations, and also the time taken for all of the plurality of robots 2 to return to the base stations can be shortened.

Figure 14:
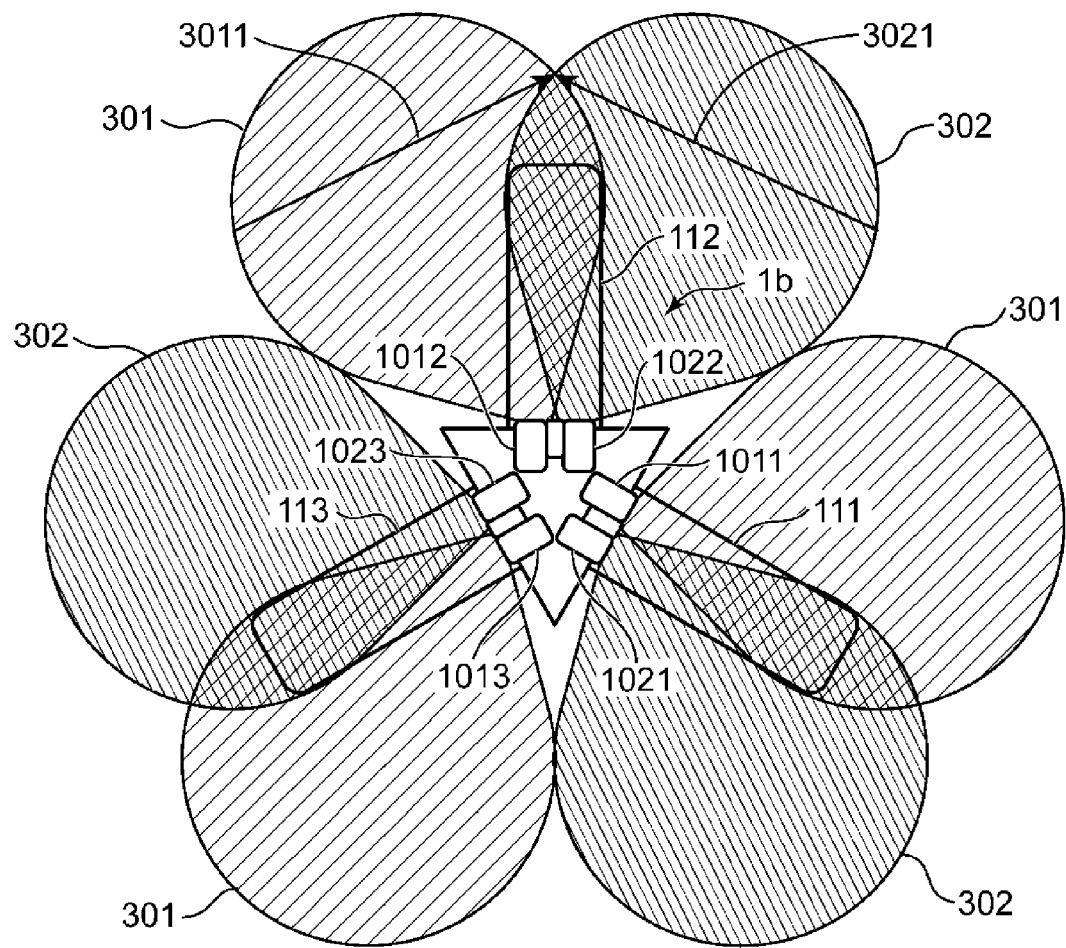
FIG. 14 is a schematic diagram for describing the first guidance signal and the second guidance signal transmitted from the robot base station composite body in a case where no robots are connected to the robot base station composite body in a third modified example of embodiment 1 of the present disclosure.

FIG. 14 is a schematic diagram for describing the first guidance signal and the second guidance signal transmitted from the robot base station composite body in a case where no robots are connected to the robot base station composite body in a third modified example of embodiment 1 of the present disclosure.

The robot base station composite body 1 in the aforementioned embodiment 1 is provided with four base stations; however, a robot base station composite body 1*b* in the third modified example of embodiment 1 is provided with three base stations. The robot base station composite body 1*b* depicted in FIG. 14 is provided with a first base station 111, a second base station 112, and a third base station 113. It should be noted that the configurations of the first base station 111, the second base station 112, and the third base station 113 in the third modified example of embodiment 1 are the same as the configurations of the first base station 111, the second base station 112, and the third base station 113 of embodiment 1.

As depicted in FIG. 14, in a case where no robots 2 are connected to the robot base station composite body 1*b*, left-side guidance signal transmission units 1011, 1012, and 1013 of each base station 111, 112, and 113 transmit, to the left side of each base station 111, 112, and 113, the first guidance signal 301 that guides a robot 2 in a direction (the direction of an arrow 3011) from the left side of each base station 111, 112, and 113 to the right side.

Furthermore, in the case where no robots 2 are connected to the robot base station composite body 1b, right-side guidance signal transmission units 1021, 1022, and 1023 of each base station 111, 112, and 113 transmit, to the right side of each base station 111, 112, and 113, the second guidance signal 302 that guides a robot 2 in a direction (the direction of an arrow 3021) from the right side of each base station 111, 112, and 113 to the left side.

Figure 15:
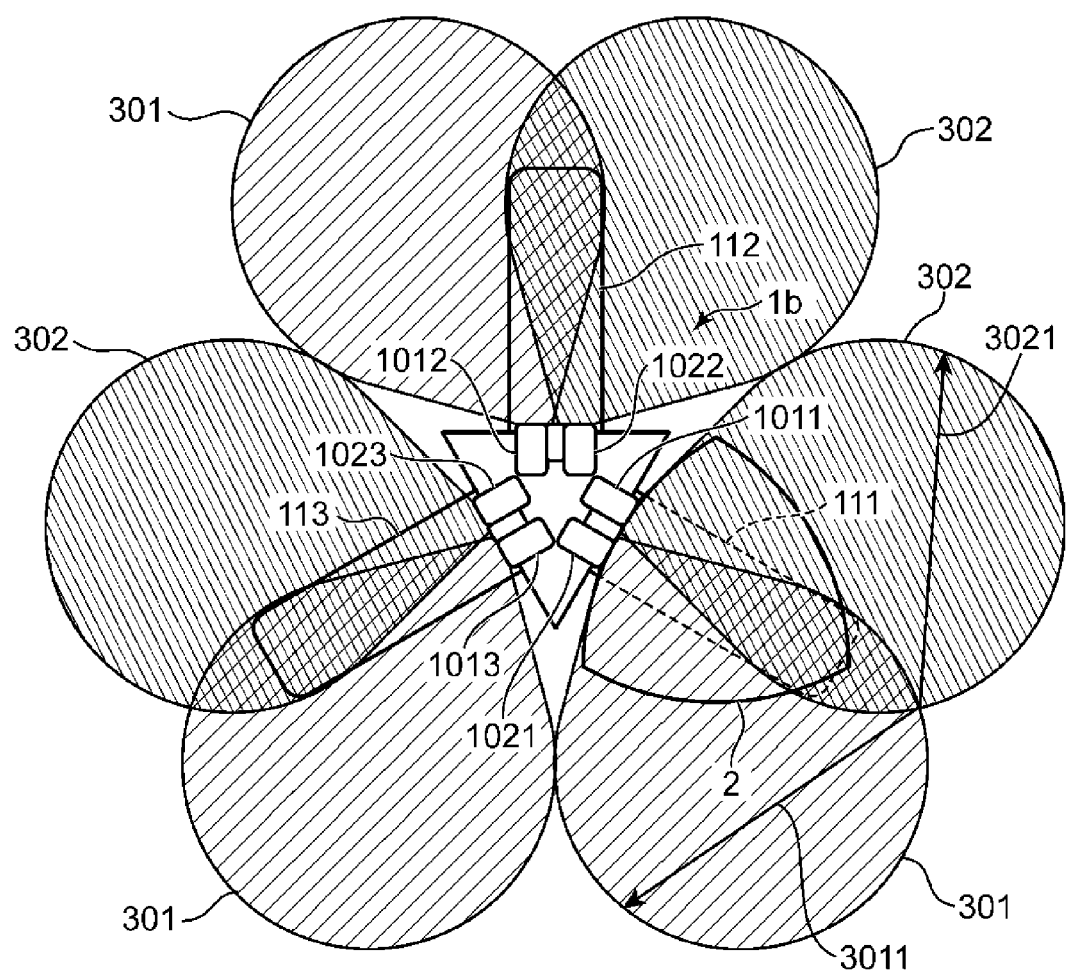
FIG. 15 is a schematic diagram for describing the first guidance signal and the second guidance signal transmitted from the robot base station composite body in a case where one robot is connected to the robot base station composite body in the third modified example of embodiment 1 of the present disclosure.

FIG. 15 is a schematic diagram for describing the first guidance signal and the second guidance signal transmitted from the robot base station composite body in a case where one robot is connected to the robot base station composite body in the third modified example of embodiment 1 of the present disclosure.

In FIG. 15, a robot 2 is connected to only the first base station 111. It should be noted that the base station to which the robot 2 is connected is not particularly determined, and the robot 2 may be connected to any base station from among the plurality of base stations.

As depicted in FIG. 15, in the case where a robot 2 is connected to only the first base station 111 of the robot base station composite body 1b, the left-side guidance signal transmission unit 1011 of the first base station 111 transmits, to the left side of the first base station 111, the second guidance signal 302 which guides a robot 2 in a direction (the direction of the arrow 3021) from the right side of the first base station 111 to the left side.

Furthermore, in the case where a robot 2 is connected to only the first base station 111 of the robot base station composite body 1b, the right-side guidance signal transmission unit 1021 of the first base station 111 transmits, to the right side of the first base station 111, the first guidance signal 301 which guides a robot 2 in a direction (the direction of the arrow 3011) from the left side of the first base station 111 to the right side.

Meanwhile, the left-side guidance signal transmission units 1012 and 1013 of the base stations 112 and 113 having no robots 2 connected thereto of the robot base station composite body 1b transmit, to the left side of each base station 112 and 113, the first guidance signal 301 which guides a robot 2 in a direction from the left side of each base station 112 and 113 to the right side, and the right-side guidance signal transmission units 1022 and 1023 of the base stations 112 and 113 transmit, to the right side of each base station 112 and 113, the second guidance signal 302 which guides a robot 2 in a direction from the right side of each base station 112 and 113 to the left side.

In other words, in a case where the connection detection unit 1041 of the first base station 111 has detected that a robot 2 is connected, the guidance control unit 13 calculates the distance between the first base station 111 and the base station that is closest to the first base station 111 at the left side of the first base station 111 and has no robot 2 connected thereto, and also calculates the distance between the first base station 111 and the base station that is closest to the first base station 111 at the right side of the first base station 111 and has no robot 2 connected thereto.

The base station that is closest to the first base station 111 at the left side of the first base station 111 and has no robot 2 connected thereto is the second base station 112, and therefore the guidance control unit 13 calculates the distance between the second base station 112 and the first base station 111. It should be noted that the distance is represented by the number of base stations having a robot 2 connected thereto, present between the second base station 112 and the first base station 111. In FIG. 15, the distance between the second base station 112 and the first base station 111 is 0.

Furthermore, the base station that is closest to the first base station 111 at the right side of the first base station 111 and has no robot 2 connected thereto is the third base station 113, and therefore the guidance control unit 13 calculates the distance between the third base station 113 and the first base station 111. In FIG. 15, the distance between the third base station 113 and the first base station 111 is 0.

The distance between the second base station 112 and the first base station 111 is equal to the distance between the third base station 113 and the first base station 111, and therefore the guidance control unit 13 causes the left-side guidance signal transmission unit 1011 of the first base station 111 to transmit the second guidance signal 302, and also causes the right-side guidance signal transmission unit 1021 to transmit the first guidance signal 301.

In this way, in the case where a robot 2 is connected to only the first base station 111 of the robot base station composite body 1b, the guidance signal transmitted from the left-side guidance signal transmission unit 1011 of the first base station 111 is switched from the first guidance signal 301 to the second guidance signal 302, and the guidance signal transmitted from the right-side guidance signal transmission unit 1021 of the first base station 111 is switched from the second guidance signal 302 to the first guidance signal 301.

Thus, another robot 2 that has detected the second guidance signal 302 transmitted from the left-side guidance signal transmission unit 1011 of the first base station 111 to which a robot 2 is connected moves in the direction of the arrow 3021 in which the second base station 112 is present, and is guided toward the second base station 112. Furthermore, another robot 2 that has detected the first guidance signal 301 transmitted from the right-side guidance signal transmission unit 1021 of the first base station 111 to which the robot 2 is connected moves in the direction of the arrow 3011 in which the third base station 113 is present, and is guided toward the third base station 113.

Consequently, using guidance signals transmitted from a base station to which a robot 2 is already connected, another robot 2 that is not connected to a base station can be guided to a base station having no robot 2 connected thereto, a plurality of robots 2 can be reliably returned to base stations, and also the time taken for all of the plurality of robots 2 to return to the base stations can be shortened.

Figure 16:
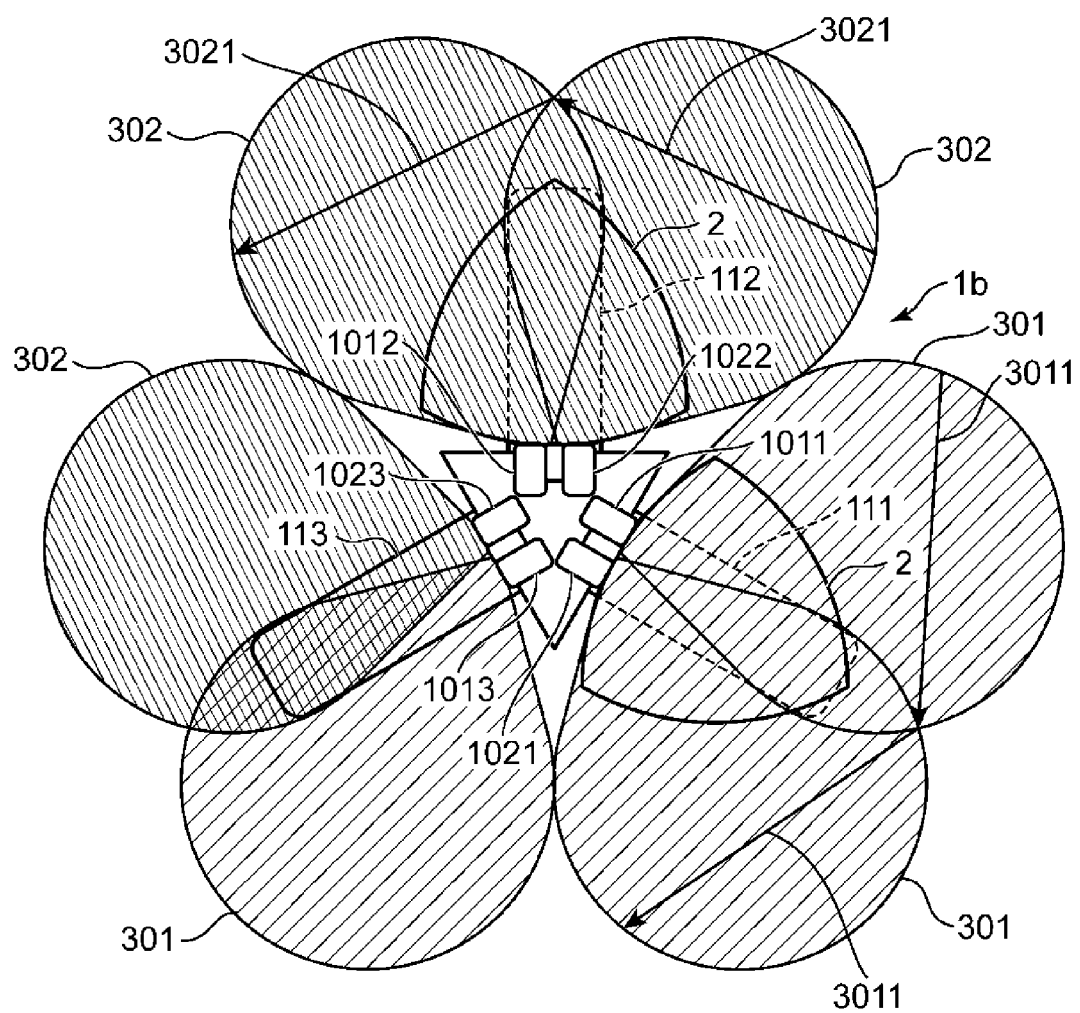
FIG. 16 is a schematic diagram for describing the first guidance signal and the second guidance signal transmitted from the robot base station composite body in a case where two robots are connected to the robot base station composite body in the third modified example of embodiment 1 of the present disclosure.

FIG. 16 is a schematic diagram for describing the first guidance signal and the second guidance signal transmitted from the robot base station composite body in a case where two robots are connected to the robot base station composite body in the third modified example of embodiment 1 of the present disclosure.

In FIG. 16, robots 2 are connected to the first base station 111 and the second base station 112, and no robot 2 is connected to the third base station 113.

As depicted in FIG. 16, in the case where robots 2 are connected to each of the first base station 111 and the second base station 112 of the robot base station composite body 1b, the left-side guidance signal transmission unit 1011 of the first base station 111 transmits, to the left side of the first base station 111, the first guidance signal 301 which guides a robot 2 in a direction (the direction of the arrow 3011) from the left side of the first base station 111 to the right side.

Furthermore, in the case where robots 2 are connected to each of the first base station 111 and the second base station 112 of the robot base station composite body 1b, the right-side guidance signal transmission unit 1021 of the first base station 111 transmits, to the right side of the first base station 111, the first guidance signal 301 which guides a robot 2 in a direction (the direction of the arrow 3011) from the left side of the first base station 111 to the right side.

Furthermore, in the case where robots 2 are connected to each of the first base station 111 and the second base station 112 of the robot base station composite body 1*b*, the left-side guidance signal transmission unit 1012 of the second base station 112 transmits, to the left side of the second base station 112, the second guidance signal 302 which guides a robot 2 in a direction (the direction of the arrow 3021) from the right side of the second base station 112 to the left side.

Furthermore, in the case where robots 2 are connected to each of the first base station 111 and the second base station 112 of the robot base station composite body 1*b*, the right-side guidance signal transmission unit 1022 of the second base station 112 transmits, to the right side of the second base station 112, the second guidance signal 302 which guides a robot 2 in a direction (the direction of the arrow 3021) from the right side of the second base station 112 to the left side.

Meanwhile, the left-side guidance signal transmission unit 1013 of the third base station 113 having no robot 2 connected thereto of the robot base station composite body 1*b* transmits, to the left side of the third base station 113, the first guidance signal 301 which guides a robot 2 in a direction from the left side of the third base station 113 to the right side, and the right-side guidance signal transmission unit 1023 of the third base station 113 transmits, to the right side of the third base station 113, the second guidance signal 302 which guides a robot 2 in a direction from the right side of the third base station 113 to the left side.

In other words, in a case where the connection detection unit 1041 of the first base station 111 has detected that a robot 2 is connected, the guidance control unit 13 calculates the distance between the first base station 111 and the base station that is closest to the first base station 111 at the left side of the first base station 111 and has no robot 2 connected thereto, and also calculates the distance between the first base station 111 and the base station that is closest to the first base station 111 at the right side of the first base station 111 and has no robot 2 connected thereto.

The base station that is closest to the first base station 111 at the left side of the first base station 111 and has no robot 2 connected thereto is the third base station 113, and therefore the guidance control unit 13 calculates the distance between the third base station 113 and the first base station 111. It should be noted that the distance is represented by the number of base stations having a robot 2 connected thereto, present at the left side of the first base station 111 and present between the third base station 113 and the first base station 111. In FIG. 16, the second base station 112 is between the first base station 111 and the third base station 113 at the left side of the first base station 111, and therefore the distance between the first base station 111 and the third base station 113 at the left side of the first base station 111 is 1.

Furthermore, the base station that is closest to the first base station 111 at the right side of the first base station 111 and has no robot 2 connected thereto is the third base station 113, and therefore the guidance control unit 13 calculates the distance between the third base station 113 and the first base station 111. It should be noted that the distance is represented by the number of base stations having a robot 2 connected thereto, present at the right side of the first base station 111 and present between the third base station 113 and the first base station 111. In FIG. 16, the distance between the first base station 111 and the third base station 113 to the right side of the first base station 111 is 0.

The distance between the first base station 111 and the third base station 113 at the left side of the first base station 111 is greater than the distance between the first base station 111 and the third base station 113 at the right side of the first base station 111, and therefore the guidance control unit 13 causes both the left-side guidance signal transmission unit 1011 and the right-side guidance signal transmission unit 1021 of the first base station 111 to transmit the first guidance signal 301.

In addition, in a case where the connection detection unit 1042 of the second base station 112 has detected that a robot 2 is connected, the guidance control unit 13 calculates the distance between the second base station 112 and the base station that is closest to the second base station 112 at the left side of the second base station 112 and has no robot 2 connected thereto, and also calculates the distance between the second base station 112 and the base station that is closest to the second base station 112 at the right side of the second base station 112 and has no robot 2 connected thereto.

The base station that is closest to the second base station 112 at the left side of the second base station 112 and has no robot 2 connected thereto is the third base station 113, and therefore the guidance control unit 13 calculates the distance between the third base station 113 and the second base station 112. It should be noted that the distance is represented by the number of base stations having a robot 2 connected thereto, present at the left side of the second base station 112 and present between the third base station 113 and the second base station 112. In FIG. 16, the distance between the second base station 112 and the third base station 113 to the left side of the second base station 112 is 0.

Furthermore, the base station that is closest to the second base station 112 at the right side of the second base station 112 and has no robot 2 connected thereto is the third base station 113, and therefore the guidance control unit 13 calculates the distance between the third base station 113 and the second base station 112. It should be noted that the distance is represented by the number of base stations having a robot 2 connected thereto, present at the right side of the second base station 112 and present between the third base station 113 and the second base station 112. In FIG. 16, the first base station 111 is between the second base station 112 and the third base station 113 at the right side of the second base station 112, and therefore the distance between the third base station 113 and the second base station 112 is 1.

The distance between the second base station 112 and the third base station 113 at the left side of the second base station 112 is less than the distance between the second base station 112 and the third base station 113 at the right side of the second base station 112, and therefore the guidance control unit 13 causes both the left-side guidance signal transmission unit 1012 and the right-side guidance signal transmission unit 1022 of the second base station 112 to transmit the second guidance signal 302.

In this way, in the case where robots 2 are connected to each of the first base station 111 and the second base station 112 of the robot base station composite body 1*b*, the guidance signal transmitted from the right-side guidance signal transmission unit 1021 of the first base station 111 is switched from the second guidance signal 302 to the first guidance signal 301, and the guidance signal transmitted from the left-side guidance signal transmission unit 1012 of the second base station 112 is switched from the first guidance signal 301 to the second guidance signal 302.

Thus, another robot 2 that has detected the first guidance signal 301 transmitted from the left-side guidance signal transmission unit 1011 and the first guidance signal 301 transmitted from the right-side guidance signal transmission unit 1021 of the first base station 111 to which a robot 2 is connected moves in the direction of the arrows 3011 in which the third base station 113 is present, and is guided toward the third base station 113. Furthermore, another robot 2 that has detected the second guidance signal 302 transmitted from the left-side guidance signal transmission unit 1012 and the second guidance signal 302 transmitted from the right-side guidance signal transmission unit 1022 of the second base station 112 to which a robot 2 is connected moves in the direction of the arrows 3021 in which the third base station 113 is present, and is guided toward the third base station 113.

Consequently, using guidance signals transmitted from a base station to which a robot 2 is already connected, another robot 2 that is not connected to a base station can be guided to a base station having no robot 2 connected thereto, a plurality of robots 2 can be reliably returned to base stations, and also the time taken for all of the plurality of robots 2 to return to the base stations can be shortened.

Figure 17:
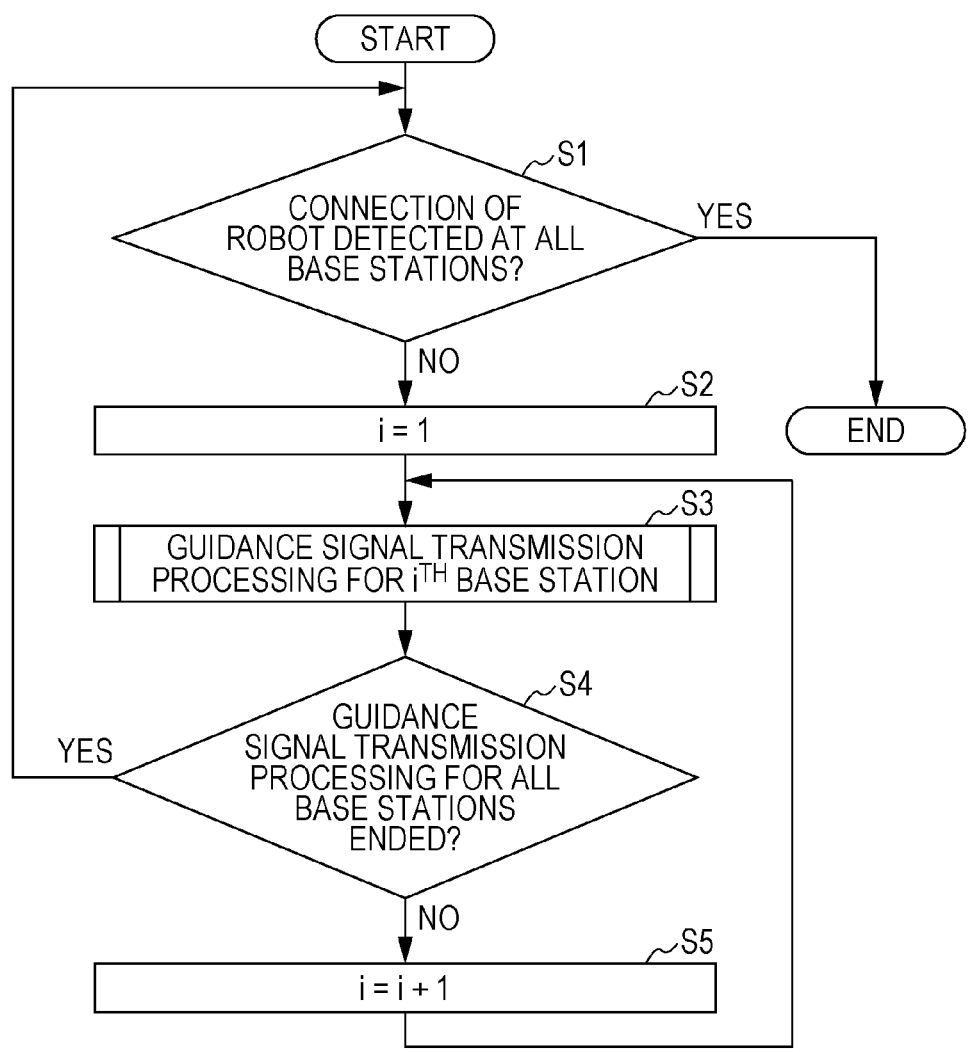
FIG. 17 is a flowchart for describing guidance processing carried out by the robot base station composite body in embodiment 1 of the present disclosure.

FIG. 17 is a flowchart for describing guidance processing carried out by the robot base station composite body in embodiment 1 of the present disclosure.

First, in step S1, the guidance control unit 13 determines whether or not the connection of a robot has been detected at all of the base stations provided in the robot base station composite body 1. Here, in a case where it is determined that the connection of a robot has been detected at all of the base stations (yes in step S1), the guidance processing carried out by the robot base station composite body 1 ends.

However, in a case where it is determined that the connection of a robot has not been detected at all of the base stations (no in step S1), in step S2, the guidance control unit 13 sets a variable i to 1. It should be noted that the variable i is a variable for specifying one base station from among the plurality of base stations.

Next, in step S3, the guidance control unit 13 executes guidance signal transmission processing for the $i^{th}$ base station. It should be noted that the guidance signal transmission processing for the $i^{th}$ base station in step S3 will be described later on using FIG. 18. In the present embodiment 1, guidance signal transmission processing is executed in sequence for the first base station 111, the second base station 112, the third base station 113, and the fourth base station 114.

Next, in step S4, the guidance control unit 13 determines whether or not the guidance signal transmission processing for all of the base stations has ended. Here, in a case where it is determined that the guidance signal transmission processing for all of the base stations has ended (yes in step S4), processing returns to step S1.

However, in a case where it is determined that the guidance signal transmission processing for all of the base stations has not ended (no in step S4), in step S5, the guidance control unit 13 increments the variable i, and processing returns to step S3.

Next, the guidance signal transmission processing for the $i^{th}$ base station in step S3 of FIG. 17 will be described.

Figure 18:
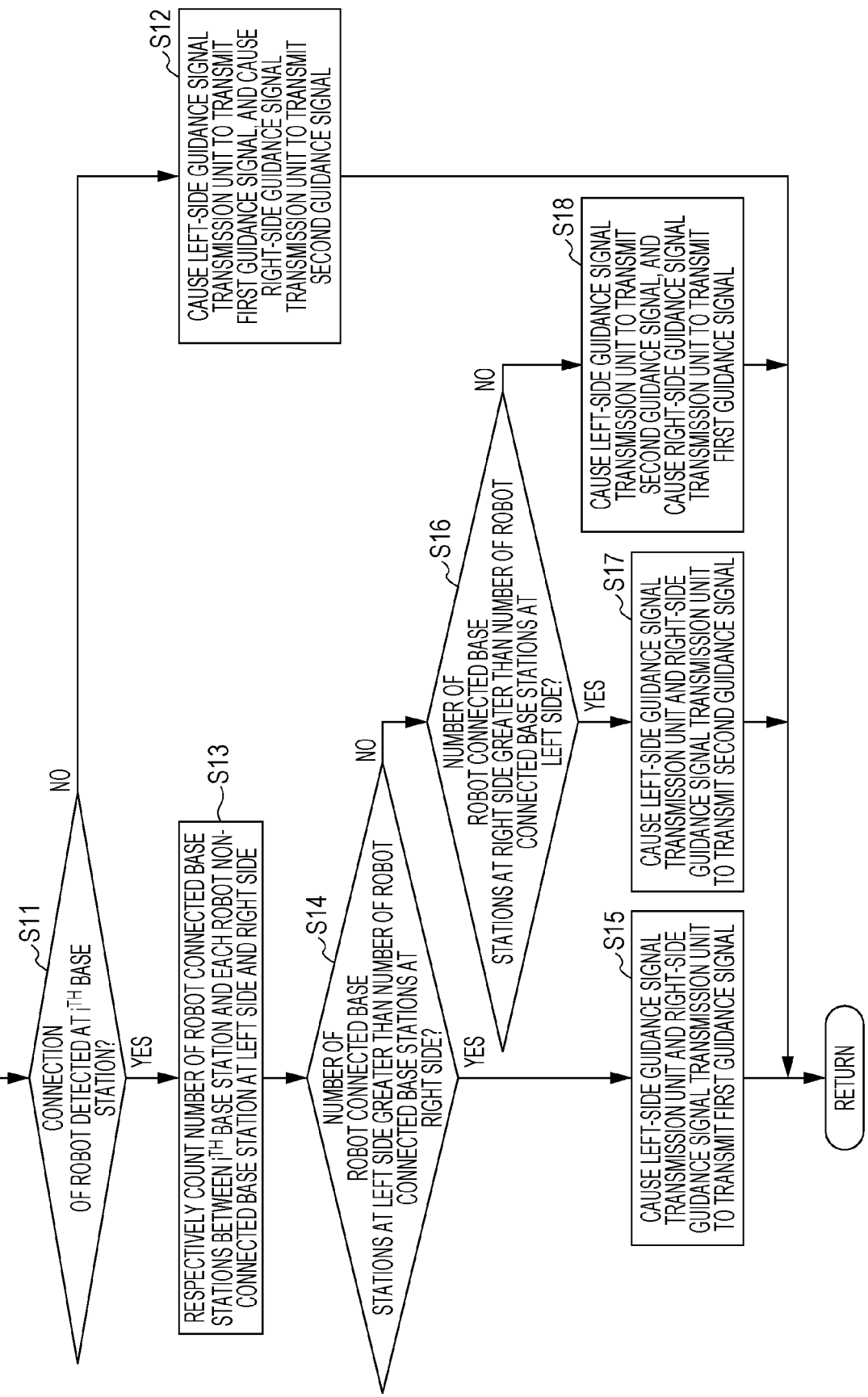
FIG. 18 is a flowchart for describing guidance signal transmission processing for an $i^{th}$ base station in step S3 of FIG. 17.

FIG. 18 is a flowchart for describing the guidance signal transmission processing for the $i^{th}$ base station in step S3 of FIG. 17.

First, in step S11, the guidance control unit 13 determines whether or not the connection of a robot has been detected at the $i^{th}$ base station. Here, in a case where it is determined that the connection of a robot has not been detected at the $i^{th}$ base station (no in step S11), in step S12, the guidance control unit 13 causes the left-side guidance signal transmission unit of the $i^{th}$ base station to transmit the first guidance signal, and causes the right-side guidance signal transmission unit of the $i^{th}$ base station to transmit the second guidance signal.

However, in a case where it is determined that the connection of a robot has been detected at the $i^{th}$ base station (yes in step S11), in step S13, the guidance control unit 13 counts the number of base stations having a robot connected thereto (robot connected base stations), between the $i^{th}$ base station and each base station having no robot connected thereto (robot non-connected base stations), present at the left side and the right side.

Next, in step S14, the guidance control unit 13 determines whether or not the number of robot connected base stations at the left side is greater than the number of robot connected base stations at the right side. Here, in a case where it is determined that the number of robot connected base stations at the left side is greater than the number of robot connected base stations at the right side (yes in step S14), in step S15, the guidance control unit 13 causes both the left-side guidance signal transmission unit and the right-side guidance signal transmission unit of the $i^{th}$ base station to transmit the first guidance signal.

However, in a case where it is determined that the number of robot connected base stations at the left side is not greater than the number of robot connected base stations at the right side, in other words, that the number of robot connected base stations at the left side is equal to or less than the number of robot connected base stations at the right side (no in step S14), in step S16, the guidance control unit 13 determines whether or not the number of robot connected base stations at the right side is greater than the number of robot connected base stations at the left side.

Here, in a case where it is determined that the number of robot connected base stations at the right side is greater than the number of robot connected base stations at the left side, in other words, that the number of robot connected base stations at the left side is less than the number of robot connected base stations at the right side (yes in step S16), in step S17, the guidance control unit 13 causes both the left-side guidance signal transmission unit and the right-side guidance signal transmission unit of the $i^{th}$ base station to transmit the second guidance signal.

However, in a case where it is determined that the number of robot connected base stations at the right side is not greater than the number of robot connected base stations at the left side, in other words, that the number of robot connected base stations at the left side is equal to the number of robot connected base stations at the right side (no in step S16), in step S18, the guidance control unit 13 causes the left-side guidance signal transmission unit of the $i^{th}$ base station to transmit the second guidance signal, and causes the right-side guidance signal transmission unit of the $i^{th}$ base station to transmit the first guidance signal.

Embodiment 2

In embodiment 1, a robot base station composite body provided with a plurality of base stations was described; however, in embodiment 2, a robot base station alone will be described.

Figure 19:
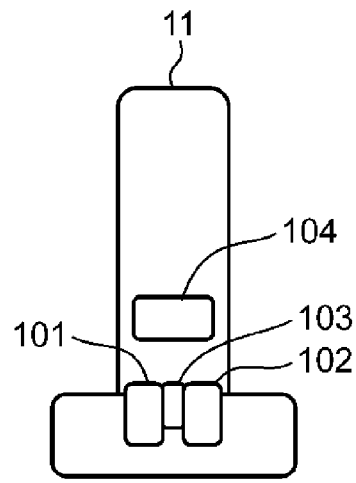
FIG. 19 is a drawing depicting an example of an overall configuration of a robot base station in embodiment 2 of the present disclosure.
Figure 20:
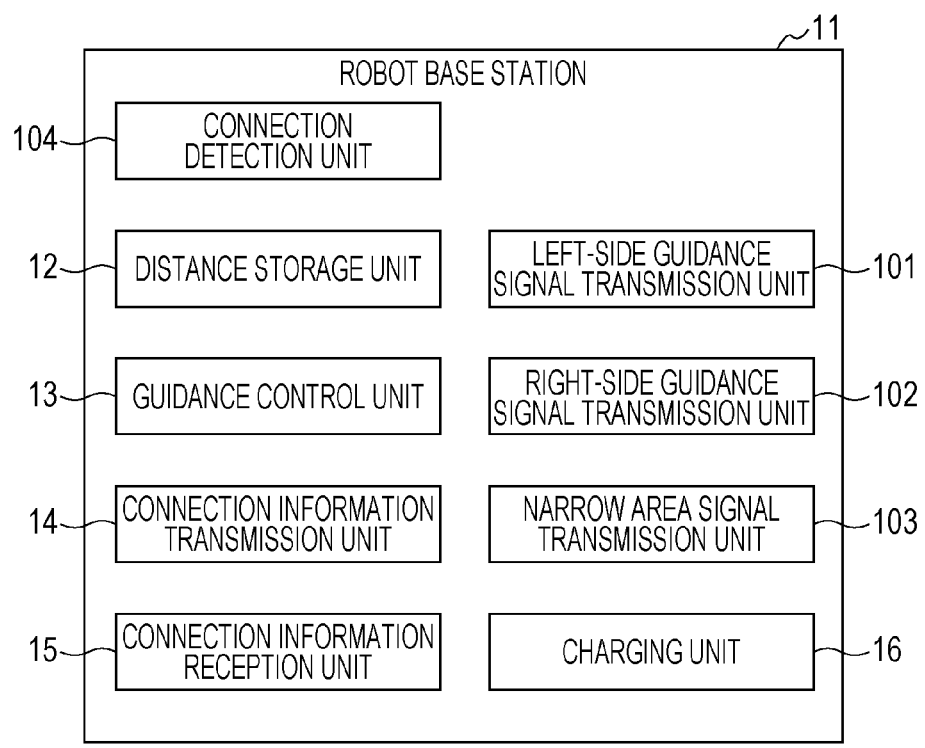
FIG. 20 is a block diagram depicting an example of a functional configuration of the robot base station in embodiment 2 of the present disclosure.

FIG. 19 is a drawing depicting an example of an overall configuration of a robot base station in embodiment 2 of the present disclosure, and FIG. 20 is a block diagram depicting an example of a functional configuration of the robot base station in embodiment 2 of the present disclosure. It should be noted that FIG. 19 is a drawing in which a robot base station 11 is seen from above.

The robot base station 11 depicted in FIGS. 19 and 20 is provided with a distance storage unit 12, a guidance control unit 13, a connection information transmission unit 14, a connection information reception unit 15, a charging unit 16, a left-side guidance signal transmission unit 101, a right-side guidance signal transmission unit 102, a narrow area signal transmission unit 103, and a connection detection unit 104. The robot base station 11 is an example of a mobile body base station, and one robot from among a plurality of robots is to be connected thereto.

The left-side guidance signal transmission unit 101 transmits, to the left side (one side) of the robot base station 11, a first guidance signal that guides the one robot in a direction from the left side (the one side) of the robot base station 11 to the right side (the other side), or a second guidance signal that guides the one robot in a direction from the right side (the other side) of the robot base station 11 to the left side (the one side).

The right-side guidance signal transmission unit 102 transmits the first guidance signal or the second guidance signal to the right side (the other side) of the robot base station 11.

The connection detection unit 104 detects whether or not the one robot is connected to the robot base station 11.

The connection information transmission unit 14 transmits, to other robot base stations, connection information indicating whether or not the one robot is connected to the robot base station 11. The connection information reception unit 15 receives connection information transmitted by the other robot base stations.

The distance storage unit 12 stores the distance between the other robot base stations and the robot base station 11.

The guidance control unit 13 guides the one robot to the robot base station 11, and also guides other robots to the other robot base stations.

In a case where the connection detection unit 104 has detected that the one robot is not connected, the guidance control unit 13 causes the left-side guidance signal transmission unit 101 to transmit the first guidance signal, and also causes the right-side guidance signal transmission unit 102 to transmit the second guidance signal.

Furthermore, in a case where the connection detection unit 104 has detected that the one robot is connected, and the distance between the robot base station 11 and a first other robot base station that is closest to the robot base station 11 at the left side (one side) of the robot base station 11 and to which a first other robot is not connected is greater than the distance between the robot base station 11 and a second other robot base station that is closest to the robot base station 11 at the right side (the other side) of the robot base station 11 and to which a second other robot is not connected, the guidance control unit 13 causes both the left-side guidance signal transmission unit 101 and the right-side guidance signal transmission unit 102 to transmit the first guidance signal.

Furthermore, in a case where the connection detection unit 104 has detected that the one robot is connected, and the distance between the robot base station 11 and the first other robot base station is less than the distance between the robot base station 11 and the second other robot base station, the guidance control unit 13 causes both the left-side guidance signal transmission unit 101 and the right-side guidance signal transmission unit 102 to transmit the second guidance signal.

Furthermore, in a case where the connection detection unit 104 has detected that the one robot is connected, and the distance between the robot base station 11 and the first other robot base station is equal to the distance between the robot base station 11 and the second other robot base station, the guidance control unit 13 causes the left-side guidance signal transmission unit 101 to transmit the second guidance signal, and causes the right-side guidance signal transmission unit 102 to transmit the first guidance signal.

It should be noted that the guidance control unit 13 calculates the distance between the robot base station 11 and the first other robot base station and the distance between the robot base station 11 and the second other robot base station on the basis of the distances stored in the distance storage unit 12 and the connection information received by the connection information reception unit 15.

The charging unit 16 carries out charging with respect to a storage battery provided in a robot 2 connected to the robot base station 11. When the robot 2 is connected to the robot base station 11, the charging contact of the robot base station 11 and the charging contact of the robot 2 make contact, and charging to the storage battery of the robot 2 is started.

Figure 21:
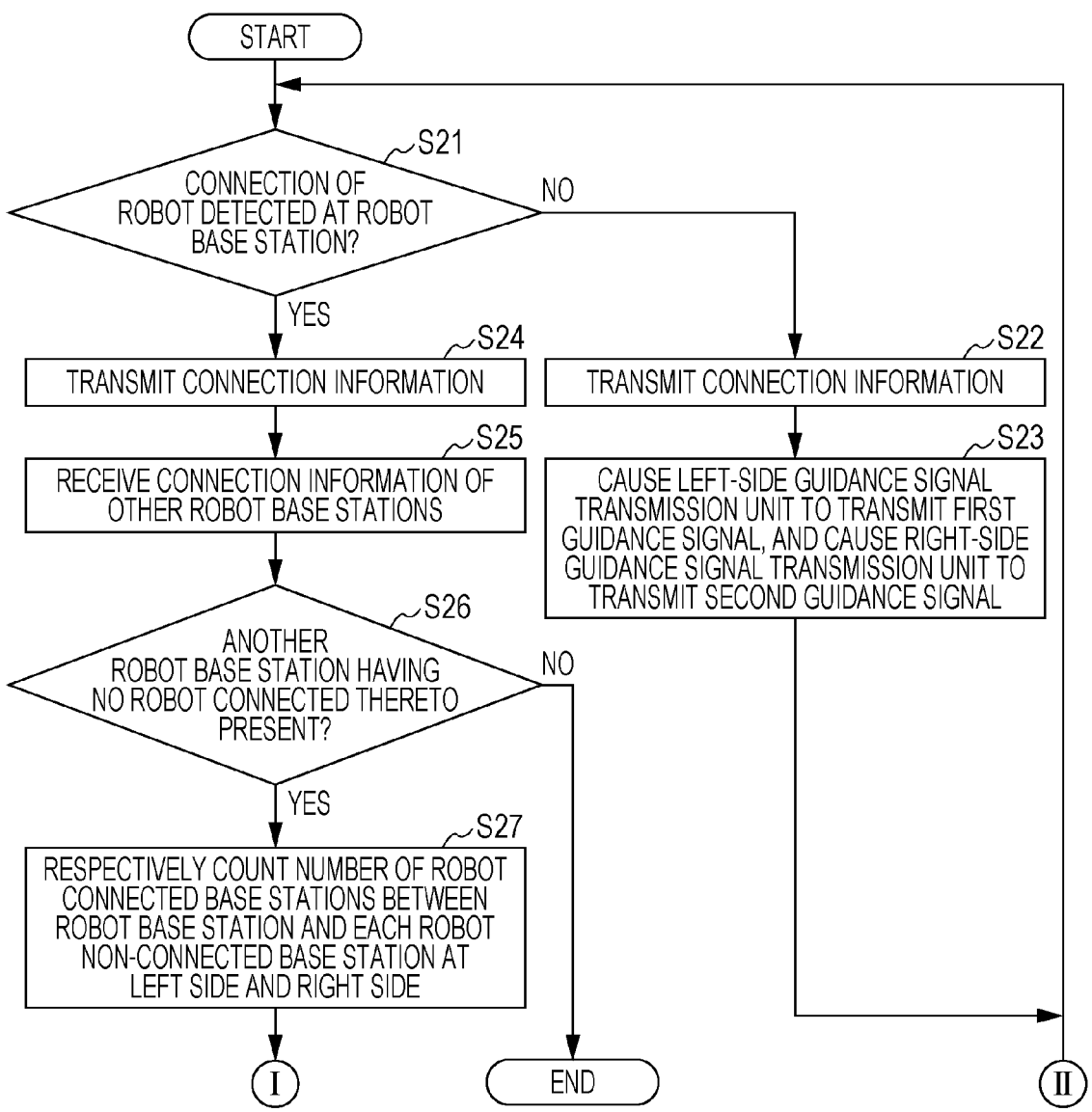
FIG. 21 is a first flowchart for describing guidance processing carried out by the robot base station in embodiment 2 of the present disclosure.
Figure 22:
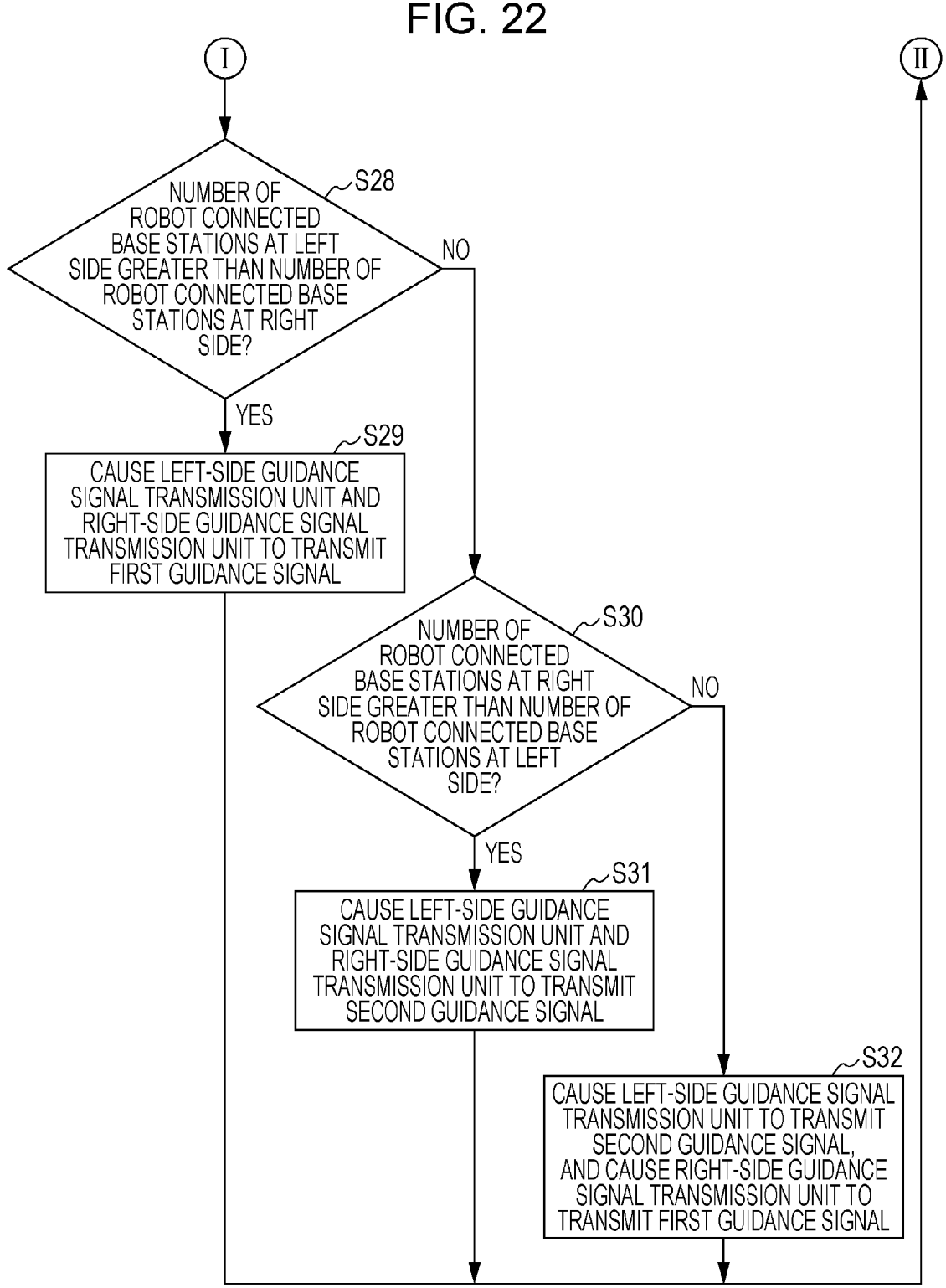
FIG. 22 is a second flowchart for describing guidance processing carried out by the robot base station in embodiment 2 of the present disclosure.

FIG. 21 is a first flowchart for describing guidance processing carried out by the robot base station in embodiment 2 of the present disclosure, and FIG. 22 is a second flowchart for describing guidance processing carried out by the robot base station in embodiment 2 of the present disclosure.

First, in step S21, the guidance control unit 13 determines whether or not the connection of a robot 2 has been detected at the robot base station 11. Here, in a case where it is determined that the connection of a robot 2 has not been detected at the robot base station 11 (no in step S21), in step S22, the connection information transmission unit 14 transmits connection information indicating that a robot 2 is not connected to the robot base station 11, to other robot base stations.

Next, in step S23, the guidance control unit 13 causes the left-side guidance signal transmission unit 101 of the robot base station 11 to transmit the first guidance signal, and causes the right-side guidance signal transmission unit 102 of the robot base station 11 to transmit the second guidance signal.

However, in a case where it is determined that the connection of a robot 2 has been detected at the robot base station 11 (yes in step S21), in step S24, the connection information transmission unit 14 transmits connection information indicating that a robot 2 is connected to the robot base station 11, to other robot base stations.

Next, in step S25, the connection information reception unit 15 receives connection information indicating whether or not robots 2 are connected to the other robot base stations, from the other robot base stations. In embodiment 1, connection information is received from the other robot base stations in step S25; however, it should be noted that the timing at which the connection information reception unit 15 receives connection information from the other robot base stations is not particularly restricted thereto. The connection information reception unit 15, when having received connection information from the other robot base stations, may store a table having associated therein the other robot base stations and information indicating whether or not robots are connected to the other robot base stations, in a memory that is not depicted. Furthermore, the connection information transmission unit 14 may request another robot base station for connection information after having transmitted the connection information of itself to the other robot base station. In this case, the other robot base station, when having received the request from the robot base station 11, may return the connection information of itself to the robot base station 11.

Next, in step S26, the guidance control unit 13 determines whether or not other robot base stations having no robot 2 connected thereto are present. Here, in a case where it is determined that other robot base stations having no robot 2 connected thereto are not present, in other words, in a case where it is determined that robots are connected to all of the robot base stations within the system (no in step S26), the guidance processing carried out by the robot base station 11 ends. The guidance control unit 13 refers to the table stored in the memory that is not depicted, and determines whether or not robots are connected to the other robot base stations.

However, in a case where it is determined that other robot base stations having no robot 2 connected thereto are present (yes in step S26), in step S27, the guidance control unit 13 counts the number of other robot base stations having a robot connected thereto (robot connected base stations), between the robot base station 11 and each of the other robot base stations having no robot connected thereto (robot non-connected base stations), present at the left side and the right side.

Next, in step S28, the guidance control unit 13 determines whether or not the number of robot connected base stations at the left side is greater than the number of robot connected base stations at the right side. Here, in a case where it is determined that the number of robot connected base stations at the left side is greater than the number of robot connected base stations at the right side (yes in step S28), in step S29, the guidance control unit 13 causes both the left-side guidance signal transmission unit 101 and the right-side guidance signal transmission unit 102 to transmit the first guidance signal.

However, in a case where it is determined that the number of robot connected base stations at the left side is not greater than the number of robot connected base stations at the right side, in other words, that the number of robot connected base stations at the left side is equal to or less than the number of robot connected base stations at the right side (no in step S28), in step S30, the guidance control unit 13 determines whether or not the number of robot connected base stations at the right side is greater than the number of robot connected base stations at the left side.

Here, in a case where it is determined that the number of robot connected base stations at the right side is greater than the number of robot connected base stations at the left side, in other words, that the number of robot connected base stations at the left side is less than the number of robot connected base stations at the right side (yes in step S30), in step S31, the guidance control unit 13 causes both the left-side guidance signal transmission unit 101 and the right-side guidance signal transmission unit 102 to transmit the second guidance signal.

However, in a case where it is determined that the number of robot connected base stations at the right side is not greater than the number of robot connected base stations at the left side, in other words, that the number of robot connected base stations at the left side is equal to the number of robot connected base stations at the right side (no in step S30), in step S32, the guidance control unit 13 causes the left-side guidance signal transmission unit 101 to transmit the second guidance signal, and causes the right-side guidance signal transmission unit 102 to transmit the first guidance signal.

Following on, the first guidance signal, the second guidance signal, and the narrow area signal transmitted by a plurality of robot base stations 11 will be described.

Figure 23:
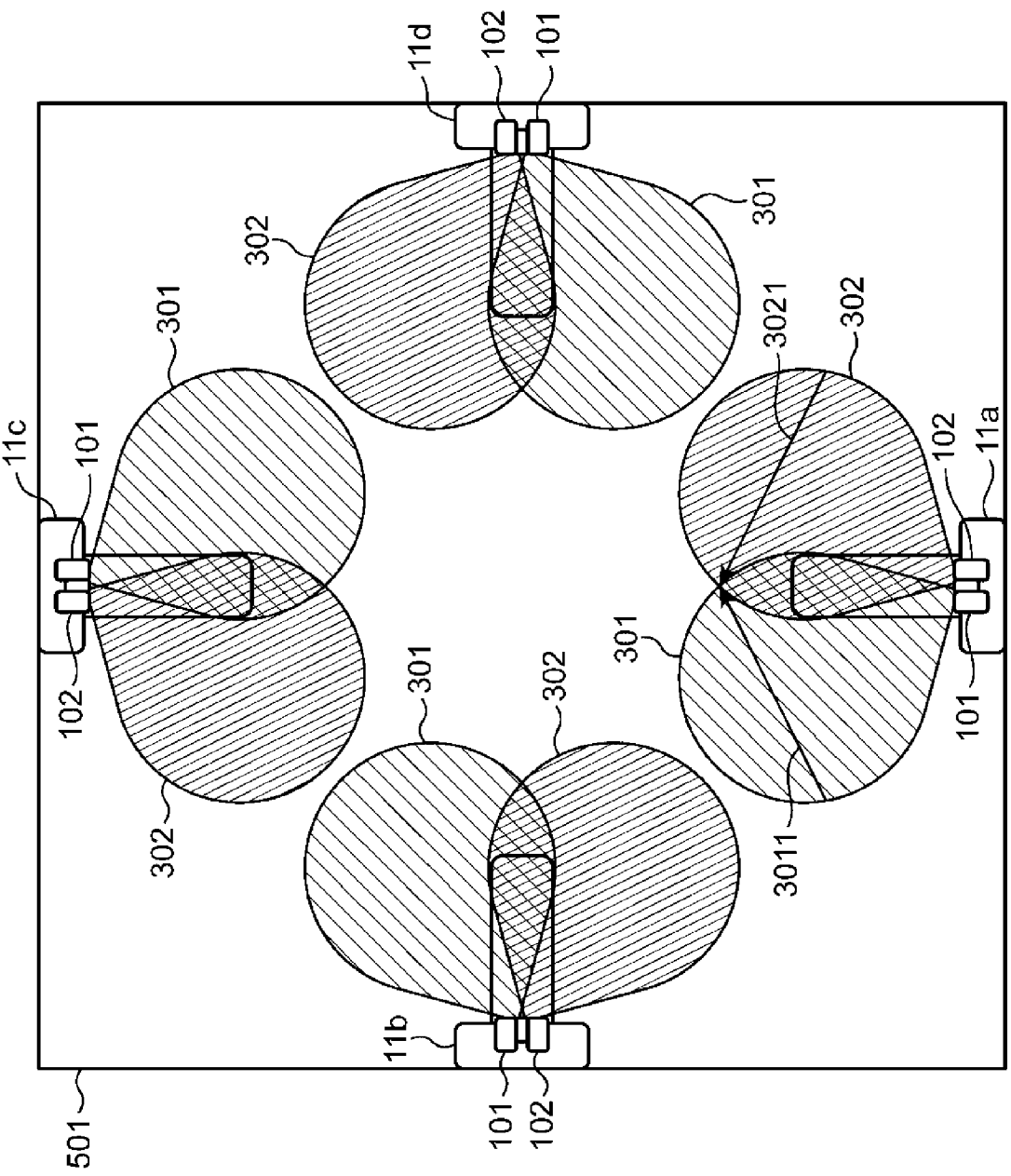
FIG. 23 is a schematic diagram for describing a first guidance signal, a second guidance signal, and a narrow area signal transmitted from a plurality of robot base stations in a case where no robots are connected to the plurality of robot base stations in embodiment 2 of the present disclosure.

FIG. 23 is a schematic diagram for describing the first guidance signal, the second guidance signal, and the narrow area signal transmitted from a plurality of robot base stations in a case where no robots are connected to the plurality of robot base stations in embodiment 2 of the present disclosure. It should be noted that, in FIG. 23, a first robot base station 11a, a second robot base station 11b, a third robot base station 11c, and a fourth robot base station 11d are arranged in contact with each of the four walls of a quadrangular room 501.

The configurations of the first robot base station 11a, the second robot base station 11b, the third robot base station 11c, and the fourth robot base station 11d are the same as the configuration of the robot base station 11 depicted in FIG. 20.

As depicted in FIG. 23, in a case where robots 2 are not connected to any of the plurality of robot base stations 11a, 11b, 11c, and 11d, the left-side guidance signal transmission unit 101 of each robot base station 11a, 11b, 11c, and 11d transmits, to the left side of each robot base station 11a, 11b, 11c, and 11d, the first guidance signal 301 which guides a robot 2 in a direction (the direction of the arrow 3011) from the left side of each robot base station 11a, 11b, 11c, and 11d to the right side.

Furthermore, in the case where robots 2 are not connected to any of the plurality of robot base stations 11a, 11b, 11c, and 11d, the right-side guidance signal transmission unit 102 of each robot base station 11a, 11b, 11c, and 11d transmits, to the right side of each robot base station 11a, 11b, 11c, and 11d, the second guidance signal 302 which guides a robot 2 in a direction (the direction of the arrow 3021) from the right side of each robot base station 11a, 11 b, 11c, and 11d to the left side.

In addition, the narrow area signal transmission unit 103 of each robot base station 11a, 11b, 11c, and 11d transmits, to the front of each robot base station 11a, 11b, 11c, and 11d, the narrow area signal 303 which guides a robot 2 to the front of each robot base station 11a, 11 b, 11c, and 11d. It should be noted that the narrow area signal 303 is omitted in FIG. 23.

It should be noted that the ranges reached by the first guidance signal 301 and the second guidance signal 302 in FIG. 23 are each schematically depicted, and the actual sizes are different. Furthermore, the arrows 3011 and 3021 indicate directions in which a robot 2 is guided.

Furthermore, in FIG. 23, the plurality of robot base stations 11a, 11 b, 11c, and 11d are arranged in an evenly spaced manner; however, the present disclosure is not particularly restricted thereto, and the plurality of robot base stations 11a, 11 b, 11c, and 11d may not be arranged in an evenly spaced manner. Furthermore, the plurality of robot base stations 11a, 11b, 11c, and 11d may not be arranged in contact with the walls of the room 501.

Furthermore, in the present embodiment 2, four robot base stations 11 are arranged; however, the present disclosure is not particularly restricted thereto, and two robot base stations 11, three robot base stations 11, or five or more robot base stations 11 may be arranged.

Figure 24:
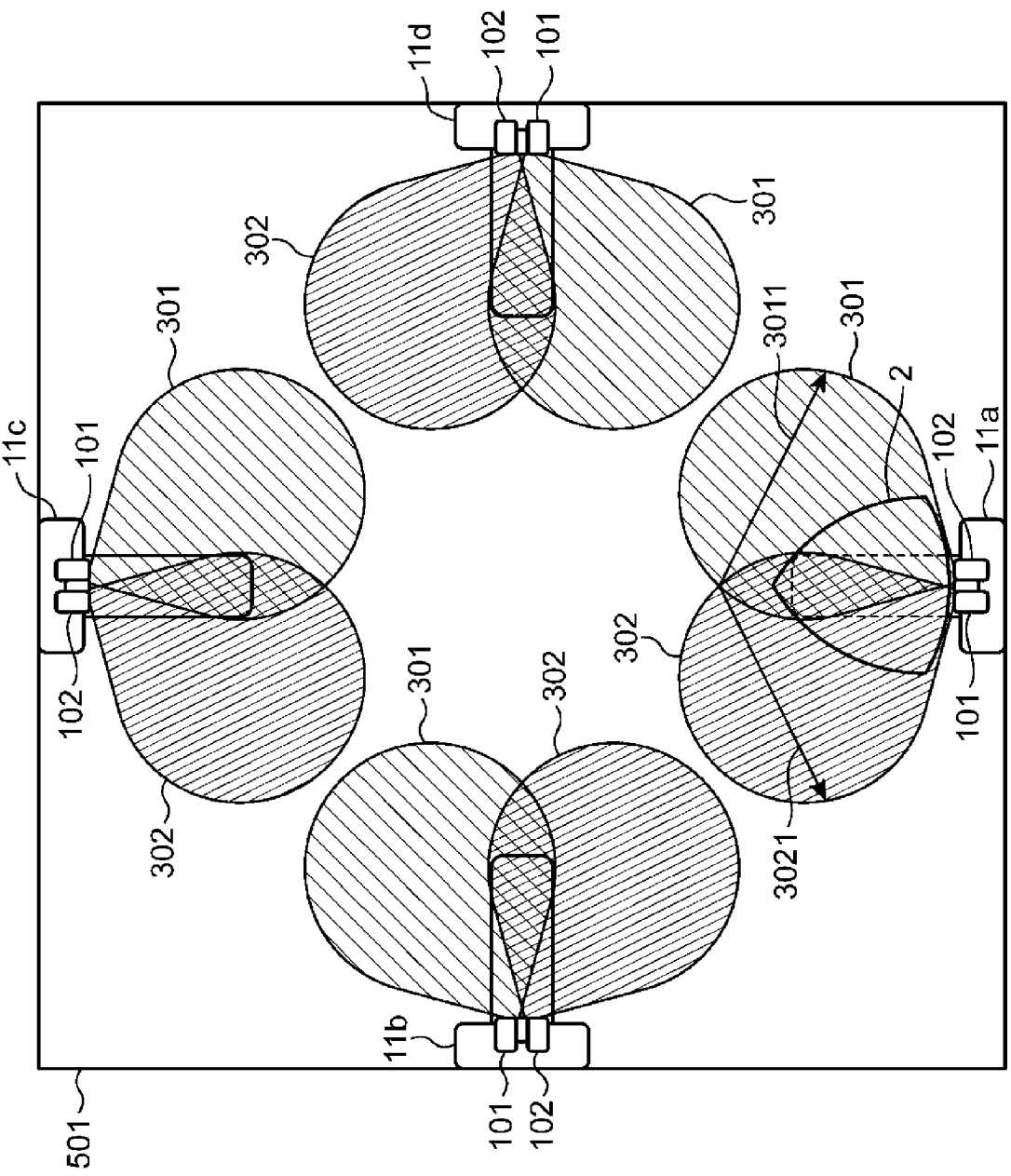
FIG. 24 is a schematic diagram for describing the first guidance signal and the second guidance signal transmitted from the plurality of robot base stations in a case where a robot is connected to one robot base station from among the plurality of robot base stations in embodiment 2 of the present disclosure.

FIG. 24 is a schematic diagram for describing the first guidance signal and the second guidance signal transmitted from the plurality of robot base stations in a case where a robot is connected to one robot base station from among the plurality of robot base stations in embodiment 2 of the present disclosure.

In FIG. 24, a robot 2 is connected to only the first robot base station 11a. It should be noted that the robot base station to which the robot 2 is connected is not particularly determined, and the robot 2 may be connected to any robot base station from among the plurality of robot base stations.

As depicted in FIG. 24, in the case where a robot 2 is connected to only the first robot base station 11a, the left-side guidance signal transmission unit 101 of the first robot base station 11a transmits, to the left side of the first robot base station 11a, the second guidance signal 302 which guides a robot 2 in a direction (the direction of the arrow 3021) from the right side of the first robot base station 11a to the left side.

Furthermore, in the case where a robot 2 is connected to only the first robot base station 11a, the right-side guidance signal transmission unit 102 of the first robot base station 11a transmits, to the right side of the first robot base station 11a, the first guidance signal 301 which guides a robot 2 in a direction (the direction of the arrow 3011) from the left side of the first robot base station 11a to the right side.

Meanwhile, the left-side guidance signal transmission unit 101 of the robot base stations 11b, 11c, and 11d having no robots 2 connected thereto transmit, to the left side of each robot base station 11b, 11c, and 11d, the first guidance signal 301 which guides a robot 2 in a direction from the left side of each robot base station 11b, 11c, and 11d to the right side, and the right-side guidance signal transmission unit 102 of the robot base stations 11b, 11c, and 11d transmit, to the right side of each robot base station 11b, 11c, and 11d, the second guidance signal 302 which guides a robot 2 in a direction from the right side of each robot base station 11b, 11c, and 11d to the left side.

In other words, in a case where the connection detection unit 104 has detected that a robot 2 is connected, the guidance control unit 13 of the first robot base station 11a calculates the distance between the first robot base station 11a and the base station that is closest to the first robot base station 11a at the left side of the first robot base station 11a and has no robot 2 connected thereto, and also calculates the distance between the first robot base station 11a and the base station that is closest to the first robot base station 11a at the right side of the first robot base station 11a and has no robot 2 connected thereto.

The base station that is closest to the first robot base station 11a at the left side of the first robot base station 11a and has no robot 2 connected thereto is the second robot base station 11b, and therefore the guidance control unit 13 calculates the distance between the second robot base station 11b and the first robot base station 11a. It should be noted that the distance is represented by the number of base stations having a robot 2 connected thereto, present between the second robot base station 11b and the first robot base station 11a. In FIG. 24, the distance between the second robot base station 11b and the first robot base station 11a is 0.

Furthermore, the base station that is closest to the first robot base station 11a at the right side of the first robot base station 11a and has no robot 2 connected thereto is the fourth robot base station 11d, and therefore the guidance control unit 13 calculates the distance between the fourth robot base station 11d and the first robot base station 11a. In FIG. 24, the distance between the fourth robot base station 11d and the first robot base station 11a is 0.

The distance between the second robot base station 11b and the first robot base station 11a is equal to the distance between the fourth robot base station 11d and the first robot base station 11a, and therefore the guidance control unit 13 of the first robot base station 11a causes the left-side guidance signal transmission unit 101 to transmit the second guidance signal 302, and also causes the right-side guidance signal transmission unit 102 to transmit the first guidance signal 301.

In this way, in the case where a robot 2 is connected to only the first robot base station 11a, the guidance signal transmitted from the left-side guidance signal transmission unit 101 of the first robot base station 11a is switched from the first guidance signal 301 to the second guidance signal 302, and the guidance signal transmitted from the right-side guidance signal transmission unit 102 of the first robot base station 11a is switched from the second guidance signal 302 to the first guidance signal 301.

Thus, another robot 2 that has detected the second guidance signal 302 transmitted from the left-side guidance signal transmission unit 101 of the first robot base station 11a to which a robot 2 is connected moves in the direction of the arrow 3021 in which the second robot base station 11b is present, and is guided toward the second robot base station 11b. Furthermore, another robot 2 that has detected the first guidance signal 301 transmitted from the right-side guidance signal transmission unit 102 of the first robot base station 11a to which a robot 2 is connected moves in the direction of the arrow 3011 in which the fourth robot base station 11d is present, and is guided toward the fourth robot base station 11d.

Consequently, using guidance signals transmitted from a robot base station to which a robot 2 is already connected, another robot 2 that is not connected to a robot base station can be guided to a robot base station having no robot 2 connected thereto, a plurality of robots 2 can be reliably returned to robot base stations, and also the time taken for all of the plurality of robots 2 to return to the robot base stations can be shortened.

It should be noted that, in the present embodiment 2, the operations for the cases where one to four robots 2 are connected to the plurality of robot base stations 11a, 11 b, 11c, and 11d are the same as the operations for the plurality of base stations 111, 112, 113, and 114 in embodiment 1.

Figure 25:
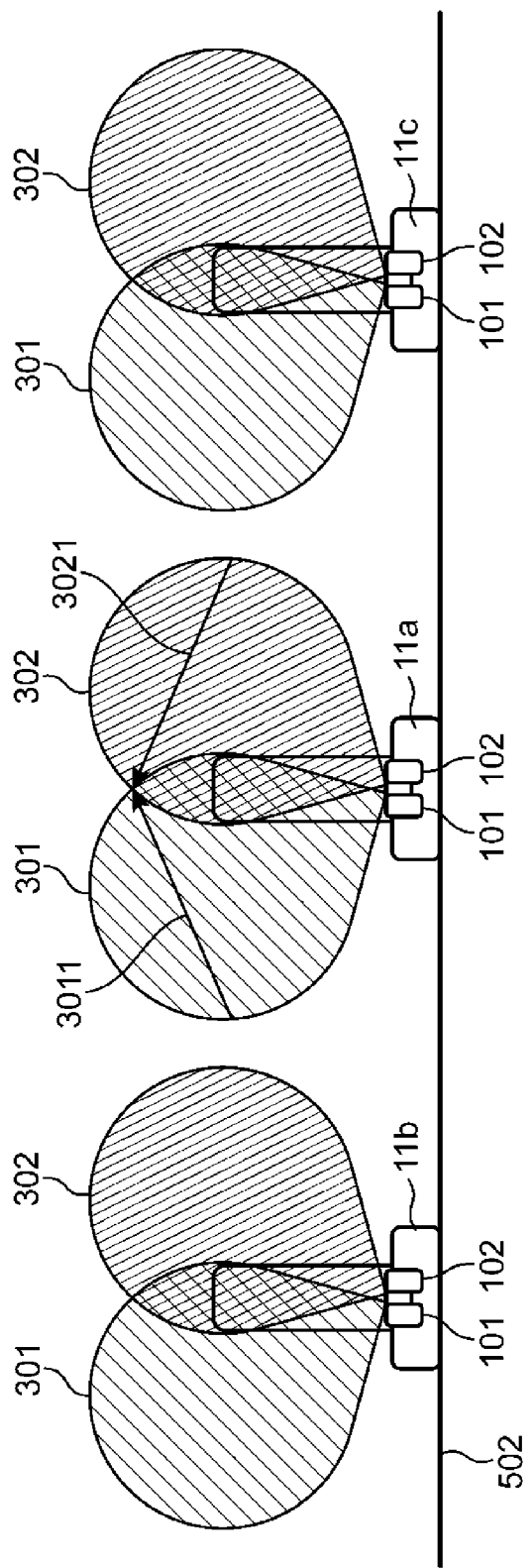
FIG. 25 is a schematic diagram for describing the first guidance signal, the second guidance signal, and the narrow area signal transmitted from the plurality of robot base stations in a case where no robots are connected to the plurality of robot base stations, arranged side-by-side in a straight line, in embodiment 2 of the present disclosure.

FIG. 25 is a schematic diagram for describing the first guidance signal, the second guidance signal, and the narrow area signal transmitted from the plurality of robot base stations in a case where no robots are connected to the plurality of robot base stations, arranged side-by-side in a straight line, in embodiment 2 of the present disclosure. It should be noted that, in FIG. 25, the first robot base station 11a, the second robot base station 11b, and the third robot base station 11c are each arranged in contact with a wall 502 of a room, and are also arranged side-by-side in a straight line with respect to the wall 502.

The configurations of the first robot base station 11a, the second robot base station 11b, and the third robot base station 11c are the same as the configuration of the robot base station 11 depicted in FIG. 20.

As depicted in FIG. 25, in a case where robots 2 are not connected to any of the plurality of robot base stations 11a, 11b, and 11c, the left-side guidance signal transmission unit 101 of each robot base station 11a, 11b, and 11c transmits, to the left side of each robot base station 11a, 11b, and 11c, the first guidance signal 301 which guides a robot 2 in a direction (the direction of the arrow 3011) from the left side of each robot base station 11a, 11b, and 11c to the right side.

Furthermore, in the case where robots 2 are not connected to any of the plurality of robot base stations 11a, 11b, and 11c, the right-side guidance signal transmission unit 102 of each robot base station 11a, 11b, and 11c transmits, to the right side of each robot base station 11a, 11 b, and 11c, the second guidance signal 302 which guides a robot 2 in a direction (the direction of the arrow 3021) from the right side of each robot base station 11a, 11b, and 11c to the left side.

In addition, the narrow area signal transmission unit 103 of each robot base station 11a, 11b, and 11c transmits, to the front of each robot base station 11a, 11b, and 11c, the narrow area signal 303 which guides a robot 2 to the front of each robot base station 11a, 11b, and 11c. It should be noted that the narrow area signal 303 is omitted in FIG. 25.

It should be noted that the ranges reached by the first guidance signal 301 and the second guidance signal 302 in FIG. 25 are each schematically depicted, and the actual sizes are different. Furthermore, the arrows 3011 and 3021 indicate directions in which a robot 2 is guided.

Furthermore, in FIG. 25, the plurality of robot base stations 11a, 11b, and 11c are arranged in an evenly spaced manner; however, the present disclosure is not particularly restricted thereto, and the plurality of robot base stations 11a, 11b, and 11c may not be arranged in an evenly spaced manner. Furthermore, the plurality of robot base stations 11a, 11b, and 11c may not be arranged in contact with the wall 502 of the room.

Furthermore, in the present embodiment 2, three robot base stations 11 are arranged; however, the present disclosure is not particularly restricted thereto, and two robot base stations 11 or four or more robot base stations 11 may be arranged.

As depicted in FIG. 25, even in a case where the plurality of robot base stations 11a, 11b, and 11c are arranged side-by-side in a straight line along the wall 502, another robot 2 that is not connected to a robot base station can be guided to a robot base station having no robot 2 connected thereto.

It should be noted that the second robot base station 11b depicted in FIG. 25 has no other robot base station present at the left side. In this way, in a case where another robot base station is not present at one side (the left side), the guidance control unit 13 may set the distance between the second robot base station 11b and the base station that is closest to the second robot base station 11b at the one side (the left side) of the second robot base station 11b and has no robot 2 connected thereto as G∞, for example. The guidance control unit 13 may then determine that the distance between the second robot base station 11b and the other robot base station that is closest to the second robot base station 11b at the one side (the left side) of the second robot base station 11b and has no robot 2 connected thereto is greater than the distance between the second robot base station 11b and another robot base station that is closest to the second robot base station 11b at the other side (the right side) of the second robot base station 11b and has no robot 2 connected thereto, and cause both the left-side guidance signal transmission unit 101 and the right-side guidance signal transmission unit 102 of the second robot base station 11b to transmit the first guidance signal.

Embodiment 3

In embodiment 3, a robot base station receives connection information regarding other robot base stations from a server rather than receiving the connection information from the other robot base stations, and also receives distance information relating to distances to the other robot base stations.

Figure 26:
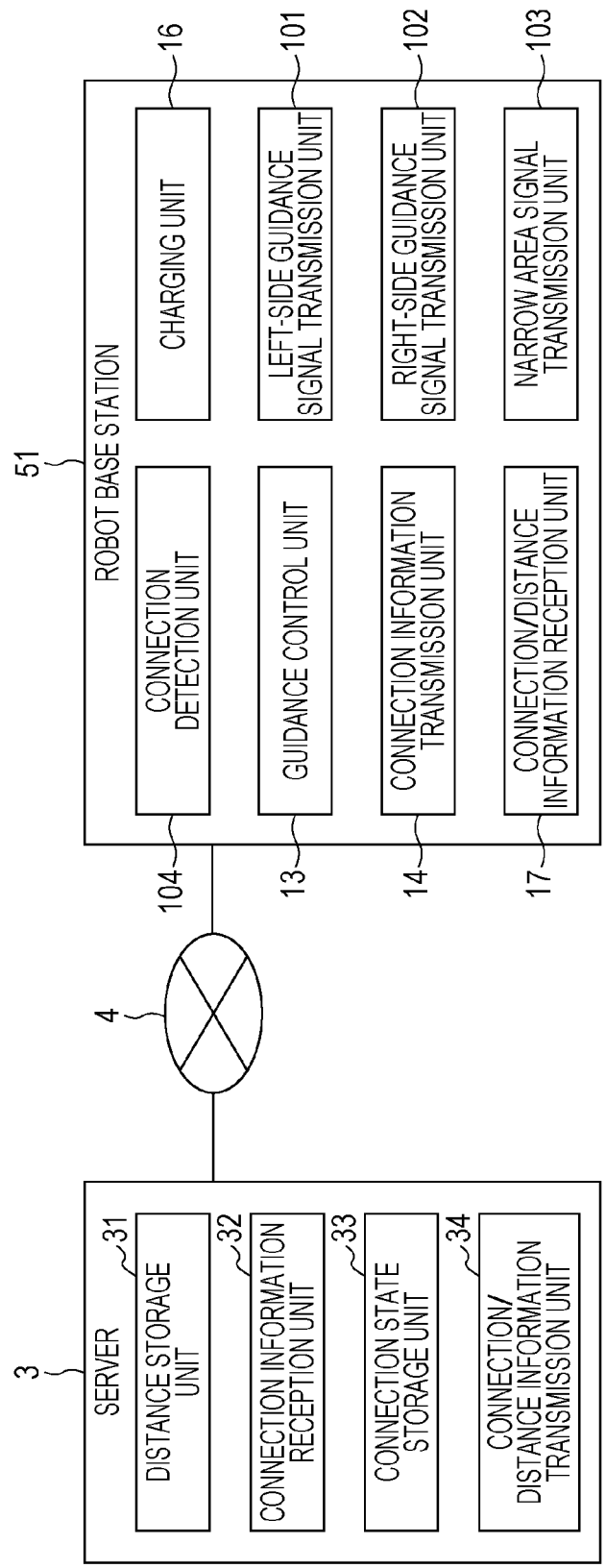
FIG. 26 is a block diagram depicting an example of a functional configuration of a robot guidance system in embodiment 3 of the present disclosure.

FIG. 26 is a block diagram depicting an example of a functional configuration of a robot guidance system in embodiment 3 of the present disclosure. The robot guidance system depicted in FIG. 26 is provided with a robot base station 51 and a server 3. It should be noted that configurations that are the same as those of the robot base station 11 in embodiment 2 are denoted by the same reference numbers, and descriptions thereof are omitted.

The robot base station 11 and the server 3 are communicably connected to each other via a network 4. The network 4 is the Internet, for example.

The robot base station 51 is provided with a guidance control unit 13, a connection information transmission unit 14, a charging unit 16, a connection/distance information reception unit 17, a left-side guidance signal transmission unit 101, a right-side guidance signal transmission unit 102, a narrow area signal transmission unit 103, and a connection detection unit 104.

The connection information transmission unit 14 transmits, to the server 3, connection information indicating whether or not one robot is connected to the robot base station 51.

The connection/distance information reception unit 17 receives, from the server 3, connection information indicating whether or not robots are connected to the other robot base stations, and distance information indicating the distances to the other robot base stations. The connection/distance information reception unit 17 receives, from the server 3, distance information that includes the distance between the robot base station 51 and a first other mobile body base station that is present at the left side (one side) of the robot base station 51, and the distance between the robot base station 51 and a second other mobile body base station that is present at the right side (the other side) of the robot base station 51.

The server 3 is provided with a distance storage unit 31, a connection information reception unit 32, a connection state storage unit 33, and a connection/distance information transmission unit 34. It should be noted that the server 3 is an example of a management device.

The distance storage unit 31 stores the distances among a plurality of robot base stations. The connection information reception unit 32 receives connection information transmitted by the plurality of robot base stations. The connection state storage unit 33 stores a table having associated therein the plurality of robot base stations and information indicating whether or not a robot is connected to each of the plurality of robot base stations.

The connection/distance information transmission unit 34 transmits, to the plurality of robot base stations, connection information indicating whether or not robots are connected to the plurality of robot base stations, and distance information indicating the distances among the plurality of robot base stations. Moreover, the connection/distance information transmission unit 34 may transmit connection information indicating whether or not a robot is connected to each of a plurality of robot base stations arranged in the same room, and distance information indicating the distances between each of the plurality of robot base stations arranged in the same room and the other robot base stations, to each of the plurality of robot base stations. Furthermore, the connection/distance information transmission unit 34 may transmit connection information indicating whether or not a robot is connected to at least one robot base station other than a transmission destination from among the plurality of robot base stations arranged in the same room, and distance information indicating the distance between the transmission-destination robot base station from among the plurality of robot base stations arranged in the same room and the at least one robot base station other than the transmission destination, to each of the plurality of robot base stations.

It should be noted that the operation of the robot base station 51 is substantially the same as the operation of the robot base station 11 in embodiment 2. In embodiment 3, in step S22 of FIG. 21, the connection information transmission unit 14 transmits, to the server 3, connection information indicating that a robot 2 is not connected to the robot base station 11, and, in step S24 of FIG. 21, the connection information transmission unit 14 transmits, to the server 3, connection information indicating that a robot 2 is connected to the robot base station 11. Furthermore, in step S25 of FIG. 21, the connection/distance information reception unit 17 receives, from the server 3, connection information indicating whether or not robots 2 are connected to the other robot base stations, and distance information indicating the distances between the robot base station 51 and the other robot base stations.

The mobile body base station composite body, mobile body base station, and mobile body guidance method according to the present disclosure can cause a plurality of mobile bodies to be reliably returned to each of a plurality of base stations, and can also shorten the time taken for all of the plurality of mobile bodies to return to each of the plurality of base stations, and are useful as a mobile body base station composite body to which a plurality of mobile bodies are to be connected, a mobile body base station to which one mobile body from among a plurality of mobile bodies is to be connected, and a mobile body guidance method that guides a plurality of mobile bodies to a mobile body base station composite body.

What is claimed is:

1. A system comprising:
   a plurality of base stations each being connectable with one of a plurality of mobile bodies, each of the plurality of base stations including
      a first transmitter that transmits, in a forward-left direction of an own base station, a first guidance signal for causing a course of each of the plurality of mobile bodies to change to a left side with respect to an advancing direction, or a second guidance signal for causing the course of each of the plurality of mobile bodies to change to a right side with respect to the advancing direction;
      a second transmitter that transmits the first guidance signal or the second guidance signal in a forward-right direction of the own base station, and
      a detector that detects whether or not the own base station is connected with one of the plurality of mobile bodies; and
   a controller that,
      (A) when a first base station of the plurality of base stations is not connected with any of the plurality of mobile bodies, guides at least one of the plurality of mobile bodies located around the first base station toward the first base station by
         (a1) causing the first transmitter of the first base station to transmit the first guidance signal, and
         (a2) causing the second transmitter of the first base station to transmit the second guidance signal, and
      (B) when the first base station is connected with one of the plurality of mobile bodies, and a second base station, which is a closest base station to the first base station, of the plurality of base stations is not connected with any of the plurality of mobile bodies, guides at least one of the plurality of mobile bodies located around the first base station toward the second base station by
         (b1) causing the first transmitter of the first base station to transmit the second guidance signal, and/or
         (b2) causing the second transmitter of the first base station to transmit the first guidance signal.

2. The system according to claim 1,
   wherein, in a case where the second base station is located at a left side of the first base station, the controller, in the (B), executes at least the (b1).

3. The system according to claim 2,
   wherein, in a case where a third base station of the plurality of base stations is another closest base station to the first base station and is located at a right side of the first base station, the controller, in the (B), executes the (b1) and (b2) further when the third base station is not connected with any of the plurality of mobile bodies.

4. The system according to claim 3,
   wherein the controller further,
      (C) when the first base station and the second base station each are connected with one of the plurality of mobile bodies, and the third base station is not connected with any of the plurality of mobile bodies, guides at least one of the plurality of mobile bodies located around the first base station toward the third base station by
         (c1) causing each of the first transmitter and the second transmitter of the first base station to transmit the first guidance signal.

5. The system according to claim 3,
   wherein, in a case where fronts of the plurality of base stations all face an inner side or an outer side of an imaginary polygon formed by joining the plurality of base stations, and a fourth base station of the plurality of base stations is located in a corner opposite to the first base station in the imaginary polygon, the controller further,
      (D) when the fourth base station is not connected with any of the plurality of mobile bodies, and each remaining base station of the plurality of base stations is connected with one of the plurality of mobile bodies, guides at least one of the plurality of mobile bodies located around the first base station away from the first base station by
         (d1) causing the first transmitter of the first base station to transmit the second guidance signal, and
         (d2) causing the second transmitter of the first base station to transmit the first guidance signal.

6. The system according to claim 1,
   wherein, in a case where fronts of the plurality of base stations all face an inner side or an outer side of an imaginary polygon formed by joining the plurality of base stations, the controller,
      (X) when the first base station is connected with one of the plurality of mobile bodies, and a first distance from the first base station to a first non-connected base station in a counterclockwise direction along the imaginary polygon is less than a second distance from the first base station to a second non-connected base station in a clockwise direction along the imaginary polygon, guides at least one of the plurality of mobile bodies located around the first base station away from the first base station by
(x1) causing the first transmitter and the second transmitter of the first base station to transmit the second guidance signal,
(Y) when the first base station is connected with one of the plurality of mobile bodies, and the first distance is greater than the second distance, guides at least one of the plurality of mobile bodies located around the first base station away from the first base station by
(y1) causing the first transmitter and the second transmitter of the first base station to transmit the first guidance signal, and
(Z) when the first base station is connected with one of the plurality of mobile bodies, and the first distance is equal to the second distance, guides at least one of the plurality of mobile bodies located around the first base station away from the first base station by
(z1) causing the first transmitter of the first base station to transmit the second guidance signal, and
(z2) causing the second transmitter of the first base station to transmit the first guidance signal,
wherein the first non-connected base station is one, which is closest to the first base station in the counterclockwise direction along the imaginary polygon, of the plurality of base stations that are not connected with any of the plurality of mobile bodies, and
wherein the second non-connected base station is one, which is closest to the first base station in the clockwise direction along the imaginary polygon, of the plurality of base stations that are not connected with any of the plurality of mobile bodies.

7. The system according to claim 6, further comprising:
a storage that stores distance information indicating distances among the plurality of base stations,
wherein the controller further calculates the first distance and the second distance, based on the distance information and connection information indicating connection states of the plurality of base stations.

8. The system according to claim 1,
wherein, in a case where fronts of the plurality of base stations all face an inner side or an outer side of an imaginary polygon formed by joining the plurality of base stations, the controller,
(U) when the first base station is connected with one of the plurality of mobile bodies, and a number of first connected base stations, which exist from the first base station to a first non-connected base station in a counterclockwise direction along the imaginary polygon, of the plurality of base stations is less than a number of second connected base stations, which exist from the first base station to a second non-connected base station in a clockwise direction along the imaginary polygon, of the plurality of base stations, guides at least one of the plurality of mobile bodies located around the first base station away from the first base station by
(u1) causing the first transmitter and the second transmitter of the first base station to transmit the second guidance signal,
(V) when the first base station is connected with one of the plurality of mobile bodies, and the number of the first connected base stations is greater than the number of the second connected base stations, guides at least one of the plurality of mobile bodies located around the first base station away from the first base station by
(v1) causing the first transmitter and the second transmitter of the first base station to transmit the first guidance signal, and
(W) when the first base station is connected with one of the plurality of mobile bodies, and the number of the first connected base stations is equal to the number of the second connected base stations, guides at least one of the plurality of mobile bodies located around the first base station away from the first base station by
(w1) causing the first transmitter of the first base station to transmit the second guidance signal, and
(w2) causing the second transmitter of the first base station to transmit the first guidance signal,
wherein the first non-connected base station is one, which is closest to the first base station in the counterclockwise direction along the imaginary polygon, of the plurality of base stations that are not connected with any of the plurality of mobile bodies, and
wherein the second non-connected base station is one, which is closest to the first base station in the clockwise direction along the imaginary polygon, of the plurality of base stations that are not connected with any of the plurality of mobile bodies.

9. The system according to claim 8, further comprising:
a storage that stores quantity information indicating a number of base stations present between two of the plurality of base stations,
wherein the controller further calculates the number of the first connected base stations and the number of the second connected base stations, based on the quantity information and connection information indicating connection states of the plurality of base stations.

10. The system according to claim 7,
wherein the storage is communicable with the plurality of mobile bodies via a network,
and the controller further acquires the connection information via the network.

11. The system according to claim 1,
wherein the system is implemented as a composite device in which the plurality of base stations are arranged in a radial form with respect to a main body including the controller and are physically connected with the main body.

12. The system according to claim 1,
wherein, in each of the plurality of base stations, a first transmission region where the first guidance signal or the second guidance signal transmitted from the first transmitter reaches, and a second transmission region where the first guidance signal or the second guidance signal transmitted from the second transmitter reaches partially overlap in front of the own base station.

13. The system according to claim 1,
wherein each of the plurality of base stations further including
a third transmitter that transmits, in front of the own base station, a third guidance signal for guiding at least one, which is located at a front of the own base station, of the plurality of mobile bodies toward the own base station.

14. The system according to claim 1,
wherein each of the plurality of mobile bodies is a robot that travels autonomously.

15. The system according to claim 1,
wherein the detector includes a contact sensor including a pair of electrodes, with which a pair of electrodes of each of the plurality of mobile bodies are connectable.

16. The system according to claim 1, wherein the controller includes:
- a processor; and
- a memory that stores a program for causing the processor to execute the (A) and (B).

17. The system according to claim 1,
wherein, in each of the plurality of base stations, the first transmitter and the second transmitter include an infrared emitter,
and each of the plurality of mobile bodies includes an infrared sensor.

18. A base station for the system according to claim 1, wherein the base station is the first base station provided with the controller.

19. A control method for controlling a first base station of a plurality of base stations, each of which is connectable with one of a plurality of mobile bodies,
each of the plurality of base stations including:
- a first transmitter that transmits, in a forward-left direction of an own base station, a first guidance signal for causing a course of each of the plurality of mobile bodies to change to a left side with respect to an advancing direction, or a second guidance signal for causing the course of each of the plurality of mobile bodies to change to a right side with respect to the advancing direction;
- a second transmitter that transmits the first guidance signal or the second guidance signal in a forward-right direction of the own base station; and
- a detector that detects whether or not the own base station is connected with one of the plurality of mobile bodies, and the control method including:
(A) when the first base station is not connected with any of the plurality of mobile bodies, guiding at least one of the plurality of mobile bodies located around the first base station toward the first base station by
- (a1) causing the first transmitter of the first base station to transmit the first guidance signal, and
- (a2) causing the second transmitter of the first base station to transmit the second guidance signal; and, (B) when the first base station is connected with one of the plurality of mobile bodies, and a second base station, which is a closest base station to the first base station, of the plurality of base stations is not connected with any of the plurality of mobile bodies, guiding at least one of the plurality of mobile bodies located around the first base station toward the second base station by
- (b1) causing the first transmitter of the first base station to transmit the second guidance signal, and/or
- (b2) causing the second transmitter of the first base station to transmit the first guidance signal.

* * * * *